United States Patent [19]
Yuki et al.

[11] Patent Number: 5,959,430
[45] Date of Patent: Sep. 28, 1999

[54] POWER CONVERSION SYSTEM

[75] Inventors: Kazuaki Yuki, Saitama-ken; Yosuke Nakazawa, Tokyo, both of Japan

[73] Assignee: Kabushiki Kaisha Toshiba, Kawasaki, Japan

[21] Appl. No.: 08/935,119

[22] Filed: Sep. 22, 1997

[30] Foreign Application Priority Data

Mar. 7, 1997 [JP] Japan ..................................... 9-053011
Mar. 28, 1997 [JP] Japan ..................................... 9-077087

[51] Int. Cl.⁶ ....................................................... H02P 5/28
[52] U.S. Cl. ........................................................... 318/805
[58] Field of Search ................ 363/34, 37; 318/798–809

[56] References Cited

U.S. PATENT DOCUMENTS 4,019,116  4/1977  Klautschek ............................ 321/45 C
4,628,475  12/1986  Azusawa et al. ........................ 364/851
5,166,593  11/1992  De Doncker et al. ................... 318/800

FOREIGN PATENT DOCUMENTS 5-31400  5/1993  Japan.
7-46918  5/1995  Japan.

*Primary Examiner*—William M. Shoop, Jr.
*Assistant Examiner*—Rina I. Duda
*Attorney, Agent, or Firm*—Oblon, Spivak, McClelland, Maier & Neustadt, P.C.

[57] ABSTRACT

A power conversion system, including a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a unit for detecting or computing a magnetic flux axis of the induction motor, a unit for computing a current orthogonal to the detected or computed magnetic flux axis, and a phase control unit for controlling a phase angle of an output voltage of the inverter so that a value of the current orthogonal to the detected or computed magnetic flux axis is maintained at a constant level.

28 Claims, 31 Drawing Sheets

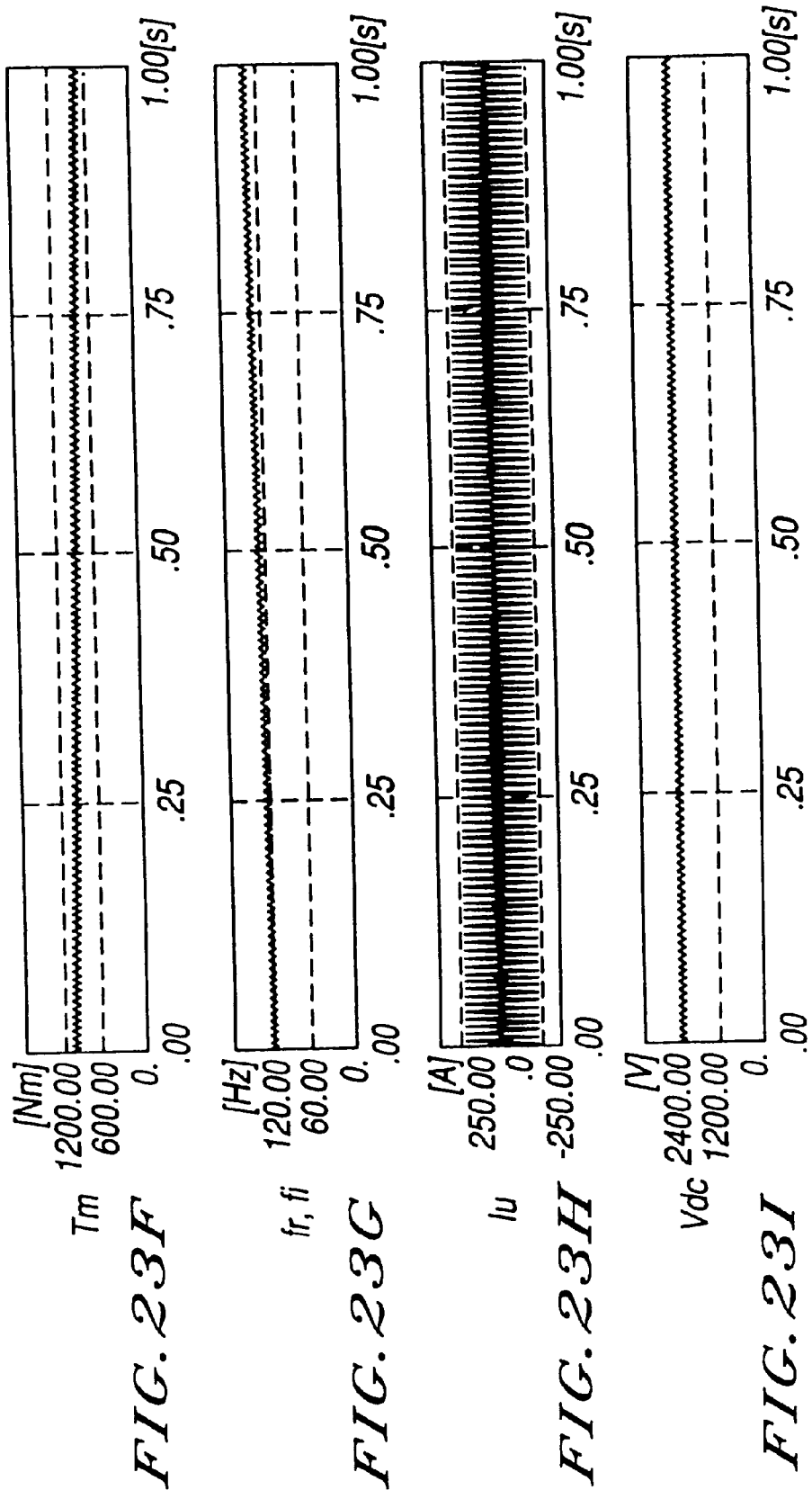

POWER CONVERSION SYSTEM

BACKGROUND OF THE INVENTION

1. Field of the Invention

This invention relates to a power conversion system, and more particularly to a power conversion system which converts an AC power to a DC power by a converter and further converts it to an AC power of an arbitrary frequency by an inverter to drive and control an induction motor and can thereby suppress the torque ripple caused by the pulsation of the DC link voltage.

2. Description of the Related Art

In general, in a system for driving and controlling an induction motor by converting an AC power from a power source to a DC power by a converter, smoothing this DC power by a DC capacitor and further converting the smoothed DC power to an AC power of an arbitrary frequency, DC link voltage pulses because of higher harmonics superposed on the current flowing to the DC capacitor from the converter.

In case of three phase power source, a pulsating frequency of DC link voltage is 6-times frequency $6f_{so}$ of a supply frequency $f_{so}$, and in case of a single phase power source, it is two times frequency $2f_{so}$ of supply frequency $f_{so}$.

On the other hand, when producing three-phase AC power from the DC voltage by an inverter, a beat phenomenon of phase current and torque ripple are generated by fluctuation of the DC link voltage, and they become problems.

This beat phenomenon of the phase current is a phenomenon wherein phase current is oscillated by a differential frequency between a fluctuating frequency of the DC link voltage and an inverter output frequency $f_i$, and regarding the torque, the torque ripple of the fluctuating frequency of the DC link voltage is generated.

In particular, in case of a single phase power source this will become a problem because a fluctuating frequency of the DC link voltage is low.

When a supply frequency is 50/60 Hz, a fluctuating frequency of the DC link voltage will become 100/120 Hz.

So, in recent years, regarding the beat phenomenon of the phase current, its cause is assumed to be attributable to an unbalance between plus and minus voltages superposed on the phase voltage, and a control method to remove this unbalance is proposed in, for instance, Literature 1 ("Method to Suppress Beat Phenomenon in Converter/Inverter System"), Section D of Collected Paper of The Institute of Electrical Engineers of Japan, Vol. 109, No. 5, P. 363).

Hereinafter, a conventional method to suppress a phase. current beat phenomenon will be described using FIG. 37.

FIG. 37 is a block diagram illustrating an example of a schematic construction of a conventional power conversion system.

In FIG. 37, this system is in such a construction that a single phase AC power from a single phase power source 1 is converted to a DC power by a single-phase converter 2, is smoothed by a DC capacitor 3 and further, is converted to an AC power of an arbitrary frequency by an inverter 4 so as to drive and control an induction motor 6.

On the other hand, a slip angular frequency reference $\omega_s^*$ is calculated by a slip frequency controller 29, is added to a velocity (angular frequency) $\omega_r$ of induction motor 6 detected by a velocity detector 7, and thus an output angular frequency reference $\omega_i^*$ of inverter 4 is calculated.

Further, from a DC link voltage $V_{dc}$, that is a terminal voltage of DC capacitor 3, detected by a voltage detector 8, a mean value $V_{dc}^*$ of DC link voltage $_{dc}$ is calculated by an mean value computing unit 30 and a fluctuation quantity $\Delta V_{dc}$ from this mean value $V_{dc}^*$ is computed by a fluctuation quantity computing unit 18. Then, a value obtained by dividing this fluctuation quantity $\Delta V_{dc}$ by this mean value $V_{dc}^*$ is input to a gain/phase compensator 20.

Further, a gain and phase compensated sine wave is output from gain/phase compensator 20 by compensating the gain and the phase to a sine wave of two times of frequency $2f_{so}$ of supply frequency $f_{so}$.

This output is a compensating value $\Delta \omega_i$ of an output angular frequency of inverter 4, and is added to output angular frequency reference $\omega_i^*$ of inverter 4 to obtain an output angular frequency $\omega_i$ of inverter 4.

Then, this output angular frequency $\omega_i$ of inverter 4 is integrated by an integrator 11 to obtain an output voltage phase angle $\theta_i$ of inverter 4, which is input to a gate controller 17.

In this gate controller 17, a gate signal is generated for inverter 4 based on this output voltage phase angle $\theta_i$ of inverter 4.

By the way, in the above-described Literature 1, a method for setting a gain/phase compensator is analytically obtained in connection with the current beat.

Further, it is pointed out that the torque ripple can be suppressed by finely adjusting gain and phase.

However, regarding the point that the torque ripple can be suppressed by finely adjusting gain and phase, only its effect is pointed out from the result of simulation, and nothing is stated as to its basis. Further, although it is pointed out that the adjustment is required corresponding to the operating state, it is not theoretically backed. Therefore, an adjusting method is not clear and there is such a problem that the actual adjustment is difficult.

SUMMARY OF THE INVENTION

It is an object of the present invention to provide a highly reliable power conversion system which is capable of effectively suppressing torque ripple without requiring any adjustment in any operating state or for any controlling objects having different parameter values, by performing the compensation in order according to theoretically obtained compensation quantities.

These and other objects of this invention are achieved by providing a power conversion system, including a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a unit for detecting or computing (i.e., obtaining) a magnetic flux axis of the induction motor, a unit for computing a current orthogonal to the detected or computed magnetic flux axis, and a phase control unit for controlling a phase angle of an output voltage of the inverter so that a value of the current orthogonal to the detected or computed magnetic flux axis is maintained at a constant level.

According to one aspect of this invention, there is provided a power conversion system, including, a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a vector control unit for controlling a vector on a dq-axis rotatory coordinate system where an axis agreed with a magnetic flux axis of the induction motor is assumed to be a d-axis and an axis orthogonal to the d-axis is assumed to be a q-axis, a unit for detecting or computing (i.e., obtaining) a q-axis component current, and a phase control unit for controlling a phase angle of an output voltage of the inverter so that a value of the detected or computed q-axis component current is maintained at a constant level.

According to another aspect of this invention, there is provided a power conversion system, including a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a unit for detecting or computing (i.e., obtaining) an output torque of the induction motor, and a phase control unit for controlling a phase angle of an output voltage of the inverter so that a value of the detected or computed output torque is maintained at a constant level.

According to a still another aspect of this invention, there is provided a power conversion system, including a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a vector control unit for controlling a vector on a dq-axis rotatory coordinate system where an axis agreed with a magnetic flux axis of the induction motor is assumed to be a d-axis and an axis orthogonal to the d-axis is assumed to be a q-axis, a unit for detecting or computing (i.e., obtaining) a q-axis component current, a unit for computing a q-axis primary current command value, a unit for computing a difference between the detected or computed q-axis component current value and the computed q-axis primary current command value, and a phase control unit for controlling a phase angle of an output voltage of the inverter so that the computed difference becomes zero.

According to a further aspect of this invention, there is provided a power conversion system, including a converter for converting an AC power from a power source to a DC power, a DC capacitor for smoothing the DC power output from the converter, an inverter for converting the DC power smoothed by the DC capacitor to an AC power of an arbitrary frequency to drive and control an induction motor, a vector control unit for controlling a vector on a dq-axis rotatory coordinate system where an axis agreed with a magnetic flux axis of the induction motor is assumed to be d-axis and an axis orthogonal to the d-axis is assumed to be q-axis, a unit for detecting or computing (i.e., obtaining) a q-axis component current, and a unit for controlling an output frequency of the inverter so that a value of the detected or computed q-axis component current is maintained at a constant level.

According to another aspect of this invention, there is provided a power conversion system, including a converter for converting an AC power from a power source to a DC power, an inverter for converting the DC power output by the converter to an AC power of an arbitrary frequency to drive and control an induction motor, and a vector control unit for adjusting an AC voltage vector output by the inverter so that a state quantity arising from rectification by the converter becomes constant while a magnetic flux component current is pulsating on a rotatory coordinate system composed of a magnetic flux axis and a torque axis orthogonal to the magnetic flux axis according to fluctuation of the DC power output from the converter.

According to still another aspect of this invention, there is provided a power conversion system, including a converter for converting an AC power from a power source to a DC power, an inverter for converting the DC power output by the converter to an AC power of an arbitrary frequency to drive and control an induction motor, and a vector control unit for adjusting a phase angle from a magnetic flux axis to an AC voltage vector output by the inverter so that a state quantity arising from rectification by the converter becomes constant while a magnetic flux component current is pulsating on a rotatory coordinate system composed of the magnetic flux axis and a torque axis orthogonal to the magnetic flux axis according to fluctuation of the DC power output from the converter.

According to still a further aspect of this invention, there is provided a power conversion system, including a converter for converting an AC power from a power source to a DC power, an inverter for converting the DC power output by the converter to an AC power of an arbitrary frequency to drive and control an induction motor, and a vector control unit for adjusting an output frequency of the inverter so that a state quantity arising from rectification by the converter becomes constant while a magnetic flux component current is pulsating on a rotatory coordinate system composed of a magnetic flux axis and a torque axis orthogonal to the magnetic flux axis according to fluctuation of the DC power output from the converter.

According to a further aspect of this invention, there is provided a power conversion system, including a converter for converting an AC power from a power source to a DC power, an inverter for converting the DC power output by the converter to an AC power of an arbitrary frequency to drive and control an induction motor, and a vector control unit for adjusting a magnetic flux component voltage and a torque component voltage so that a torque component current becomes constant while a magnetic flux component current is pulsating on a rotatory coordinate system composed of a magnetic flux axis and a torque axis orthogonal to the magnetic flux axis according to fluctuation of the DC power output from the converter.

According to a still further aspect of this invention, there is provided a power conversion system, including a converter for converting an AC power from a power source to a DC power, an inverter for converting the DC power output by the converter to an AC power of an arbitrary frequency to drive and control an induction motor, and a vector control unit for adjusting a magnetic flux component current so that the magnetic flux component current pulsates on a rotatory coordinate system composed of a magnetic flux axis and a torque axis orthogonal to the magnetic flux axis according to fluctuation of the DC power output from the converter.

According to a still another aspect of this invention, there is provided a power conversion system, including a converter for converting a single-phase AC power from a power source to a DC power, an inverter for converting the DC power output by the converter to an AC power of an arbitrary frequency to drive and control an induction motor, a unit for obtaining a secondary magnetic flux mean value ($\phi 2^*$) of the induction motor, a unit for detecting or computing (i.e. obtaining) a phase angle ($\rho$) from a secondary magnetic flux axis of the induction motor to an output voltage axis, a torque current computing unit for computing a mean value (iq*) of a torque current orthogonal to the secondary magnetic flux axis, a magnetic flux frequency computing unit for computing a secondary magnetic flux frequency ($\omega o$) which is given to the induction motor, a unit for detecting or computing (i.e. obtaining) a DC link voltage (Vdc) at an output side of the converter and an input side of the inverter, a unit for computing a DC link voltage fluctuation quantity ($\Delta$Vdc) from a mean value of the DC link voltage (Vdc), a unit for detecting or estimating a rotating frequency (fr) and an angular frequency ($\omega r$) of the induction motor, aunit for computing an inverter frequency reference (fi*) based on the rotating frequency (fr) and a slip angular frequency reference (fs*) of the induction motor, a unit for obtaining an inverter phase angle reference ($\theta i^*$) by integrating the inverter frequency reference (fi*), a unit for obtaining a compensation value ($\Delta\theta i$) to an inverter phase angle ($\theta i$) based on Equations (1A)–(4A) by inputting the motor rotating frequency (fr), the motor angular frequency ($\omega r$), the DC link voltage fluctuation quantity ($\Delta$Vdc), the phase angle ($\rho$), a Laplace operator, the DC link voltage (Vdc), the secondary magnetic flux angular frequency ($\omega o$), a transfer function (H1(s)), a motor primary resistance (R1), a motor secondary resistance (R2), a motor primary self-inductance (L1), a motor secondary self-inductance (L2) and a mutual inductance (M), a unit for obtaining the inverter phase angle ($\theta i$) by adding the compensation value ($\Delta\theta i$) and the inverter phase angle reference ($\theta i^*$), and a unit for controlling the inverter output voltage based on the inverter phase angle ($\theta i$).

$$\Delta\theta i = H1(s)\frac{\Delta Vdc}{Vdc} \quad (1A)$$

$$H1(s) = \frac{d2s^2 + d1s + d0}{c2s^2 + c1s + c0} \quad (2A)$$

$c2 = \cos\rho$
$c1 = a1\cos\rho + b1\sin\rho$
$c0 = a0\cos\rho + b0\sin\rho$
$d2 = -\sin\rho$
$d1 = b1\cos\rho - a1\sin\rho$
$d0 = b0\cos\rho - a0\sin\rho \quad (3A)$ $$a1 = \frac{R2}{L2} + \frac{R12}{\sigma L1} \quad (4A)$$

$$a0 = \frac{R1R2}{\sigma L1L2} + \frac{R2M}{L2} \cdot \frac{\omega 0 iq^*}{\phi 2^*}$$

$$b1 = \omega 0 - \frac{R2M}{L2} \cdot \frac{iq^*}{\phi 2^*}$$

$$b0 = \frac{R2}{L2}\omega 0 + \frac{R1M^2}{\sigma L1L2}\omega 1 - \frac{R12R2M}{\sigma L1L2} \cdot \frac{iq^*}{\phi 2^*}$$

$$R12 = R1 + R2\frac{M^2}{L2^2}$$

$$\sigma = 1 - \frac{M^2}{L1L2}$$

Here, a state quantity arising from rectification by the converter is composed one of a torque component current, a torque of the induction motor, a power consumed in the inverter, a current flowing to the inverter and an output current of the inverter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
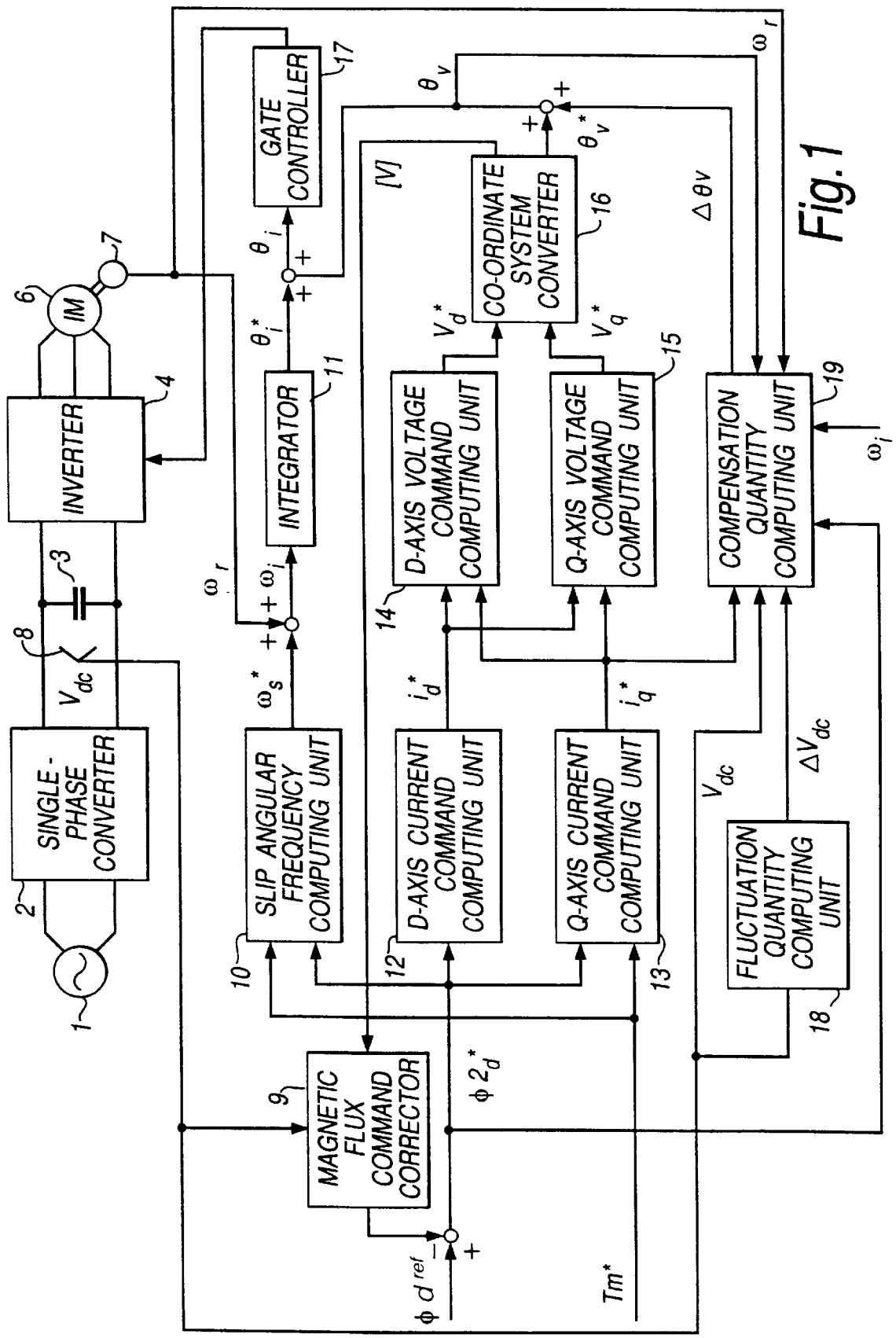
FIG. 1 is a block diagram illustrating an example of a schematic construction of a power conversion system according to a first embodiment of this invention.

Referring now to the drawings, wherein like reference numerals designate identical or corresponding parts throughout the several views, the embodiments of this invention will be described below.

Figure 13:
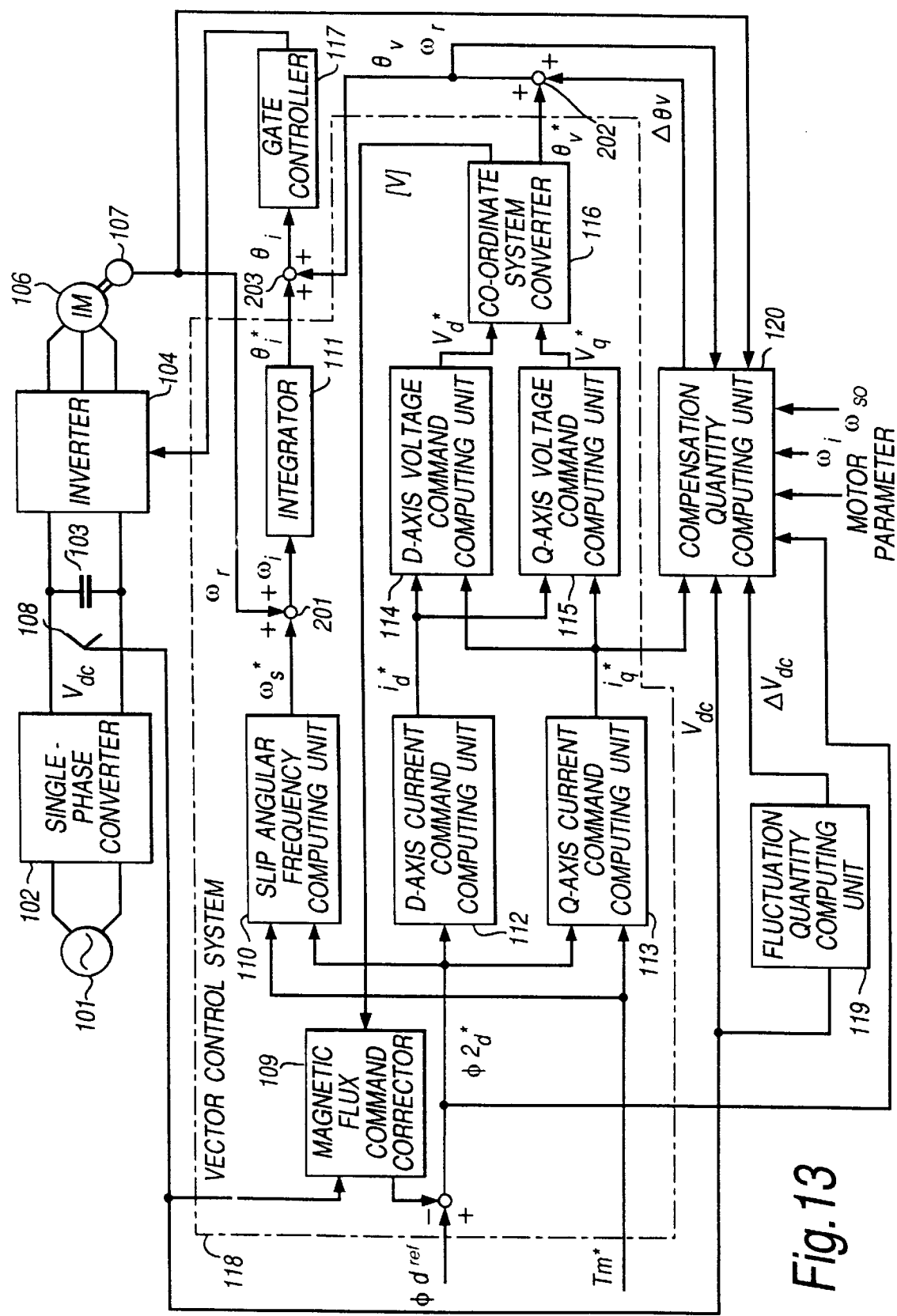
FIG. 13 is a block diagram illustrating a schematic construction of a power conversion system according to a twelfth embodiment of this invention.

FIG. 1 is a block diagram illustrating an example of a schematic construction of a power conversion system according to a first embodiment of this invention, and the same reference numerals are assigned to the same portions shown in FIG. 13.

In FIG. 1, a power conversion system is in such a construction that a single phase AC power from single phase power source 1 is converted to a DC power by single phase converter 2, is smoothed by DC capacitor 3, and further is converted to an AC power of an arbitrary frequency by inverter 4 so as to drive and control induction motor 6.

On the other hand, the control system in this power conversion system is a so-called vector control system.

This vector control system is a system to control current, voltage and magnetic flux as vector quantities on a rotatory coordinate system that is defined to be a dq-axis (a dq axis rotatory coordinate system).

Further, this vector control system is a publicly known technique by way of Literature 2 ("Electric Equipment Engineering II", The Institute of Electrical Engineers of Japan) etc. and many systems are proposed.

Such a vector control system according to this embodiment as shown in FIG. 1 is the construction called a slip frequency type vector control system to bring secondary magnetic flux of induction motor 6 in accord with a d-axis by controlling slip angular frequency properly. Further, this construction has no current minor loop.

Next, the construction of the vector control system according to this embodiment will be described concretely.

In FIG. 1, a slip angular frequency reference $\omega_s^*$ is computed by a slip angular frequency computing unit 10 by inputting a d-axis secondary magnetic flux command value $\phi_{2d}^*$ and a torque command value $T_m^*$, and by adding it to velocity (angular frequency) $\omega_r$ of induction motor 6 detected by velocity detector 7, output angular frequency $\omega_i$ of inverter 4 is computed.

Further, by integrating output angular frequency $\omega_i$ of inverter 4 by integrator 11, an output voltage phase angle reference value $\theta_i^*$ of inverter 4 is computed.

On the other hand, a d-axis primary current command value $i_d^*$ is computed by a d-axis current command computing unit 12 by inputting a d-axis secondary magnetic flux command value $\phi_{2d}^*$.

Further, in a q-axis current command computing unit 13, a q-axis primary current command value $i_q^*$ is computed by inputting d-axis secondary magnetic flux command value $\phi_{2d}^*$ and torque command value $T_m^*$.

Further, in a d-axis voltage command computing unit 14 and a q-axis voltage command computing unit 15, a d-axis voltage command values $V_d^*$ and a q-axis voltage command value $V_q^*$ are respectively computed by inputting both d-axis primary current command value $i_d^*$ and q-axis primary current command value $i_q^*$.

On the other hand, in a coordinate system converter 16, from d-axis voltage command value $V_d^*$ and q-axis voltage command value $V_q^*$ on dq-axis rotatory coordinate system a magnitude $|v|$ of a voltage command value and a phase angle $\theta_v^*$ of a voltage command vector ($V_d^*$ and $V_q^*$) for the d-axis are computed.

This phase angle $\theta_v^*$ is added to a compensation quantity $\Delta\theta_v$ that is described later to obtain a phase angle $\theta_v$ of output voltage of inverter 4. Then, by adding this phase angle $\theta_v$ to an output voltage phase angle reference $\theta_i^*$ of inverter 4, an output voltage phase angle $\theta_i$ of inverter 4 is computed.

Further, in gate controller 17, gate signal to inverter 4 is generated based on output voltage phase angle $\theta_i$ of inverter 4.

Here, in FIG. 1, a vector control system is constructed in the case when inverter 4 is operated at one pulse mode.

This is also publicly known by a Literature 3 ("Vector Control in Voltage Fixed Mode", 1995 National Meeting of Industrial Application Section of The Institute of Electrical Engineers of Japan, No. 196).

On the other hand, in a magnetic flux command corrector 9, magnitude $|V|$ of output voltage command value on the dq-axis rotary coordinate system and a magnitude of DC link voltage $V_{dc}$ are compared, and by correcting a secondary magnetic flux reference $\phi d^{ref}$ so that they agree with each other, d-axis secondary magnetic command value θ2d* is output.

Further, in the vector control, a q-axis primary current $i_q$ becomes a current orthogonal to the magnetic flux axis, as the secondary magnetic axis is in accord with the d-axis.

Further, it is considered that a q-axis primary current $i_q$ is in accord with its command value $i_q^*$ in order to execute the vector control.

In this connection, q-axis primary current $i_q$ may be calculated through the coordinate conversion of the actual phase current of induction motor 6 on the dq-axis.

On the other hand, in voltage detector 8, DC link voltage $V_{dc}$ is detected and fluctuation quantity $\Delta V_{dc}$ of DC link voltage $V_{dc}$ is computed by fluctuation quantity computing unit 18.

Further, in a compensation quantity computing unit 19, compensation quantity $\Delta \theta_v$ to phase angle $\theta_v$ of output voltage of inverter 4 is calculated according to the following equations (1)–(4) by inputting DC link voltage $V_{dc}$, fluctuation quantity $\Delta V_{dc}$ of DC link voltage $V_{dc}$, output angular frequency $\omega_i$ of inverter 4, velocity (angular frequency) $\omega_r$ of induction motor 6, d-axis secondary magnetic flux command value $\phi_{2d}^*$, q-axis primary current command value $i_q^*$ and output voltage phase angle $\theta_v$ of inverter 4.

$$\Delta \theta_v = H_1(s) \frac{\Delta V_{dc}}{V_{dc}} \quad (1)$$

$$H_1(s) = \frac{d_2 s^2 + d_1 s + d_0}{c_2 s^2 + c_1 s + c_0} \quad (2)$$

$c_2 = \cos\theta_v$ $c_1 = a_1 \cos\theta_v + b_1 \sin\theta_v$ $c_0 a_0 \cos\theta_v + b_0 \sin\theta_v$ $d_2 = -\sin\theta_v$ $d_1 = b_1 \cos\theta_v - a_1 \sin\theta_v$ $d_0 = b_0 \cos\theta_v - a_0 \sin\theta_v \quad (3)$ $$a_1 = \frac{R_2}{L_2} + \frac{R_{12}}{\sigma L_1} \quad (4)$$

$$a_0 = \frac{R_1 R_2}{\sigma L_1 L_2} + \frac{R_2 M}{L_2} \cdot \frac{\omega_i i_q^*}{\phi_{2d}^*}$$

$$b_1 = \omega_i - \frac{R_2 M}{L_2} \cdot \frac{i_q^*}{\phi_{2d}^*}$$

$$b_0 = \frac{R_2}{L_2} \omega_i + \frac{R_2 M^2}{\sigma L_1 L_2^2} \omega_r - \frac{R_{12} R_2 M}{\sigma L_1 L_2} \cdot \frac{i_q^*}{\phi_{2d}^*}$$

where,
- $\Delta\theta_v$: Compensation quantity to inverter output voltage phase angle
- $V_{dc}$: DC link voltage
- $\Delta V_{dc}$: Fluctuating quantity of DC link voltage
- s: Laplace operator
- $\theta_v$: Phase angle of inverter output voltage
- $R_1$: Primary resistance of induction motor
- $R_2$: Secondary resistance of inductor motor
- $L_1$: Primary self-inductance of induction motor
- $L_2$: Secondary self-inductance of induction motor
- M: Mutual inductance of induction motor
- $R_{12}$: $R_{12} = R_1 + (R_2 \cdot M^2 / L_2^2)$
- σ: $\sigma = 1 - M^2 / (L_1 \cdot L_2)$
- $\omega_i$: Output angular frequency of inverter
- $\omega_r$: Velocity (angular frequency) of induction motor
- $i_q^*$: q-axis primary current command value
- $\phi_{2d}^*$: d-axis secondary magnetic flux command value Further, by adding this compensation quantity $\Delta\theta_v$ to phase angle of output voltage of inverter 4 to phase angle reference $\theta_v^*$ of dq-axis output voltage which is an output of coordinate system converter 16, phase angle $\theta_v$ of output voltage of inverter 4 is computed.

In addition, by adding this output voltage phase angle $\theta_v$ of inverter 4 to phase reference $\theta_i^*$ which is the phase reference of d-axis of dq-axis rotatory coordinate system to a stationary coordinate a-axis, final phase angle $\theta_i$ of output voltage of inverter 4 is computed.

Then, in gate controller 17 gate signal to inverter 4 is generated based on output voltage phase angle $\theta_i$ of inverter 4.

Next, the action of the power conversion system of this embodiment in the construction described above will be explained.

In general, characteristics of induction motor 6 on the dq-axis rotatory coordinate system are described as shown by equations (13), (14).

Further, generated torque Tm is expressed by an equation (15).

$$s \begin{bmatrix} i_d \\ i_q \\ \phi_{2d} \\ \phi_{2q} \end{bmatrix} = \frac{-A}{\sigma L_1} \begin{bmatrix} i_d \\ i_q \\ \phi_{2d} \\ \phi_{2q} \end{bmatrix} + \frac{1}{\sigma L_1} \begin{bmatrix} V_d \\ V_q \\ O \\ O \end{bmatrix} \quad (13)$$

$$A = \begin{bmatrix} R_{12} & -\omega_i \sigma L_1 & -MR_2/L_2^2 & -\omega_r M/L_2 \\ \omega_i \sigma L_1 & R_{12} & \omega_r M/L_2 & -MR_2/L_2^2 \\ -R_2 M \sigma L_1/L_2 & O & R_2 \sigma L_1/L_2 & -\omega_s \sigma L_1 \\ O & -R_2 M \sigma L_1/L_2 & \omega_s \sigma L_1 & R_2 \sigma L_1/L_2 \end{bmatrix} \quad (14)$$

$$T_m = \frac{M}{L_2}(i_q \cdot \phi_{2d} - i_d \cdot \phi_{2q}) \quad (15)$$

When the d-axis is selected so as to agree with the secondary magnetic flux axis, q-axis component $\phi_{2q}$ of the secondary magnetic flux becomes zero, and rotational velocity $\omega_i$ of the coordinate agrees with the rotational velocity $\omega_\phi$ of the secondary magnetic flux.

Therefore, equations (13)–(15) can be converted to equations shown below.

$$s \begin{bmatrix} i_d \\ i_q \\ \phi_{2d} \end{bmatrix} = \frac{-A'}{\sigma L_1} \begin{bmatrix} i_d \\ i_q \\ \phi_{2d} \end{bmatrix} + \frac{1}{\sigma L_1} \begin{bmatrix} V_d \\ V_q \\ O \end{bmatrix} \quad (16)$$

$$A' = \begin{bmatrix} R_{12} & -\omega_\phi \sigma L_1 & -MR_2/L_2^2 \\ \omega_\phi \sigma L_1 & R_{12} & \omega_r M/L_2 \\ -R_2 M \sigma L_1/L_2 & O & R_2 \sigma L_1/L_2 \end{bmatrix} \quad (17)$$

$$T_m = \frac{M}{L_2} \cdot i_q \cdot \phi_{2d} \quad (18)$$

Here, a mean value of each state quantity on the dq-axis rotatory coordinate system is expressed with "-" assigned and a fluctuation quantity of each state quantity is expressed with "Δ" assigned.

$$i_d = \bar{i}_d + \Delta i_d \quad V_d = \bar{V}_d + \Delta V_d$$

$$i_q = \bar{i}_q + \Delta i_q \quad V_q = \bar{V}_q + \Delta V_q$$

$$\phi_{2d} = \bar{\phi}_{2d} + \Delta\phi_{2d} \quad T_m = \bar{T}_m + \Delta T_m \tag{19}$$

State equations relating to fluctuation quantities will become as shown below.

$$s \begin{bmatrix} \Delta i_d \\ \Delta i_q \\ \Delta \phi_{2d} \end{bmatrix} = \frac{-A'}{\sigma L_1} \begin{bmatrix} \Delta i_d \\ \Delta i_q \\ \Delta \phi_{2d} \end{bmatrix} + \frac{1}{\sigma L_1} \begin{bmatrix} \Delta V_d \\ \Delta V_q \\ 0 \end{bmatrix} \tag{20}$$

$$\Delta T_m = \frac{M}{L_2}(\bar{i}_q \cdot \Delta\phi_{2d} + \Delta i_q \cdot \bar{\phi}_{2d}) \tag{21}$$

By solving equation (20) with respect to fluctuation quantity $\Delta\phi_{2d}$ of the d-axis secondary magnetic flux and fluctuation quantity $\Delta i_q$ of torque current and by substituting the solution into equation (21), it is possible to express torque fluctuation quantity $\Delta T_m$ by dq-axis output voltage fluctuation quantities $\Delta V_d$, $\Delta V_q$.

$$\Delta T_m = \frac{M}{\sigma L_1 L_2 det(A')}(-N(s)\Delta V_d + D(s)\Delta V_q) \tag{22}$$

$$N(s) = b_1 s + b_0$$

$$D(s) = s^2 + a_1 s + a_0 \tag{23}$$

$$b_1 = \omega_\phi - \frac{R_2 M}{L_2} \cdot \frac{\bar{i}_q}{\bar{\phi}_{2d}} \tag{24}$$

$$b_0 = \frac{\omega_r R_2 M^2}{\sigma L_1 L_2{}^2} + \frac{\omega_\phi R_2}{L_2} - \frac{R_{12} R_2 M}{\sigma L_1 L_2} \cdot \frac{\bar{i}_q}{\bar{\phi}_{2d}}$$

$$a_1 = \frac{R_{12}}{\sigma L_1} + \frac{R_2}{L_2}$$

$$a_0 = \frac{R_1 R_2}{\sigma L_1 L_2} + \frac{\omega_\phi R_2 M}{L_2} \cdot \frac{\bar{i}_q}{\bar{\phi}}$$

Assuming that the torque fluctuation is zero, the relationship between fluctuation quantities $\Delta V_q$ and $\Delta V_q$ of the dq-axis output voltages is calculated.

$$\Delta T_m = 0 \tag{25}$$

$$\Delta V_q = H_4(s) \Delta V_d \tag{26}$$

$$H_4(s) = \frac{N(s)}{D(s)} \tag{27}$$

When the fluctuation quantity $\Delta V_d$ of the d-axis output voltage and the fluctuation quantity $V_q$ of the q-axis output voltage take the relationship as shown by the above equation, it becomes possible to suppress torque ripple.

Figure 12:
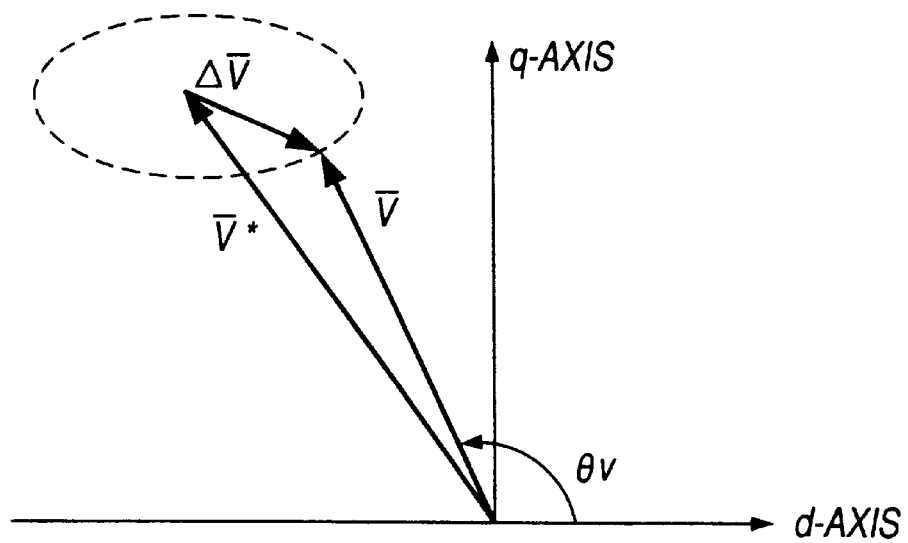
FIG. 12 is a diagram illustrating an example of a vector of an output voltage of the inverter in dq-axis rotatory coordinate system.

Next, the relationship between the dq-axis output voltage fluctuation quantities $\Delta V_q$, $\Delta V_q$ and output voltage vector $\vec{V}$ is derived (hereinafter, the vector symbol $\therefore$ is omitted). FIG. 12 illustrates output voltage vector V of inverter 4 on the dq-axis rotatory coordinate system. Assuming that the d-axis, that is the secondary magnetic flux axis is a real axis and the q-axis is an imaginary axis, voltage vector V can be expressed by the following equation. Where, $\sqrt{2/3}$ is a coefficient of conversion to the dq-axis.

$$\vec{V} = \sqrt{\frac{2}{3}} V_{dc} e^{j\theta_v} \tag{28}$$

Where, $V_{dc}$ is DC link voltage and $\theta_v$ indicates phase angle from the d-axis, that is, the secondary magnetic flux axis to the output voltage vector. And, $V_{dc}$ and $\theta_v$ are separated to mean value and fluctuation quantity.

Further, subscripts ‾ and Δ indicate mean value and fluctuation quantity, respectively.

$$V_{dc} = \bar{V}_{dc} + \Delta V_{dc}$$

$$\theta_v = \bar{\theta}_v + \Delta\theta_v \tag{29}$$

Regarding vector fluctuation quantity ΔV, the following equation holds good from dq-axis output voltage vector V indicated by equation (28).

$$\Delta\vec{V} = \sqrt{\frac{2}{3}}(\Delta V_{dc} e^{j\theta_v} + j V_{dc} e^{j\theta_v} \Delta\theta_v) \tag{30}$$

Vector fluctuation quantity ΔV of voltage vector expressed by equation (30) is indicated by fluctuation quantities $\Delta V_d$, $\Delta V_q$ of dq axis output voltages by equation (32).

$$\begin{pmatrix} \Delta V_d \\ \Delta V_q \end{pmatrix} = \begin{pmatrix} REAL(\Delta\vec{V}) \\ IMAG(\Delta\vec{V}) \end{pmatrix} = \sqrt{\frac{2}{3}} \begin{pmatrix} \cos\theta_v & -\sin\theta_v \\ \sin\theta_v & \cos\theta_v \end{pmatrix} \begin{pmatrix} \Delta V_{dc} \\ V_{dc} \Delta\theta_v \end{pmatrix} \tag{32}$$

Equation (32) indicates that the dq-axis voltages are affected by fluctuation quantity $\Delta V_{dc}$ of the DC link voltage. Also, it is indicated that the dq-axis voltages can be controlled by controlling output voltage phase angle $\theta_v$.

When the fluctuation quantities of dq-axis output voltages expressed by equation (32) satisfy the conditional equation shown by equation (26), it is possible to suppress torque ripple.

Then, by substituting equation (32) into equation (26), compensation quantity $\Delta\theta_v$ is derived.

$$\Delta\theta_v = H_1(s) \frac{\Delta V_{dc}}{V_{dc}} \tag{33}$$

$$H_1(s) = \frac{d_2 s^2 + d_1 s + d_0}{c_2 s^2 + c_1 s + c_0} \tag{34}$$

$$c_2 = \cos\theta_v \quad d_2 = -\sin\theta_v \tag{35}$$

$$c_1 = a_1\cos\theta_v + b_1\sin\theta_v \quad d_1 = b_1\cos\theta_v - a_1\sin\theta_v$$

$$c_0 = a_0\cos\theta_v + b_0\sin\theta_v \quad d_0 = b_0\cos\theta_v - a_0\sin\theta_v$$

Then, by adding compensation quantity $\Delta\theta_v$ computed from equation (33) to output voltage phase angle reference value $\theta_v{}^*$ output voltage phase angle $\theta_v$ of inverter 4 is computed.

$$\theta_v = \theta_v{}^* + \Delta\theta_v \tag{36}$$

Equations (1), (2), (3) and (4) described above agree with equations (33), (34), (35) and (24), respectively.

However, equations (4) and (24) differ in that a variable used in the computation is a command value or a mean value.

However, assuming that a response agreed with command values is obtained in performing the vector control, both a mean value and a command are considered to be equivalent.

Further, the reason for replacing the rotational frequency of the secondary magnetic flux with output frequency of inverter 4 is because the fluctuation of the secondary magnetic flux is much smaller than the fluctuation of the exciting current, and the secondary magnetic flux is almost constant on the dq-axis coordinate system, and therefore, the rotational frequency of the secondary magnetic flux agrees with the output frequency of inverter 4, which is the dq-axis rotational frequency.

From the above, it can be seen that the torque is controllable at a constant level by controlling phase angle $\theta_v$ of output voltage of inverter 4.

As described above, on the power conversion system of this embodiment, it becomes possible to suppress pulsation of torque current as phase angle $\theta_v$ of output voltage of inverter 4 is controlled.

Further, though the exciting current fluctuates, the secondary magnetic flux does not follow it. Therefore, as the secondary magnetic flux is almost at a constant level, the torque generating from induction motor 6 is also constant and it becomes possible to suppress the torque ripple.

That is, as compensation quantity $\Delta\theta_v$ for the phase angle of the output voltage of inverter 4 is derived in order according to the theoretical basis, it becomes possible to suppress torque pulsation without requiring an adjustment under any operating state or for any control objects.

Further, in the vector control as vectors are controlled by bringing the d-axis in accord with secondary magnetic flux axis, it is easily achieved to find the secondary magnetic flux axis without newly detecting or computing a magnetic flux axis and thus, it becomes possible to make the adjustment on an actual machine.

Thus, it is possible to expect reduction of noise and drop of failure rate of mechanical and electrical systems.

Further, when this embodiment is applied to induction motors for driving electric vehicles, the riding comfort can be improved.

Further, the present invention makes the compensation in order according to the compensation quantity that is theoretically obtained, and it is therefore possible to suppress torque ripple under any operating state or for any control objects that have different parameters. So, it is possible to sharply reduce time and labor required for adjustment.

Figure 2:
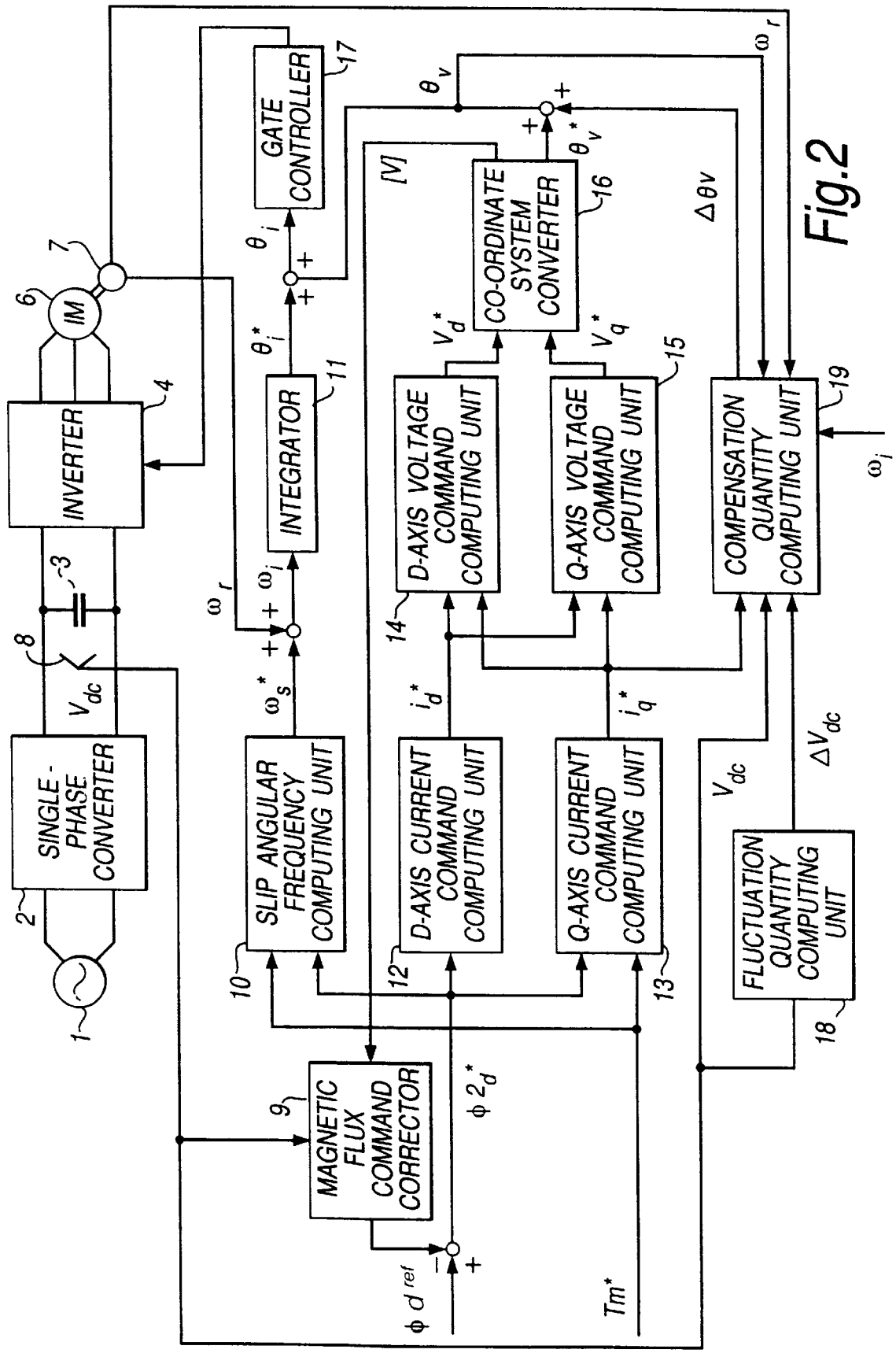
FIG. 2 is a block diagram illustrating an example of a schematic construction of a power conversion system according to a second embodiment of this invention.

FIG. 2 is a block diagram illustrating an example of a schematic construction of a power conversion system according to a second embodiment of this invention. The same portions as shown in FIG. 1 will be assigned with the same reference numerals and the explanations thereof are omitted and only different portions will be described here.

On the power conversion system according to this embodiment, only the construction of that portion to compute compensation quantity $\Delta\theta_v$ for a phase angle of the output voltage of inverter 4 differs from that shown in the first embodiment.

That is, in FIG. 2 compensation quantity computing unit 19 calculates compensation quantity $\Delta\theta_v$ for a phase angle of the output voltage of inverter 4 according to equations (5)–(8) by inputting DC link voltage $V_{dc}$, fluctuation quantity $\Delta V_{dc}$ of DC link voltage $V_{dc}$, output angular frequency $\omega_i$ of inverter 4, velocity (angular frequency) $\omega_r$ of induction motor 6 and phase angle $\theta_v$ of output voltage of inverter 4.

$$\Delta\theta_v = H_2(s)\frac{\Delta V_{dc}}{V_{dc}} \quad (5)$$

$$H_2(s) = \frac{d_2 s^2 + d_1 s + d_0}{c_2 s^2 + c_1 s + c_0} \quad (6)$$

$c_2 = \cos\theta_v$ $c_1 = a_1\cos\theta_v + b_1\sin\theta_v$ $c_0 a_0\cos\theta_v + b_0\sin\theta_v$ $d_2 = -\sin\theta_v$ $d_1 = b_1\cos\theta_v - a_1\sin\theta_v$ $$d_0 = b_0\cos\theta_v - a_0\sin\theta_v \quad (7)$$

$$a_1 = \frac{R_2}{L_2} + \frac{R_{12}}{\sigma L_1} \quad (8)$$

$$a_0 = \frac{R_1 R_2}{\sigma L_1 L_2}$$

$$b_1 = \omega_i$$

$$b_0 = \frac{R_2}{L_2}\omega_i + \frac{R_2 M^2}{\sigma L_1 L_2^2}\omega_r$$

where, $\Delta\theta_v$: Compensating quantity to inverter output voltage phase angle $V_{dc}$: DC link voltage $\Delta V_{dc}$: Fluctuation quantity of DC link voltage $s$: Laplace operator $\theta_v$: Phase angle of inverter output voltage $R_1$: Primary resistance of induction motor $R_2$: Secondary resistance of induction motor $L_1$: Primary self-inductance of induction motor $L_2$: Secondary self-inductance of induction motor M: Mutual inductance of induction motor $R_{12}$: $R_{12} = R_1 + (R_2 \cdot M^2/L_2^2)$ $\sigma$: $\sigma = 1 - M^2/(L_1 \cdot L_2)$ $\omega_i$: Inverter output angular frequency $\omega_r$: Velocity (angular frequency) of induction motor Further, inverter phase angle $\theta_v$ is computed by adding this compensation quantity $\Delta\theta_v$ to inverter phase angle reference value $\theta_v^*$. Then, by adding this phase angle $\theta_v$ to an output voltage phase angle reference $\theta_i^*$ of inverter 4, output voltage phase angle $\theta_i$ of inverter 4 is computed.

Further, by inputting this inverter phase angle $\theta_i$ to gate controller 17, a switching command is output to inverter 4.

Next, the action of the power conversion system of this embodiment in the above construction will be explained.

In connection with d-axis secondary magnetic flux fluctuation quantity $\Delta\phi_{2d}$ which affects torque ripple $\Delta T_m$, a following equation is derived from equation (20).

$$\Delta\phi_{2d} = \frac{1}{L_2/R_2 s + 1} M \cdot \Delta i_d \quad (37)$$

$L_2/R_2$ which is called a secondary time constant is several hundred milliseconds on ordinary induction motor 6.

And, even when exciting current $i_d$ fluctuates at such a frequency as 100 Hz or 120 Hz which is two times of the frequency of single phase power source 1, a fluctuation quantity $\Delta\phi_{2d}$ of secondary magnetic flux $\Delta\phi_{2d}$ is extremely small.

Therefore, assuming that the torque ripple depends on the torque current ripple only, it is possible to reduce the torque ripple by suppressing the torque current ripple.

$$\Delta T_m \cong \frac{M}{L_2} \cdot \bar{\phi}_{2d} \cdot \Delta i_q \qquad (38)$$

A condition for suppressing the torque current ripple is as shown by the following equation.

$$\Delta i_q = 0 \qquad (39)$$

When equation (20) is solved with respect to torque current fluctuation quantity $\Delta i_q$ and is substituted in equation (39), the relationship between fluctuation quantity $\Delta V_d$ of the d-axis output voltage and fluctuation quantity $\Delta V_q$ of the q-axis output voltage is derived.

$$\Delta V_q = H_5(s) \cdot \Delta V_d \qquad (40)$$

$$H_5(s) = \frac{b_1 s + b_0}{s^2 + a_1 s + a_0} \qquad (41)$$

$$a_1 = \frac{R_2}{L_2} + \frac{R_{12}}{\sigma L_1} \quad b_1 = \omega_\phi \qquad (42)$$

$$a_0 = \frac{R_1 R_2}{\sigma L_1 L_2} \quad b_0 = \frac{R_2}{L_2}\omega_\phi + \frac{\omega_r R_2 M^2}{\sigma L_1 L_2^2}$$

When fluctuation quantity $\Delta V_d$ of the d-axis output voltage and fluctuation quantity $\Delta V_q$ of the q-axis output voltage are in the relationship as shown by equation (40), it is possible to reduce the torque current ripple.

Then, when the above equation (40) is replaced with equation (26) of the first embodiment, equations (5) through (8) are derived.

Subsequent explanation is the same as that described for the first embodiment, and it is therefore omitted here.

As described above, on the power conversion system of this embodiment, it is possible to obtain the same effect as that of the power conversion system of the first embodiment.

In addition, as change in the magnetic flux is small as described above, it becomes possible to suppress the torque ripple.

Further, when compared with the power conversion system of the first embodiment, as the processing quantities by compensation quantity computing unit 19 can be reduced, it becomes possible to realize the torque ripple suppression by using a CPU having a low processing capability.

Figure 3:
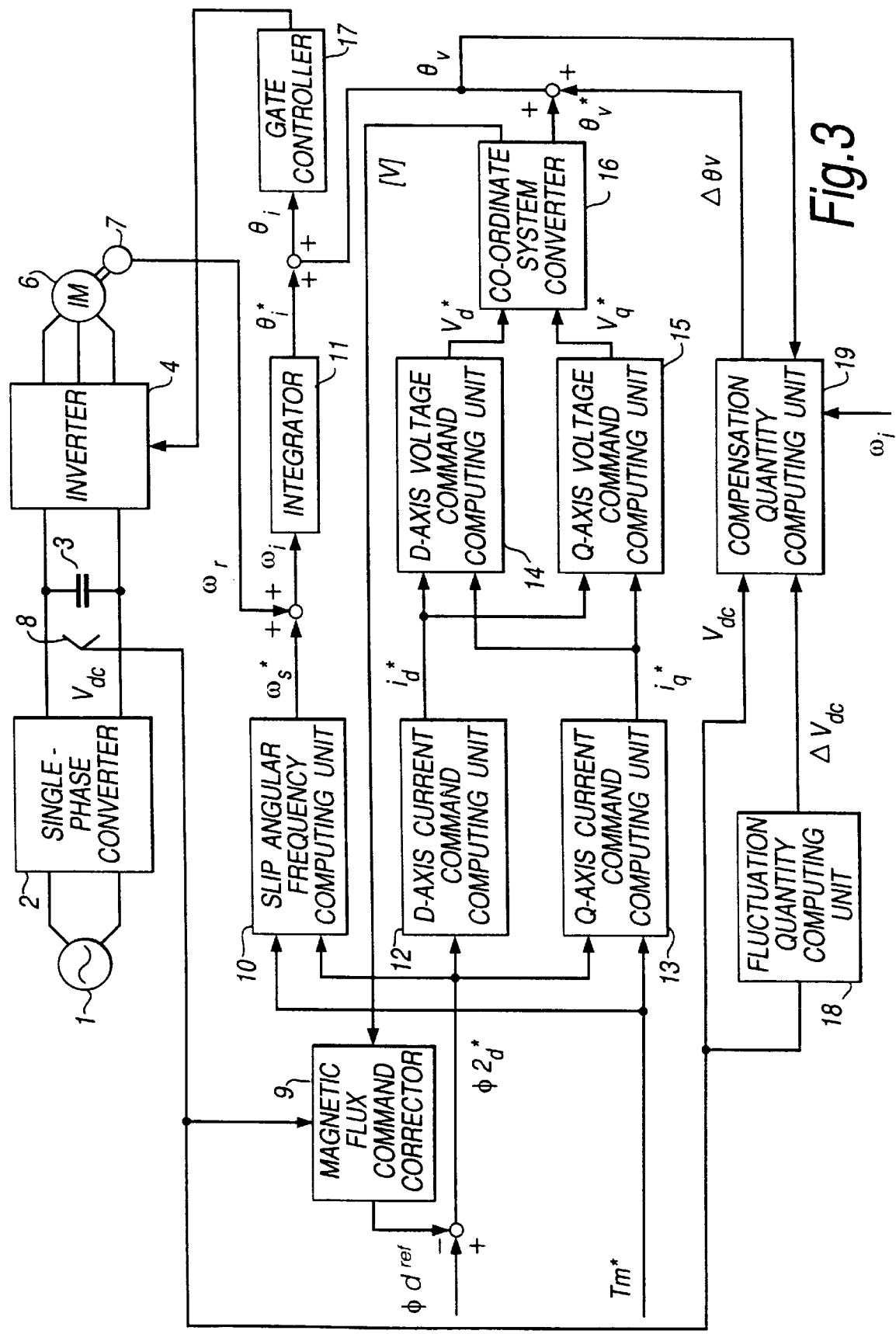
FIG. 3 is a block diagram illustrating an example of a schematic construction of a power conversion system according to a third embodiment of this invention.

FIG. 3 is a block diagram illustrating an example of a schematic construction of a power conversion system according to a third embodiment of this invention. The same portions as those shown in FIG. 1 are assigned with the same numerical references and the explanation thereof are omitted and different portions only will be describe here.

On the power conversion system according to this embodiment, only the construction of the portion to compute compensation quantity $\Delta\theta_v$ for a phase angle of the output voltage of inverter 4 differs from that in the first embodiment.

That is, in FIG. 3, compensation quantity computing unit 19 calculates compensation quantity $\Delta\theta_v$ according to equations (9)–(12) by inputting DC link voltage $V_{dc}$, fluctuation quantity $\Delta V_{dc}$ of DC link voltage $V_{dc}$, output angular frequency $\omega_i$ of inverter 4 and phase angle $\theta_v$ of output voltage.

$$\Delta\theta_v = H_3(s)\frac{\Delta V_{dc}}{V_{dc}} \qquad (9)$$

$$H_3(s) = \frac{d_1 s + d_0}{c_1 s + c_0} \qquad (10)$$

$$c_1 = \cos\theta_v$$

$$c_0 a_0 \cos\theta_v + b_0 \sin\theta_v$$

$$d_1 = -\sin\theta_v$$

$$d_0 = b_0 \cos\theta_v - a_0 \sin\theta_v \qquad (11)$$

$$a_0 = \frac{R_{12}}{\sigma L_1} \qquad (12)$$

where, $\Delta\theta_v$: Compensating quantity to inverter output voltage phase angle $V_{dc}$: DC link voltage $\Delta V_{dc}$: Fluctuation quantity of DC link voltage s: Laplace operator $\theta_v$: Inverter output voltage phase angle $R_1$: Primary resistance of induction motor $R_2$: Secondary resistance of induction motor $L_1$: Primary self-inductance of induction motor $L_2$: Secondary self-inductance of induction motor M: Mutual inductance of induction motor $R_{12}$: $R_{12} = R_1 + (R_2 \cdot M^2/L_2^2)$ $\sigma: \sigma = 1 - M^2/(L_1 \cdot L_2)$ $\omega_1$: Inverter output angular frequency Further, inverter phase angle $\theta_v$ is computed by adding compensation quantity $\Delta\theta_v$ to inverter phase angle reference value $\theta_i^*$. Then, by adding this phase angle $\theta_v$ to inverter phase angle reference value $\theta_i^*$, inverter phase angle $\theta_i$ is computed.

Further, by inputting this inverter phase angle $\theta_i$ to gate controller 17, a switching command is output to inverter 4.

Next, the action of the power conversion system of this embodiment in the above construction will be explained.

As described above, the fluctuation of the d-axis secondary magnetic flux is small, and therefore, such an assumption as shown by the following equation is added to a state equation of equation (20).

$$\Delta\phi_{2d} = 0 \qquad (43)$$

In this case, a state equation relating to dq-axis current fluctuation quantities will become the following equations by deforming equation (20).

$$s\begin{pmatrix} \Delta i_d \\ \Delta i_q \end{pmatrix} = \frac{-A_3}{\sigma L_1}\begin{pmatrix} \Delta i_d \\ \Delta i_q \end{pmatrix} + \frac{1}{\sigma L_1}\begin{pmatrix} V_d \\ V_q \end{pmatrix} \qquad (44)$$

$$A_3 = \begin{pmatrix} R_{12} & -\omega_\phi \sigma L_1 \\ \omega_\phi \sigma L_1 & R_{12} \end{pmatrix} \qquad (45)$$

As the fluctuation of the secondary magnetic flux is small, assuming that the torque ripple depends on the torque current ripple only, it is possible to reduce the torque ripple by suppressing the torque current ripple.

$$\Delta T_m \cong \frac{M}{L_2} \cdot \bar{\phi}_{2d} \cdot \Delta i_q \quad (46)$$

A condition for suppressing the torque current ripple is as shown by the following equation.

$$\Delta i_q = 0 \quad (47)$$

When solving equation (44) in connection with fluctuation quantity $\Delta i_q$ of torque current and substituting the resolution in the above equation, related equations of fluctuation quantity $\Delta V_d$ of d-axis output voltage and fluctuation quantity $\Delta V_q$ of q-axis output voltage are obtained as follows.

$$\Delta V_q = H_6(s) \Delta V_d \quad (48)$$

$$H_6(s) = \frac{b_0}{s + a_0} \quad (49)$$

$$a_0 = \frac{R_2}{\sigma L_1} \quad (50)$$

$$b_0 = \omega_\phi$$

From the above equations, the relationship between d-axis voltage fluctuation quantity $\Delta V_d$ and q-axis voltage fluctuation quantity $\Delta V_q$ for making fluctuation of the torque current zero is obtained.

By substituting equation (32) in the above equations, the relationship between fluctuation quantity $\Delta V_{dc}$ of DC link voltage $V_{dc}$ and compensation quantity $\Delta \theta_v$ is obtained.

$$\Delta \theta_v = H_3(s) \frac{\Delta V_{dc}}{V_{dc}} \quad (51)$$

$$H_3(s) = \frac{d_1 s + d_0}{c_1 s + c_0} \quad (52)$$

$$c_1 = \cos\theta_v$$

$$c_0 = a_0 \cos\theta_v + b_0 \sin\theta_v$$

$$d_1 = -\sin\theta_v$$

$$d_0 = b_0 \cos\theta_v - a_0 \sin\theta_v \quad (53)$$

Equations (9), (10), (11) and (12) are in accord with equations (51), (52), (53) and (50), respectively.

However, equations (12) and (50) differ in that a variable used in the computation is a command value or a mean value. However, assuming that a response agreed with a command value is obtained in performing the vector control, both a mean value and a command are considered to be equivalent.

Further, the reason for replacing the rotational frequency of the secondary magnetic flux with the output frequency of inverter 4 is because the fluctuation of the secondary magnetic flux is very smaller than the fluctuation of the exciting current and the secondary magnetic flux is almost constant on the dq-axis coordinate system, and therefore, the rotational frequency of the secondary magnetic flux agrees with the output frequency of inverter 4, which is the dq-axis rotational frequency.

As described above, on the power conversion system of this embodiment, it is possible to obtain the same effect as that of the power conversion system of the second embodiment described above.

Further, as the fluctuation of the secondary magnetic flux is not taken into consideration in this case, it is not possible to suppress the fluctuation of the torque current as strictly as the power conversion system of the second embodiment, but the order of compensating transfer function drops by one.

Thus, as the processing quantities can be reduced, it becomes possible to realize the suppression of the torque ripple easily using a CPU having a lower processing capability.

Figure 4:
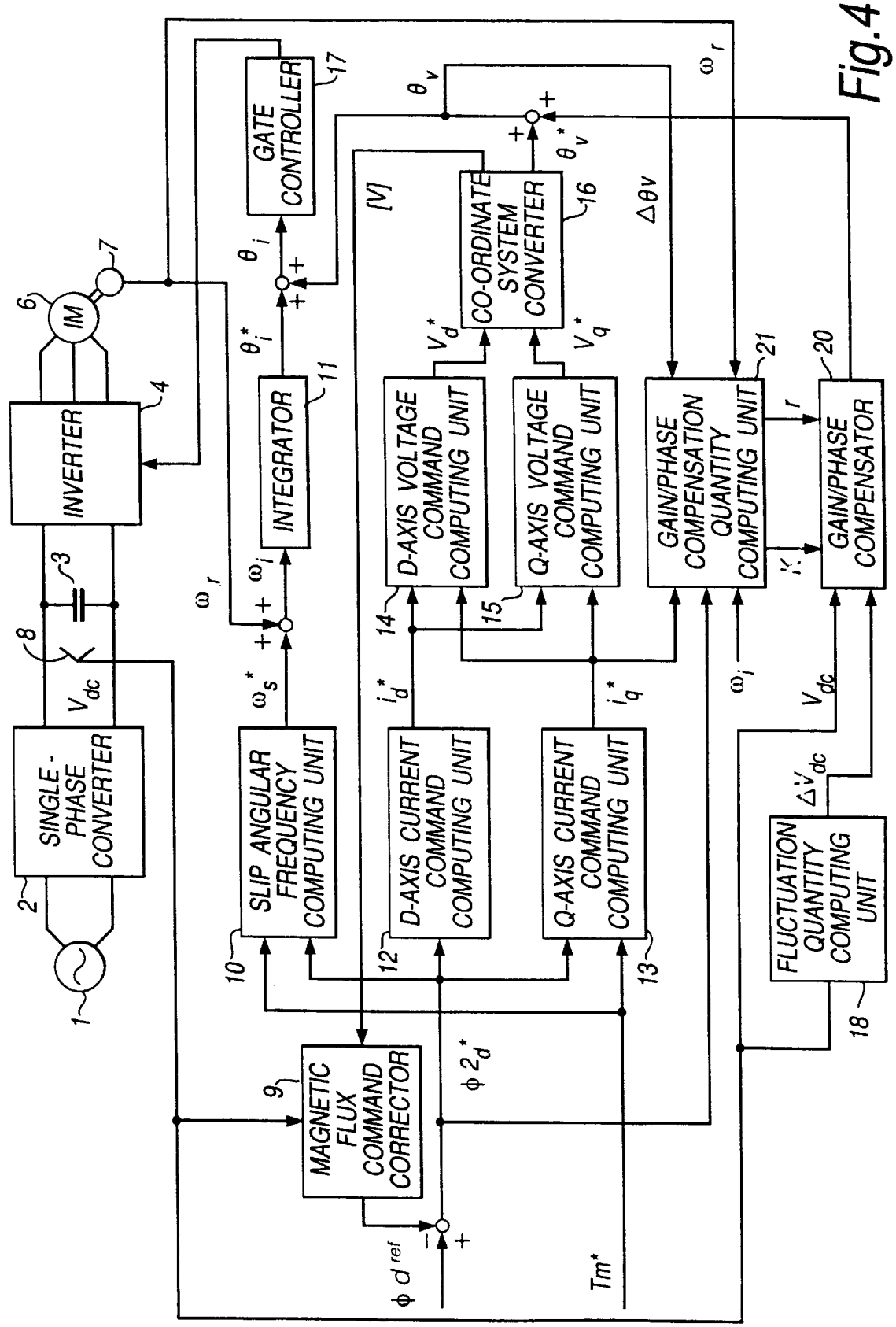
FIG. 4 is a block diagram illustrating an example of a schematic construction of a power conversion system according to a fourth embodiment of this invention.

FIG. 4 is a block diagram illustrating an example of a schematic construction of a power conversion system according to a fourth embodiment of this invention. The same portions as those shown in FIG. 1 are assigned with the same reference numerals and the explanation thereof is omitted and different portions only will be explained here.

On the power conversion system according to this embodiment, only the construction of the portion to compute compensation quantity $\Delta \theta_v$ for a phase angle of the output voltage of inverter 4 differs from that in the first embodiment.

That is, in FIG. 4 a gain/phase compensation quantity computing unit 21 computes a gain compensating value K and a phase compensating value $\gamma$ according to following equations (54)–(55) by inputting q-axis primary current command value $i_q^*$, d-axis secondary magnetic flux command value $\phi_{2d}^*$, output angular frequency $\omega_i$ of inverter 4, output voltage phase angle $\theta_v$, and velocity (angular velocity) $\omega_r$ of induction motor 6.

Here, gain compensating value K is a gain of a fluctuating frequency component of DC link voltage $V_{dc}$ of a compensating transfer function expressed by equation (2) in the first embodiment, that is, a gain of the frequency component of a frequency that is two times of supply frequency.

Further, phase compensating value $\gamma$ is a phase of the frequency component of the compensating transfer function.

$$K = |H_1(2j\omega_{so})| \quad (54)$$

$$\gamma = arg\{H_1(2j\omega_{so})\} \quad (55)$$

On the other hand, in fluctuation quantity computing unit 18, a sine wave $\Delta V_{dc}$ that fluctuates at a frequency that is two times of supply frequency is extracted by inputting detected or estimated DC link voltage $V_{dc}$.

Further, in gain/phase compensator 20, a sine wave is generated by modifying a sine wave which is fluctuation quantity $\Delta V_{dc}$ of DC link voltage $V_{dc}$ by compensating gain K of equation (54) and compensating phase difference $\gamma$ of equation (55).

Assuming that, for instance, detected fluctuating sine wave $\Delta V_{dc}$ of DC link voltage $V_{dc}$ is as shown by an equation (56), the sine wave generated by gain/phase compensator 20 becomes as shown by an equation (57).

$$\Delta V_{dc} = \Delta V \sin(2\omega_{so} t + \psi) \quad (56)$$

$$K \cdot \Delta V \sin(2\omega_{so} t + \psi + \gamma) \quad (57)$$

Here, $\Delta V$ is an amplitude of the fluctuation of DC link voltage $V_{dc}$, and $\phi$ is an initial angle of the fluctuation of DC link voltage $V_{dc}$.

Further, the sine wave generated in gain/phase compensator 20 expressed by equation (57) is divided by DC link voltage $V_{dc}$ and compensation quantity $\Delta \theta_v$ for the phase angle of the output voltage of inverter 4 is computed.

Accordingly, on the power conversion system of this embodiment, it is possible to obtain the same effect as in the power conversion system of the first embodiment.

Further, as a dynamic computation is not included in the compensation quantity computing process when compared with the power conversion system of the first embodiment, it is not required to store the past computation results and it becomes possible to reduce the storage capacity.

In addition, it also becomes possible to further improve control stability.

Further, although this embodiment is described on the basis of the first embodiment, it is possible to obtain the same action and effect even when this embodiment is based on the second embodiment or the third embodiment.

Figure 5:
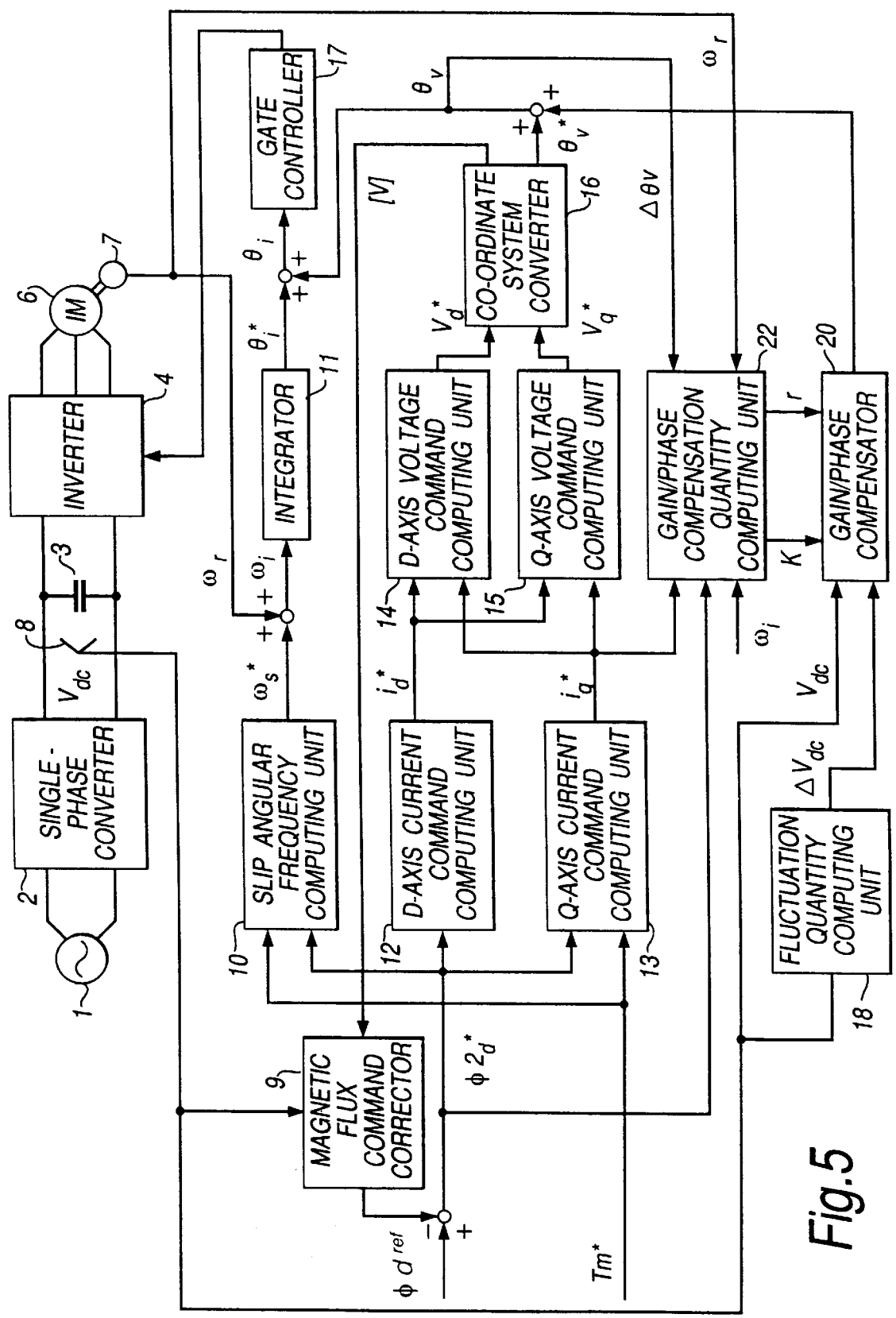
FIG. 5 is a block diagram illustrating an example of a schematic construction of a power conversion system according to a fifth embodiment of this invention.

FIG. 5 is a block diagram illustrating an example of a schematic construction of a power conversion system according to a fifth embodiment of this invention. The same elements as those shown in FIG. 1 are assigned with the same numerical references and the explanation thereof is omitted, and only different portions will be explained here.

In the power conversion system according to this embodiment, only the construction of the portion to perform the computation of compensation quantity $\Delta\theta_v$ for a phase angle of the output voltage of inverter 4 differs from that in the first embodiment.

That is, in FIG. 5, in a gain/phase compensating quantity reference unit 22, gain compensating value K and phase compensating value γ are calculated by inputting q-axis primary current command value $i_q^*$, d-axis secondary magnetic flux command value $\phi_{2d}^*$, output angular frequency $\omega_i$ of inverter 4, output voltage phase angle $\theta_v$ and velocity (angular velocity) Or of induction motor 6.

Here, gain compensating value K and phase compensating value γ are calculated in advance by the combination of input parameters as described above, and are tabulated. By input parameters, these tabulated values K and γ are read out, and therefore, they are not calculated in realtime. Output values of gain/phase compensation quantity reference unit 22 are computed according to equations (1)–On the other hand, in fluctuation quantity computing unit 18, a sine wave $\Delta V_{dc}$ that fluctuates at frequency which is two times of supply frequency is extracted by inputting detected or estimated DC link voltage $V_{dc}$.

In addition, in gain/phase compensator 20, a sine wave is generated by modifying a sine wave which is fluctuation quantity $\Delta V_{dc}$ of DC link voltage $V_{dc}$ by compensating gain K and phase difference γ read out of gain/phase compensation quantity reference unit 22.

When assuming that, for instance, detected fluctuating sine wave $\Delta V_{dc}$ of DC link voltage $V_{dc}$ is expressed by equation (56), the sine wave generated by gain/phase compensator 20 will become as shown by equation (57).

Further, compensation quantity $\Delta\theta_v$ for the phase angle of the output voltage of inverter 4 is computed by dividing the sine wave generated in gain/phase compensator 20 expressed by this equation (57) by DC link voltage $V_{dc}$.

Accordingly, on the power conversion system of this embodiment, it is possible to obtain the same effect as that of the power conversion system of the first embodiment.

Further, when compared with the power conversion system of the first embodiment, a dynamic computation is not included in the compensation quantity computing process, so it is not required to the store past computation results and it becomes possible to reduce the storage capacity.

In addition, when compared with the power conversion system of the fourth embodiment, although a certain large storage region is required for retaining the table, the compensation quantity computing process can be limited to the table reading process only, and therefore it is no longer required to compute gain and phase compensating values for each control.

Thus, as the processing quantities can be reduced, it becomes possible to further improve the control response using a CPU having a lower processing capability.

Further, although this embodiment is described on the basis of the first embodiment, it is possible to obtain the same action and effect even when this embodiment is based on the second embodiment or the third embodiment.

Figure 6:
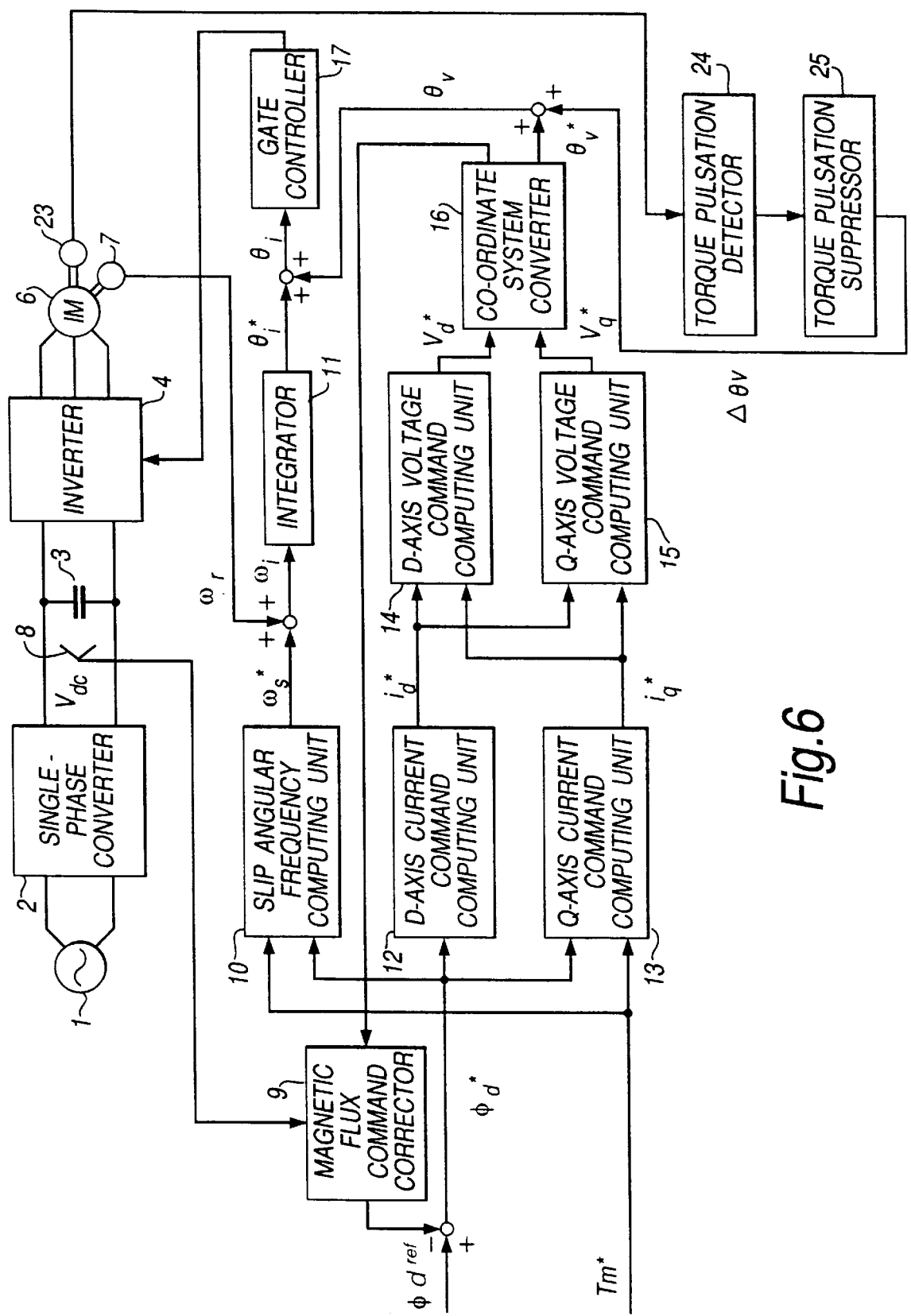
FIG. 6 is a block diagram illustrating an example of a schematic construction of a power conversion system according to a sixth embodiment of this invention.

FIG. 6 is a block diagram illustrating an example of a schematic construction of a power conversion system according to a sixth embodiment of this invention. The same elements as those shown in FIG. 1 are assigned with the same reference numerals and the explanation thereof is omitted, and the differing portions only will be described here.

In the power conversion system according to this embodiment, only the construction of the portion to perform the computation of compensation quantity $\Delta\theta_v$ for a phase angle of the output voltage of inverter 4 differs from that in the first embodiment.

That is, in FIG. 6, a pulsation quantity of the torque generated by induction motor 6 detected by a torque detector 23 is detected by a torque pulsation detector 24.

Further, compensation quantity $\Delta\theta_v$ to output voltage phase angle reference $\theta_v^*$ of inverter 4 is output so as to suppress the pulsation by inputting this torque pulsation quantity to a torque pulsation suppressor 25.

In addition, by adding this compensation quantity $\Delta\theta_v$ to output voltage phase angle reference $\theta_v^*$ of inverter 4, output voltage phase angle $\theta_v$ of inverter 4 is calculated.

Accordingly, on the power conversion system of this embodiment as described above, as torque is directly controlled it is possible to suppress the torque pulsation by acting on the output voltage phase angle of inverter 4 according to the torque pulsation.

Thus, it becomes possible to suppress the pulsation more effectively than the power conversion systems of the first through the fifth embodiments.

Further, it also becomes possible to effectively suppress the torque ripple robustly against error (modeling error) of parameters, disturbance, etc.

Figure 7:
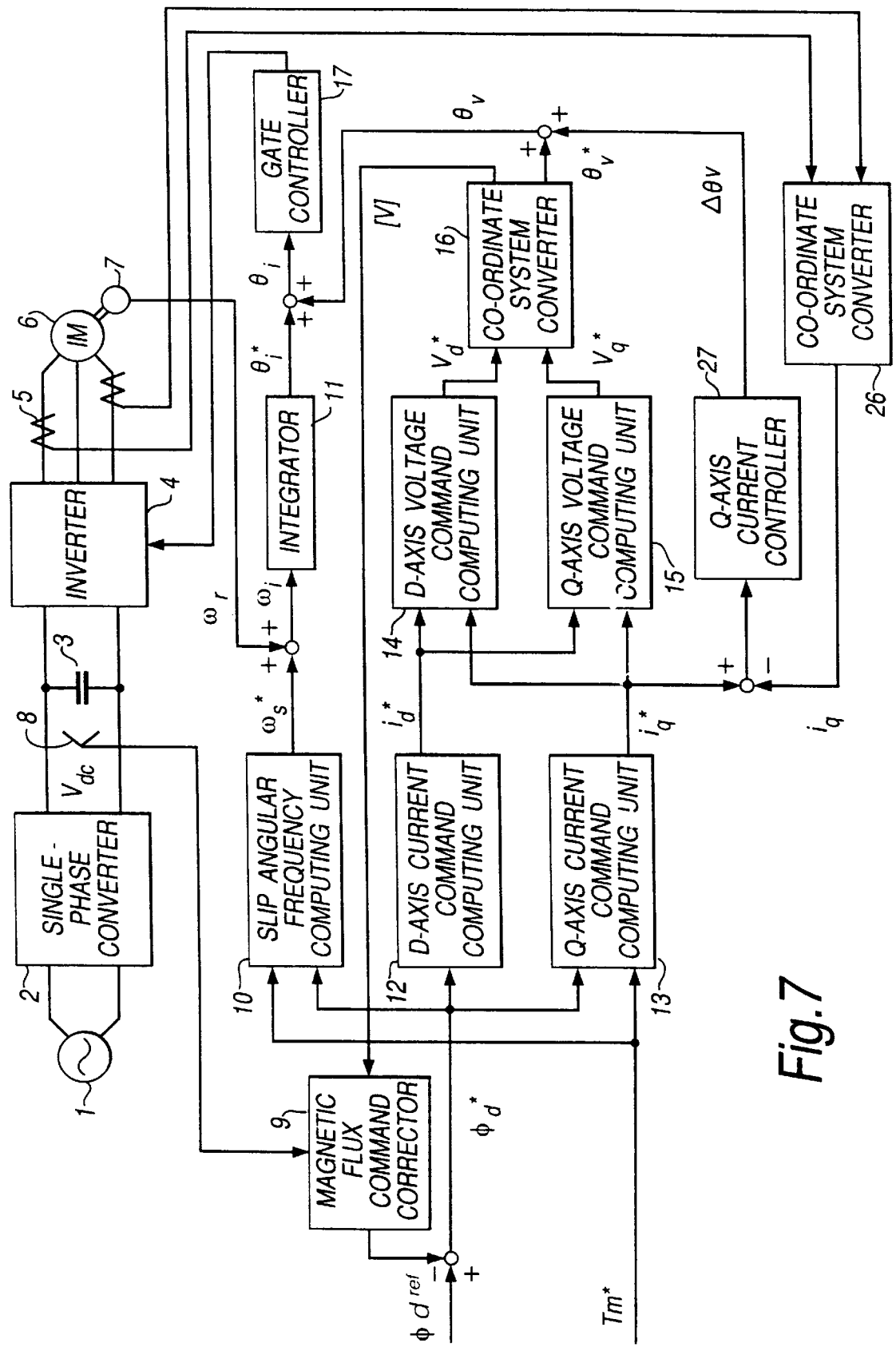
FIG. 7 is a block diagram illustrating an example of a schematic construction of a power conversion system according to a seventh embodiment of this invention.

FIG. 7 is a block diagram illustrating an example of a schematic construction of power conversion system according to a seventh embodiment of this invention. The same elements as those shown in FIG. 1 are assigned with the same reference numerals and the explanation thereof is omitted and only the different portions will be described here.

In the power conversion system according to this embodiment, only the construction of the portion to perform the computation of compensation quantity $\Delta\theta_v$ for a phase angle of the output voltage of inverter 4 differs from that in the first embodiment.

That is, in FIG. 7, phase currents of induction motor 6 are detected by a current detector 5 and are input into a coordinate system converter 26.

Further, coordinate system converter 26 converts three-phase currents to the currents on the dq-axis.

Then, a difference between q-axis primary current command value $i_q^*$ and a q-axis primary current $i_q$ which is the output of coordinate system converter 26 is input to a q-axis current controller 27.

Further, q-axis current controller 27 outputs compensation quantity $\Delta\theta_v$ to output voltage phase angle reference of inverter 4 so as to make the input thereto zero.

In addition, by adding this compensation quantity $\Delta\theta_v$ to output voltage phase angle reference $\theta_v^*$ of inverter 4 to output voltage phase angle reference $\theta_v^*$ of inverter 4, output voltage phase angle $\theta_v$ of inverter 4 is calculated.

In this case, as explained in the power conversion system of the first embodiment, output voltage phase angle θv of inverter 4 is closely related to currents $i_d$ and $i_q$, and therefore, q-axis primary current $i_q$ can be brought in accord with its command value $i_q^*$ by controlling output voltage phase angle $\theta_v$.

Accordingly, on the power conversion system of this embodiment described above, as torque is directly controlled it is possible to suppress the torque pulsation by acting on the output voltage phase angle of inverter 4 according to the torque pulsation.

Further, as explained in the power conversion system of the first embodiment, d-axis secondary magnetic flux is almost constant, and therefore, it becomes possible to suppress the torque pulsation by suppressing the pulsation of q-axis primary current.

Thus, it becomes possible to suppress torque pulsation more effectively than the power conversion systems of the first through the fifth embodiments.

Further, in the power conversion system in the first embodiment, the compensation is of feed forward. But in this embodiment, the compensation is of feed back to directly make the difference between q-axis primary current $i_q$ and its command value $i_q^*$ zero. Therefore, it becomes possible to effectively suppress the torque ripple robustly against error (modeling error) of parameters, disturbance, etc.

Figure 8:
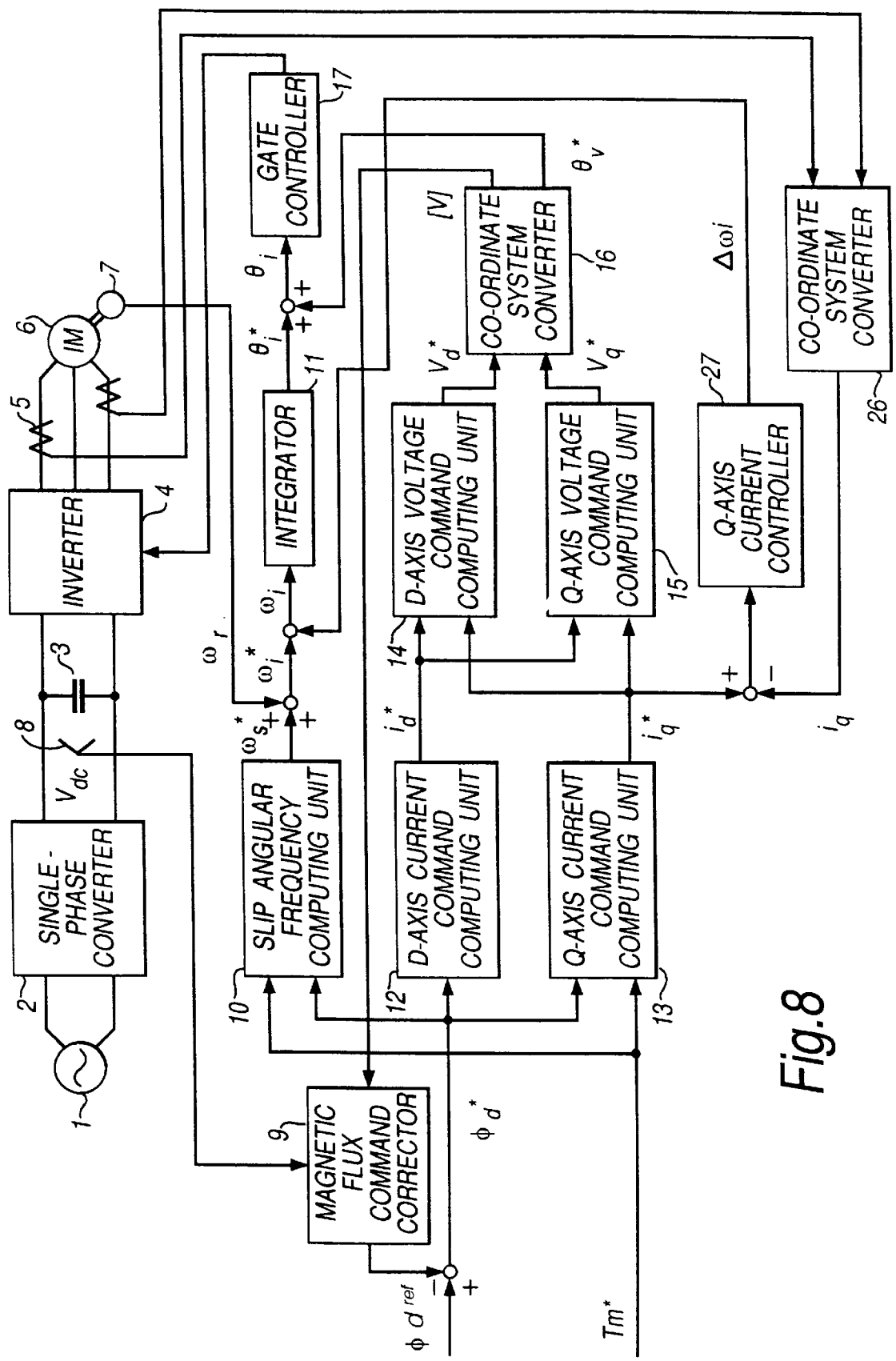
FIG. 8 is a block diagram illustrating an example of a schematic construction of a power conversion system according to an eighth embodiment of this invention.

FIG. 8 is a block diagram illustrating an example of a schematic construction of a power conversion system according to an eighth embodiment of this invention. The same elements as those shown in FIG. 7 are assigned with the same reference numerals and the explanation thereof is omitted and only the different portions will be described here.

In the power conversion system according to this embodiment, only the construction of the output portion of q-axis current controller 27 differs from that in the seventh embodiment.

That is, in FIG. 8 a difference between q-axis primary current $i_q$ and q-axis primary current command value $i_q^*$ is input to q-axis current controller 27, which outputs a compensation quantity $\Delta\omega_i$ to output angular frequency $\omega_i$ of inverter 4 to make this difference zero.

Further, by adding this compensation quantity $\Delta\omega_i$ to output angular frequency reference $\omega_i^*$ of inverter 4, output angular frequency $\omega_i$ of inverter 4 is calculated.

That is, while output voltage phase angle $\theta_v$ of inverter 4 is controlled to compensate by q-axis current controller 27 in the power conversion system of the seventh embodiment, this embodiment differs in that output angular frequency $\omega_i$ of inverter 4 is controlled to compensate.

Accordingly, in the power conversion system in this embodiment, it is possible to obtain the same effect as that of the power conversion system in the seventh embodiment.

Further, as the compensation is made in the computing process of output angular frequency $\omega_i$ of inverter 4, when a conventional software is used, it is possible to incorporate the beatless control without requiring any change in the process from the computation of output voltage phase angle θv of inverter 4 to the gate control portion based on output voltage phase angle $\theta_v$ of inverter 4.

Thus, as portions subsequent to the computing process of output voltage phase angle $\theta_v$ of inverter 4 can be used commonly, it becomes possible to reduce time and cost for developing a software when achieving it.

Figure 9:
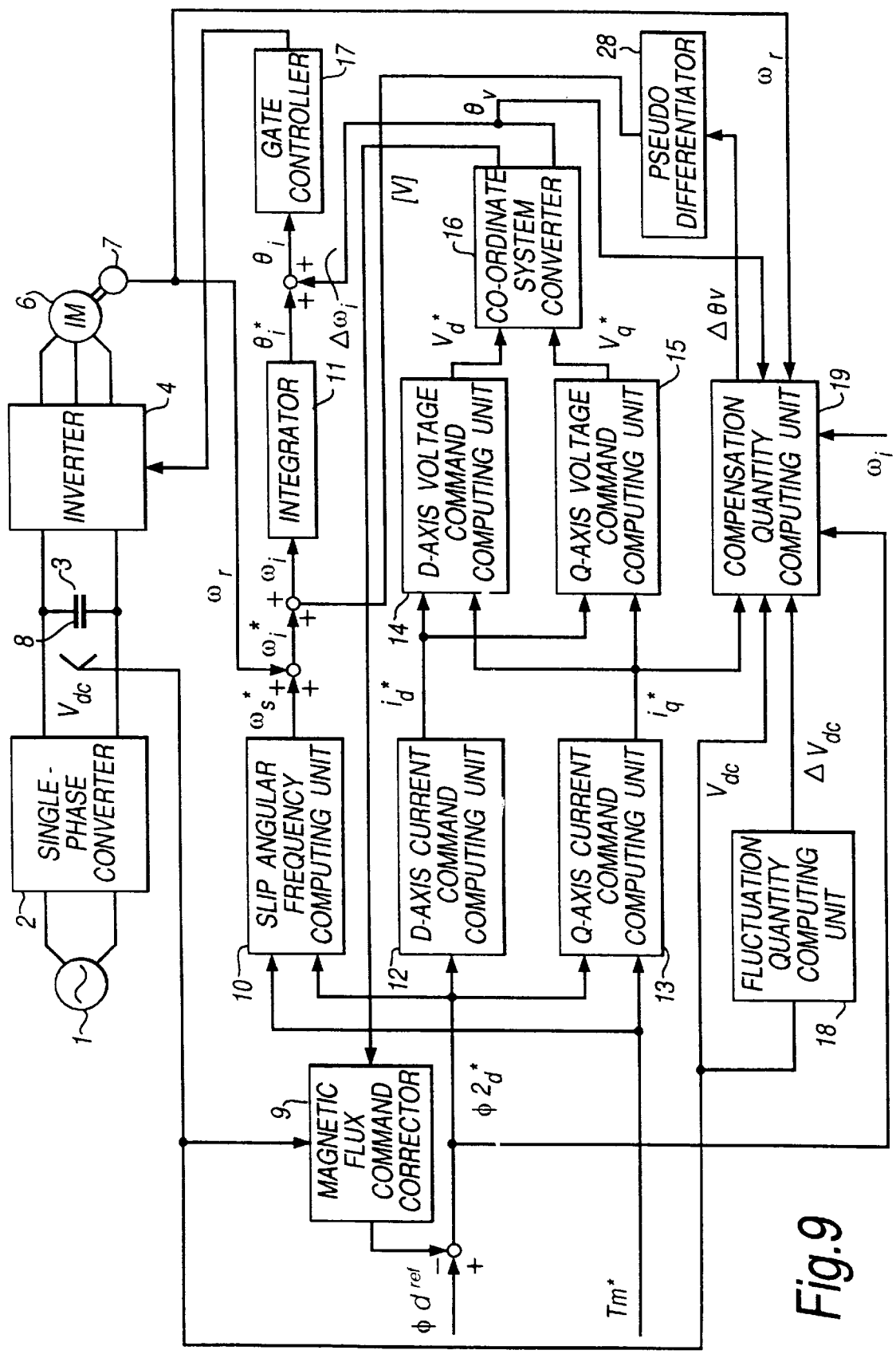
FIG. 9 is a block diagram illustrating an example of a schematic construction of a power conversion system according to a ninth embodiment of this invention.

FIG. 9 is a block diagram illustrating an example of a schematic construction of a power conversion system according to a ninth embodiment of this invention. The same elements as those shown in FIG. 1 are assigned with the same reference numerals and the explanation thereof is omitted, and only the different portions will be described here.

In the power conversion system according to this embodiment, only the construction of the output portion of compensation quantity computing unit 19 differs from that in the first embodiment.

That is, in FIG. 9 compensation quantity $\Delta\theta_v$ to the output voltage phase angle of inverter 4 computed by compensation quantity computing unit 19 is input to a pseudo differentiator 28.

Further, in pseudo differentiator 28 compensation quantity $\Delta\omega_i$ of a dimension of frequency is calculated by pseudo differentiating compensation quantity $\Delta\theta_v$.

Further, by adding this angular frequency compensation quantity $\Delta\omega_i$ to output angular frequency reference $\omega_i^*$ of inverter 4, output angular frequency $\omega_i$ is calculated.

That is, this embodiment differs from the first embodiment in that while output voltage phase angle $\theta_v$ of inverter 4 is controlled to compensate in the power conversion system of the first embodiment, output angular frequency $\omega_i$ of inverter 4 is controlled to compensate in this embodiment.

Accordingly, in the power conversion system of this embodiment described above, it is possible to obtain the same effect as that of the power conversion system of the first embodiment.

Further, as the compensation is made in the computing process of output angular frequency $\omega_i$ of inverter 4, when a conventional software is used, it is possible to incorporate the beatless control in a hardware system in a structure to control inverter 4 by controlling frequency without requiring any change in the process from the computation of output voltage phase angle $\theta_v$ of inverter 4 to the gate control portion based on output voltage phase angle $\theta_v$ of inverter 4.

Thus, as portions subsequent to the computing process of output voltage phase angle $\theta_v$ of inverter 4 can be used commonly, it becomes possible to reduce time and cost for developing a software when achieving it.

Figure 10:
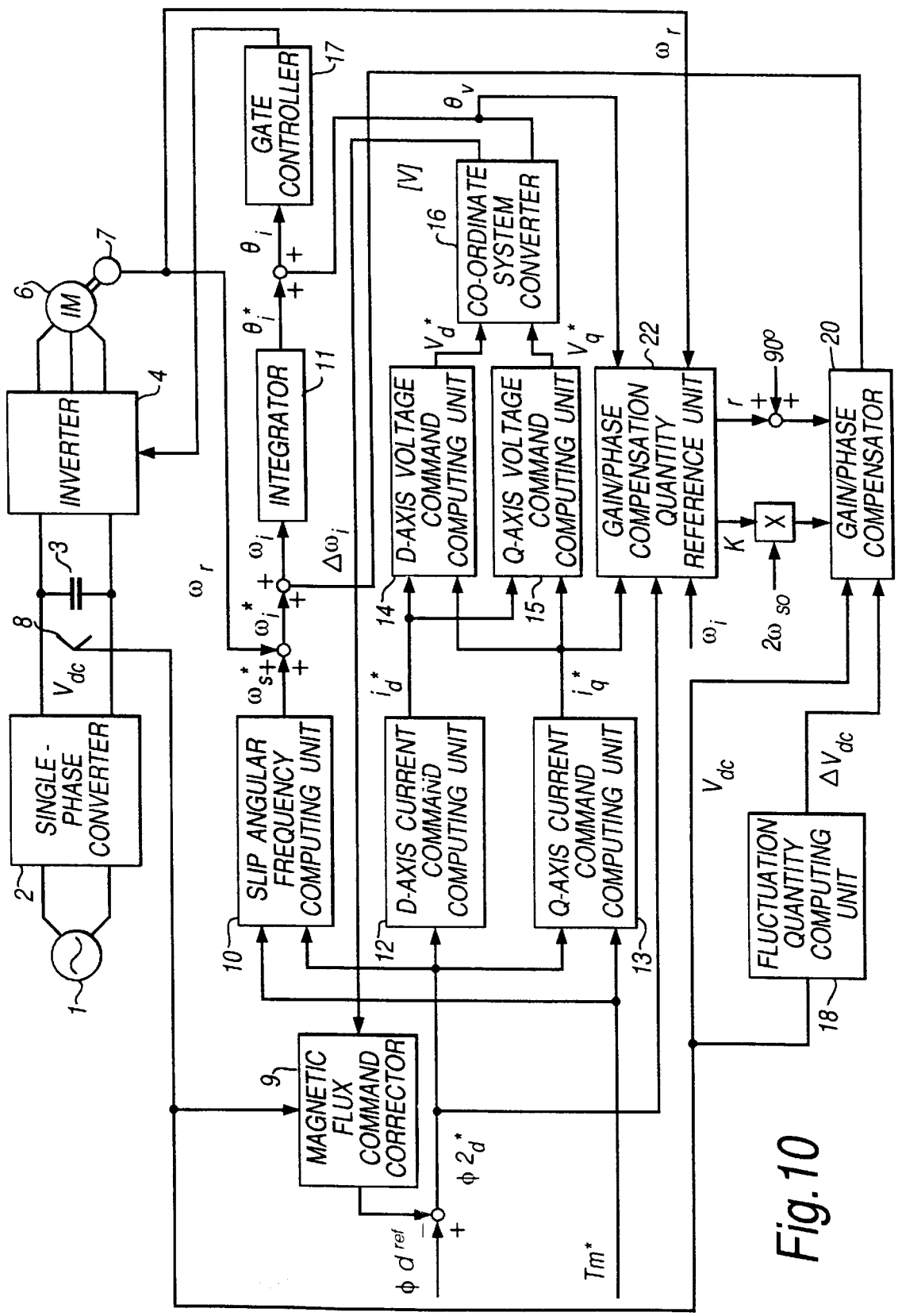
FIG. 10 is a block diagram illustrating an example of a schematic construction of a power conversion system according to a tenth embodiment of this invention.

FIG. 10 is a block diagram illustrating an example of a schematic construction of a power conversion system according to a tenth embodiment of this invention. The same elements as those shown in FIG. 5 are assigned with the same reference numerals and the explanation thereof is omitted and only the different portions will be described here.

In the power conversion system according to this embodiment, only the constructions of the input and output portions of gain/phase compensator 20 differ from those in the fifth embodiment.

That is, in FIG. 10, gain compensating value K, which is the output of gain/phase compensation quantity reference unit 22, is multiplied by an angular frequency $2\omega_{so}$ which is two times of supply angular frequency $\omega_{so}$ and is input to gain/phase compensator 20.

Further, phase compensating value γ, which is the output of gain/phase compensation quantity reference unit 22, is input after being added by 90 degree to gain/phase compensator 20.

In addition, the output of gain/phase compensator 20 becomes compensation quantity $\Delta\omega_i$ of a dimension of the output angular frequency $\omega_i$ of inverter 4, and this angular frequency compensation quantity $\Delta\omega_i$ is added to output angular frequency reference $\omega_i^*$ of inverter 4 and thus output angular frequency $\omega_i$ is calculated.

That is, this embodiment differs from the fifth embodiment in that while output voltage phase angle $\theta_v$ of inverter 4 is controlled to compensate in the power conversion system of the fifth embodiment, output angular frequency $\omega_i$ of inverter 4 is controlled to compensate by differential sine wave $\Delta\omega_i$ which is obtained by differentiated the sine wave of compensation quantity $\Delta\theta_v$ to the output voltage phase angle of inverter 4 in this embodiment.

Accordingly, in the power conversion system of this embodiment described above, it is possible to obtain the same effect as that of the power conversion system of the fifth embodiment.

Further, as the compensation is made in the computing process of output angular frequency $\omega_i$ of inverter 4, when a conventional software is used, it is possible to incorporate the beatless control without requiring any change in the process to the gate control portion based on output voltage phase angle $\theta_v$ of inverter 4 from the computation of output voltage phase angle $\theta_v$ of inverter 4.

Thus, as portions subsequent to the computing process of output voltage phase angle $\theta_v$ of inverter 4 can be used commonly, it becomes possible to reduce time and cost for developing a software when achieving it.

In addition, it becomes possible to further improve control stability.

Figure 11:
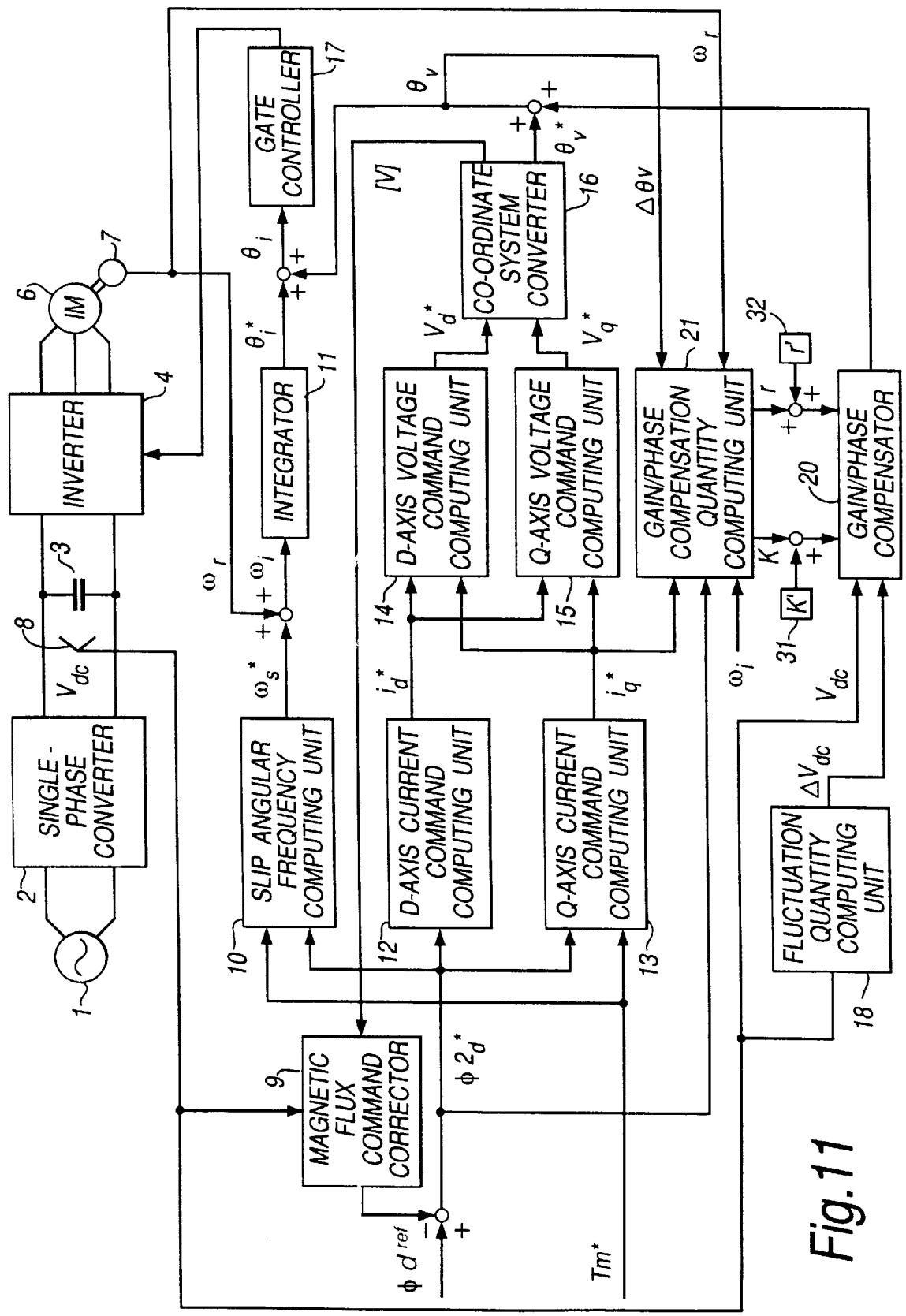
FIG. 11 is a block diagram illustrating an example of a schematic construction of a power conversion system according to an eleventh embodiment of this invention.

FIG. 11 is a block diagram illustrating an example of a schematic construction of a power conversion system according to an eleventh embodiment of this invention. The same elements as those shown in FIG. 4 are assigned with the same reference numerals and the explanation thereof is omitted and only the different portions will be described here.

In the power conversion system according to this embodiment, only the construction of the output portion of gain/phase compensation quantity computing unit 21 differs from that in the fourth embodiment.

That is, in FIG. 11 gain compensating value K and phase compensating value $\gamma$, which are outputs of gain/phase compensation quantity computing unit 21, are added with compensating values K' and $\gamma'$, which are outputs of a gain adjuster 31 and a phase adjuster 32, respectively, and are input to gain/phase compensator 20.

In this case, compensating values K' and $\gamma'$ are decided by considering control delay and control period.

Accordingly, in the power conversion system of this embodiment described above, it is possible to obtain the same effect as that of the power conversion system of the fourth embodiment.

Further, as the gain compensation and phase compensation with the control delay and control period taken into consideration can be performed, even in a system configuration wherein the control period is relatively large, it becomes possible to suppress torque ripple.

In the power conversion system in the first through the eleventh embodiments, when inverter 4 is operated in the constant voltage variable frequency (CVVF) mode, a power. conversion system of the present invention becomes effectual especially.

That is, when the operating mode of inverter 4 is the constant voltage variable frequency (CVVF) mode, a vector length of the output voltage depends on the DC link voltage and is not arbitrarily controllable, and therefore the beat phenomenon appears remarkably. In this constant voltage variable frequency (CVVF) mode, a power conversion system of this invention becomes particularly effectual extremely.

As described above, according to a power conversion system of the present invention, as the compensations are executed in order according to the compensation quantity which is theoretically obtained, it becomes possible to suppress the torque ripple extremely effectively without requiring adjustment under any operating state or any control objects having different parameters.

Thus, it becomes possible to sharply reduce time and labor required for adjustment.

Further, for instance, when a power source is of single phase type, it becomes possible to suppress the torque ripple in case that the inverter output frequency is about two times of the frequency of the power source.

Thus, the reduction of noise and the drop of failure rates of mechanical and electrical systems can be expected.

Furthermore, when this invention is applied to induction motors which are used for driving electric vehicles, it becomes possible to obtain an effect to improve the riding comfort.

On the other hand, as it is not required to compute compensation quantity for each control, it is possible to reduce processing quantities, and further improve control response by using a CPU having a low processing capability.

In addition, it also becomes possible to effectively act on modeling error, disturbance, etc.

Further, when a conventional software is used, it becomes possible to incorporate the beatless control of this invention without requiring any change in the process to the gate control portion based on the inverter output voltage phase angle from the computation of the inverter output voltage phase angle.

Thus, as portions subsequent to the computing process of output voltage phase angle of inverter can be commonly used, it becomes possible to reduce time and cost required for developing a software when achieving it.

Further, as the phase compensation and gain compensation can be made by taking control delay and control period into consideration, even in a system configuration having a relatively large control period, it becomes possible to suppress torque ripple.

Hereinafter, other embodiments of the present invention will be described in detail with reference to attached drawings.

FIG. 13 is a block diagram illustrating a power conversion system according to a twelfth embodiment of this invention. A single-phase converter 102 converts a single-phase AC power of a power source 101 to a DC power, and an inverter 104 further converts this power to an AC power and drives an induction motor 106. Power source 101 is assumed to be a single phase. In this case, as higher harmonics of a frequency that is two times of a supply frequency of power source 101 is contained in the current flowing to a DC capacitor 103 from single-phase converter 102, DC link voltage pulsates at a frequency that is two times of the supply frequency. In this embodiment, a control system which operates inverter 104 and drives induction motor 106 is assumed to be a so-called vector control system. The vector control system is a system to control current, voltage and magnetic flux as vector quantities and the control is carried out on a rotatory coordinate system that is defined as a dq-axis. The d-axis is called a magnetic flux axis and the q-axis is called a torque axis. The vector control is a well known technique through various literatures, for instance, Literature 2 as described above, and there exist many systems. For instance, in this embodiment, a power conversion system is in such a structure that vector is controlled through a slip frequency type vector control to bring the secondary magnetic flux of induction motor 106 in accord with the d-axis by properly controlling a slip angular frequency without a current minor loop provided.

The construction of a vector control system 118 will be described concretely. A slip angular frequency computing unit 110 calculates a slip angular frequency reference ωs* by inputting a secondary magnetic flux command value φ2d* and a torque command value Tm* which will be described later. An adder 201 calculates an inverter angular frequency ωi by adding a motor velocity ωr that is detected by a velocity detector 107 and slip angular frequency reference ωs*. Inverter angular frequency ωi is integrated by an integrator 111 and becomes an inverter output voltage phase reference value θi*. A d-axis current command computing unit 112 calculates a primary d-axis current command value id* by inputting secondary magnetic flux command value φ2d*. Further, a q-axis current command computing unit 113 calculates a primary q-axis current command value iq* by inputting secondary magnetic flux command value φ2d* and torque command value Tm*. Then, a d-axis voltage command computing unit 114 and a q-axis voltage command computing unit 115 calculate a d-axis voltage command value Vd* and a q-axis voltage command values Vq* which are required for flowing d-axis and q-axis currents by inputting both primary d-axis current command value id* and primary q-axis current command value iq* respectively. In a coordinate system converter 116, from d-axis and q-axis voltage command values Vd* and Vq* on the dq-axis rotatory coordinate system, a magnitude |V| of a voltage command value and a phase angle reference value θv* (see FIG. 14) of a voltage command vector (Vd*, Vq*) for the d-axis are calculated. This phase angle reference value θv* of this voltage command vector is added to a correction quantity Δθv that is described later by an adder 202 and becomes an output voltage phase angle θv on the dq-axis rotatory coordinate system. Further, output voltage phase angle θv is added to output voltage phase angle reference value θi* by an adder 203 and becomes an output voltage phase angule θi. A gate controller 117 generates a gate signal to drive inverter 104 according to output voltage phase angle θi.

Further, vector control system 118 constitutes a vector control system when inverter 104 is operated at one pulse. The vector control at one pulse is well known by Literature 3 as described above. In a magnetic flux corrector 109, magnitude |V| of output voltage command value on the dq-axis rotatory coordinate system is compared with a magnitude of DC link voltage Vdc. A secondary magnetic flux reference φd^{ref} is corrected so as to bring them in accord with each other and second magnetic flux command value φ2d* is output.

Figure 15:
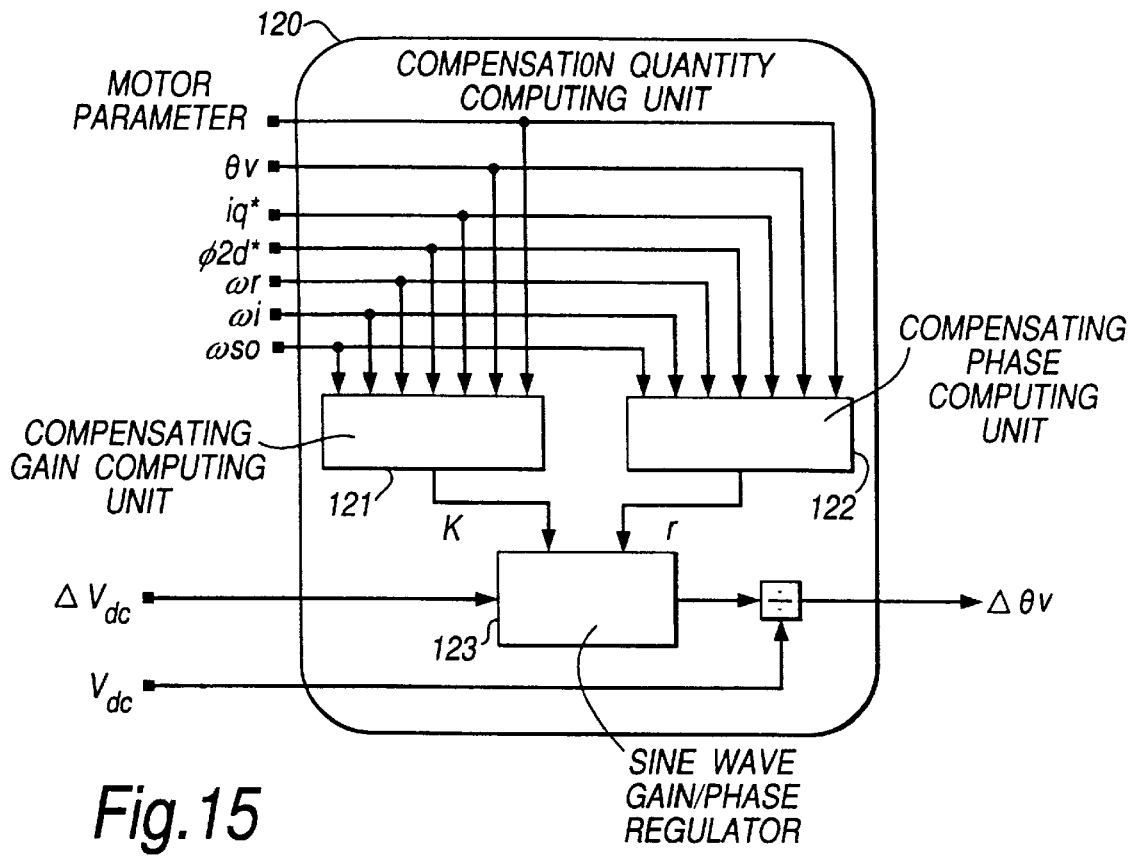
FIG. 15 is a block diagram illustrating a schematic construction of a compensation quantity computing unit.

A voltage detector 108 detects a DC link voltage Vdc and a fluctuating quantity computing unit 119 calculates a fluctuating sine wave ΔVdc that is a fluctuating quantity of DC link voltage Vdc. A compensating quantity computing unit 120 inputs this fluctuating quantity ΔVdc of DC link voltage Vdc and DC link voltage Vdc. A compensation quantity computing unit 120 is constructed, for instance, as shown in FIG. 15. A compensating gain computing unit 121 and a compensating phase computing unit 122 calculate a compensating gain K and a compensating phase γ, respectively by inputting inverter output angular frequency ωi, motor angular frequency ωr, secondary magnetic flux command value φ2d*, primary q-axis current command value iq*, phase angle θv of the output voltage on the dq-axis rotatory coordinate system, supply frequency ωso or a fluctuating frequency of DC link voltage Vdc and motor parameters.

Figure 14:
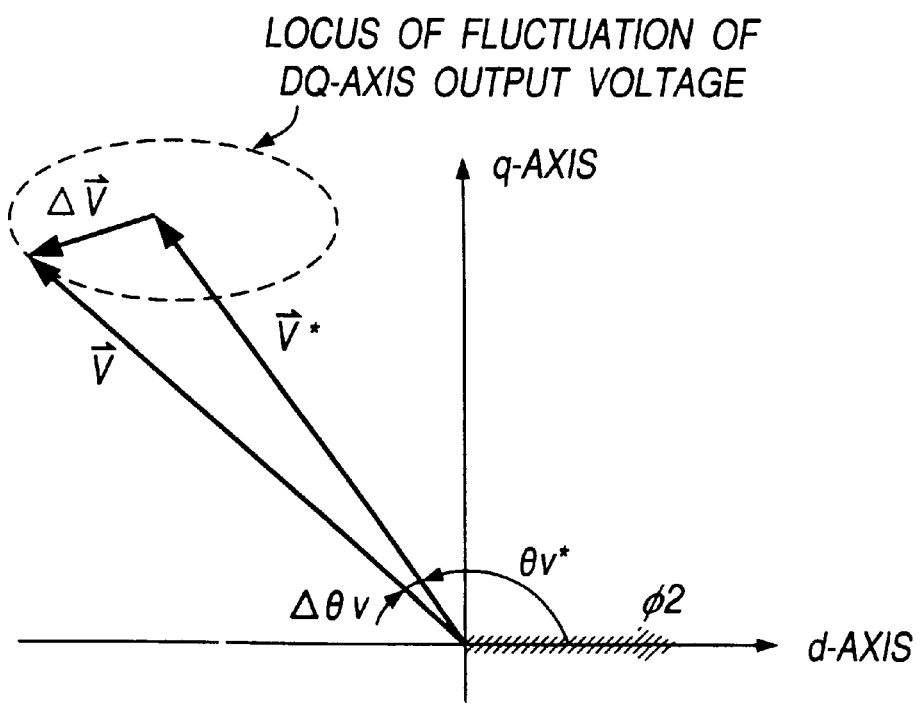
FIG. 14 is a relation diagram between a dq-axis output voltage phase angle and an output voltage vector.
Figure 16:
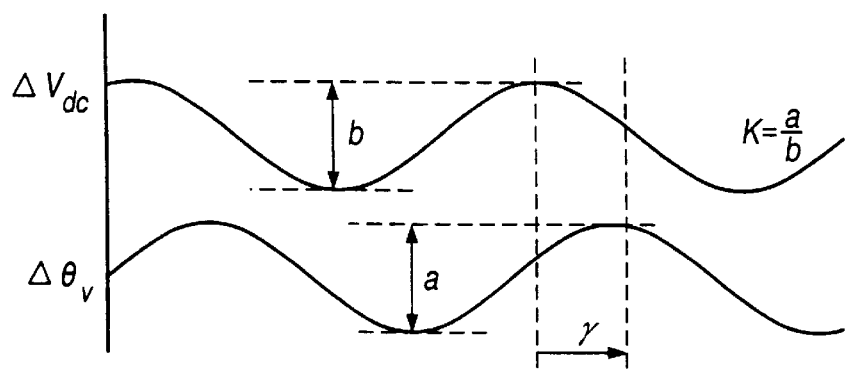
FIG. 16 is a relation diagram between a compensating gain and a compensating phase.

These calculations may be made, for instance, according to equations (64) and (65), which are described later or by retaining a table for input parameters and reading out of that table. A sine wave gain/phase regulator 123 compensates the amplitude of DC link voltage fluctuating sine wave ΔVdc that is the output of fluctuating quantity computing unit 119 by compensating gain K and compensates its phase by compensating phase γ, as shown in FIG. 16. The output of sine wave gain/phase regulator 123 also becomes a sine wave. This output sine wave is divided by DC link voltage Vdc and becomes compensation quantity Δθv to the output voltage phase angle on the dq-axis of inverter 104. This correction quantity Δθv is added with phase angle reference value θv* of the dq-axis output voltage that is the output of coordinate system converter 116 by adder 202 and becomes an output voltage phase angle θv on the dq-axis rotatory coordinate system. This output voltage phase angle θv is added to output voltage phase angle reference value θi* that is the phase reference to the fixed coordinate a-axis of the rotatory coordinate system d-axis by adder 203 and becomes inverter output voltage phase angle θi. FIG. 14 shows the state of output voltage vector on the dq-axis rotatory coordinate system, indicating output voltage vector reference V* (herein after the vector symbol → is omitted) and an output power vector V after correction. A phase angle from the d-axis to output voltage vector reference V* is θv*, a phase angle correction quantity superposed on the reference is Δθv, and a phase angle from the d-axis to the output In gate controller 117, a gate signal is generated based on inverter output voltage phase angle θi.

In the vector control system with the construction as described above, the principle that is able to suppress torque ripple will be described below.

First, the principle to suppress torque ripple that is generated on induction motor 106 under the condition where DC link voltage Vdc fluctuates is briefly shown. Then, a control system to suppress torque ripple is shown from the theoretical consideration.

Figure 17A:
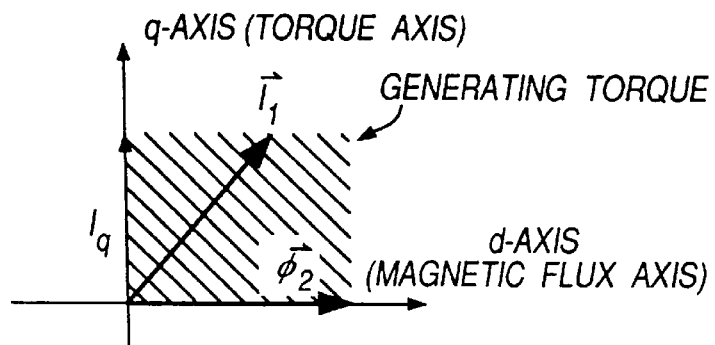
FIG. 17 is a diagram illustrating a motor generating torque on the dq-axis rotatory coordinate system.

In this embodiment the dq-axis rotatory coordinate system in which the secondary magnetic flux axis and the d-axis are brought in accord with each other is introduced. The dq-axis rotatory coordinate system rotates on the stationary coordinate system according to the secondary magnetic flux rotating frequency. The d-axis is called the magnetic flux axis while the q-axis is called the torque axis. Under the steady state without fluctuation in DC link voltage Vdc, each state quantity on the dq-axis rotatory coordinate system becomes DC quantity. This consideration on the dq-axis rotatory coordinate system indicates that it is based on the similar concept as the so-called vector control. To be exact, a torque generated in induction motor 106 becomes a value obtained by multiplying a vector product of secondary magnetic flux and primary current component by a coefficient, and this torque represents a product of secondary magnetic flux with torque current (q-axis current) Iq, that is primary current component orthogonal to it, that is an area shown in FIG. 17(a).

Figure 17B:
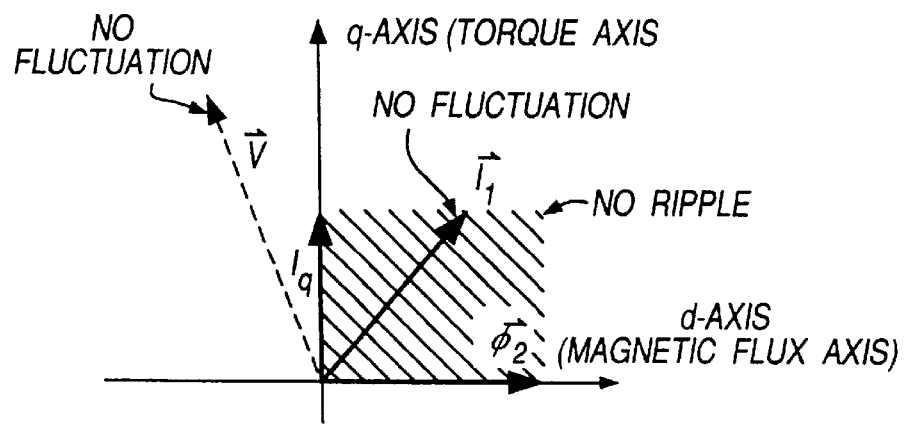

When assuming that DC link voltage Vdc is constant as shown in FIG. 17(b), output voltage vector V of inverter 104 becomes stationary on the dq-axis rotatory coordinate. As output voltage vector V becomes stationary, a current vector I1 also becomes stationary. Accordingly, as there is no ripple in the q-axis current, that is a torque current Iq, torque ripple is also not generated.

Figure 17C:
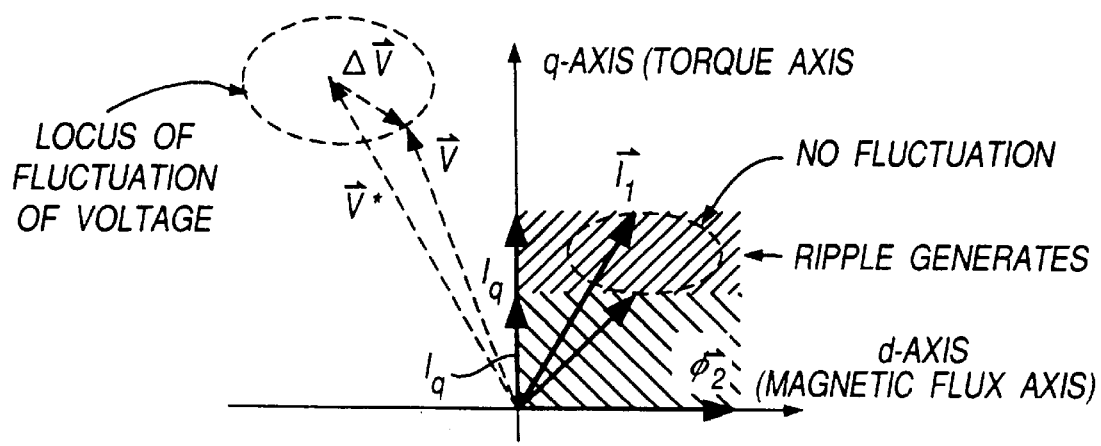

However, when DC link voltage Vdc fluctuates as shown in FIG. 17(c), a magnitude of output voltage vector V also fluctuates. In particular, in the operating mode that is called the one pulse mode, as it is not possible to control the magnitude of output voltage arbitrarily, the fluctuation of DC link voltage Vdc directly affects the output voltage. As the current of inverter 4 flows according to the output voltage, the current vector I1 also fluctuates. As a result, torque current Iq fluctuates, generating torque ripple.

Figure 18:
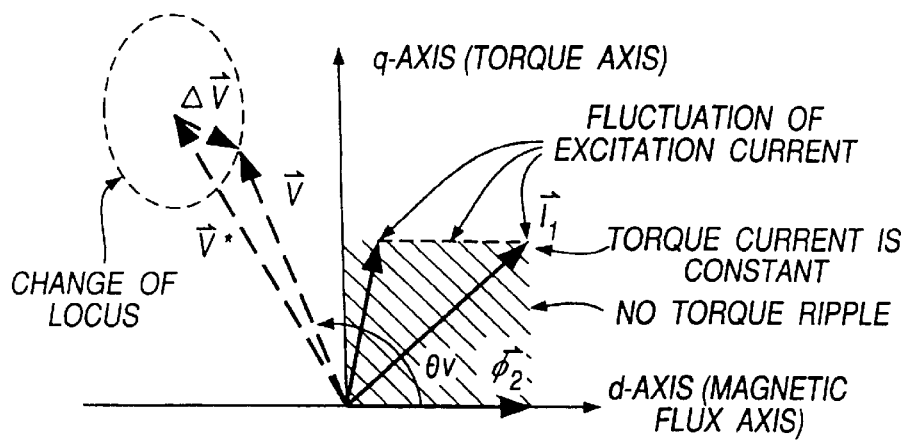
FIG. 18 is a vector diagram when the DC link voltage is fluctuating and the torque ripple is suppressed on the dq-axis rotatory coordinate system.

In all operating modes including the one pulse mode, it is possible to control output voltage vector phase angle θv from the d-axis. So, by controlling phase angle θv as shown in FIG. 18, torque current Iq is controlled at a constant level. This is the result of changing a locus of the fluctuation of output voltage vector V on the dq-axis rotatory coordinate system. In the one pulse mode, as a magnitude of output voltage vector V is determined solely according to DC link voltage Vdc, when DC link voltage Vdc fluctuates, a magnitude of output voltage vector V also fluctuates accordingly, and it is not possible to suppress this fluctuation. In this system, the effect of fluctuation of DC link voltage Vdc is fully reflected on the ripple of exciting (d-axis) current Id, thereby controlling torque (q-axis) current at a constant level. The following characteristic of the secondary magnetic flux against the fluctuation of exciting current Id is slow and the secondary magnetic flux becomes almost constant. As the torque current and the secondary magnetic flux do not fluctuate, it becomes possible to suppress the torque fluctuation.

The principle of suppressing the torque ripple is briefly described in the above. Hereinafter, from the theoretical consideration, it will be described that it is possible to suppress the torque ripple when the power conversion system of this embodiment is constructed as shown in FIG. 13.

Generally, the characteristic of induction motor 106 is described by equations (13) and (14) as described above on the dq-axis rotatory coordinate system. Generating torque Tm is expressed by an equation (15).

Hereinafter in the equations as described above, the letter with subindex letter is substituted by the letter with ordinary letter, for example $V_d$ is substituted by Vd.
where, Vd: d-axis primary voltage
Vq: q-axis primary voltage
id: d-axis primary current
iq: q-axis primary current
φ2d: d-axis secondary magnetic flux
φ2q: q-axis secondary magnetic flux
ωr: motor rotating angular frequency
ωs: slip angular frequency
ωi: inverter output angular frequency
R1: primary resistance
R2: secondary resistance
L1: primary self-inductance
L2: secondary self-inductance
M: mutual inductance
R12: R1+R2·M²/L2²
σ: 1−M²/(L1·L2)
s Laplace operator
Tm Motor torque When the d-axis is selected so as to agree with the secondary magnetic flux, q-axis secondary magnetic flux φ2q becomes zero and inverter output frequency ωi, that is a coordinate rotating velocity agrees with secondary magnetic flux angular frequency ωφ. Therefore, equations (13) –(15) can be converted to equations (16)–(18) as described above.

When each state quantity on the dq-axis rotatory coordinate system is expressed by assigning a symbol ‾ to a mean value and a symbol Δ to a fluctuating component, equation (19) is obtained. Here, the fluctuating component denotes particularly the fluctuating frequency of DC link voltage Vdc. In case of the single-phase power source shown in FIG. 13, if the supply power is of 50 Hz, it is a fluctuating component of 100 Hz and if the supply power is of 60 Hz, it is a fluctuating component of 120 Hz.

The state equations relating to fluctuating quantity are equations (20), (21) as described above.

When the equation (20) is solved for fluctuation quantity Δφ2d of d-axis secondary magnetic flux and fluctuation quantity Δiq of torque current and the solution is substituted in the equation (21), it becomes possible to express torque fluctuating quantity ΔTm by dq-axis output voltage fluctuation quantities ΔVd, ΔVq as in equations (22), (23) and (24).

Torque fluctuation ΔTm of the equation (22) is made zero. The relationship between dq-axis output voltage fluctuation quantities ΔVq and ΔVq under this condition are calculated as shown in equations (25), (26), (27) as described above.

Accordingly, when d-axis output voltage fluctuation quantity ΔVd and q-axis output voltage fluctuation quantity ΔVq are in such the relationship as shown by equation (26), torque ripple can be reduced. If supply angular frequency is ωso, the torque ripple at a frequency 2ωso that is two times frequency ωso becomes problem. So, if d-axis output voltage fluctuation quantity ΔVd is expressed by equation (58), torque ripple can be suppressed when q-axis output voltage fluctuation quantity ΔVq can be expressed by equation (59).

$$\Delta V_d = \Delta V \sin(2\omega_{so}t + \psi) \tag{58}$$

$$\Delta V_q = K \cdot \Delta V \sin(2\omega_{so}t + \psi + \gamma) \tag{59}$$

$$K = |H_1(2j\omega_{so})| \tag{60}$$

$$\gamma = arg\{H_1(2j\omega_{so})\} \tag{61}$$

where,
ωso: supply angular frequency
j: complex number

Figures 19A, 19B, 19C:
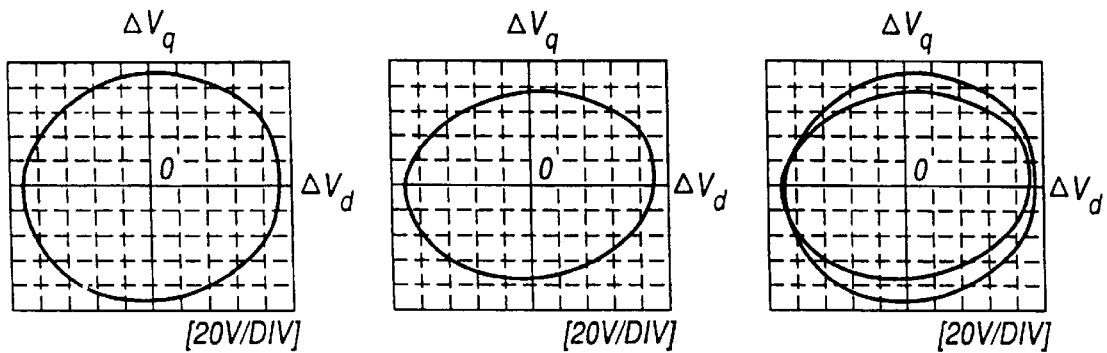
FIG. 19 is a vector diagram illustrating loci of the fluctuation quantities of dq-axis output voltage with torque ripple.
Figures 20A, 20B, 20C:
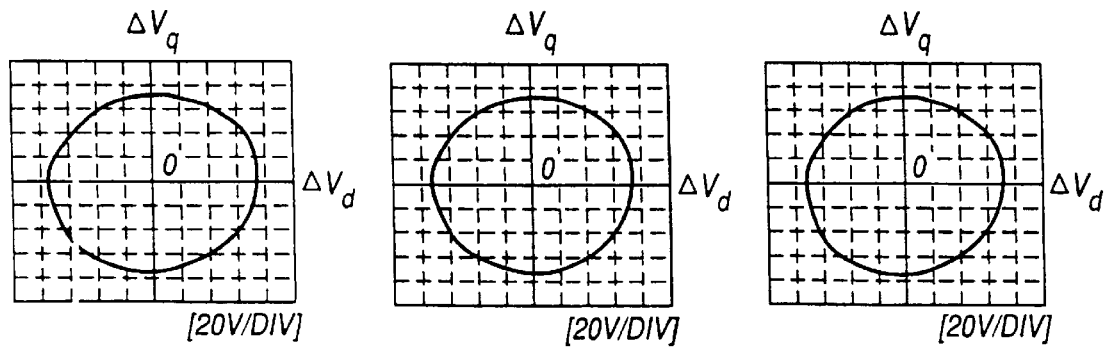
FIG. 20 is a vector diagram illustrating loci of the fluctuation quantities of dq-axis output voltage without torque ripple.
Figure 21A:
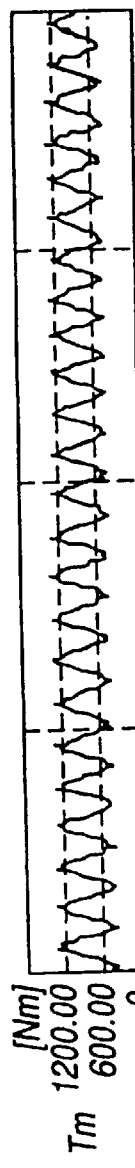
FIG. 21 is a diagram illustrating the results of simulations without beatless control applied.
Figure 21B:
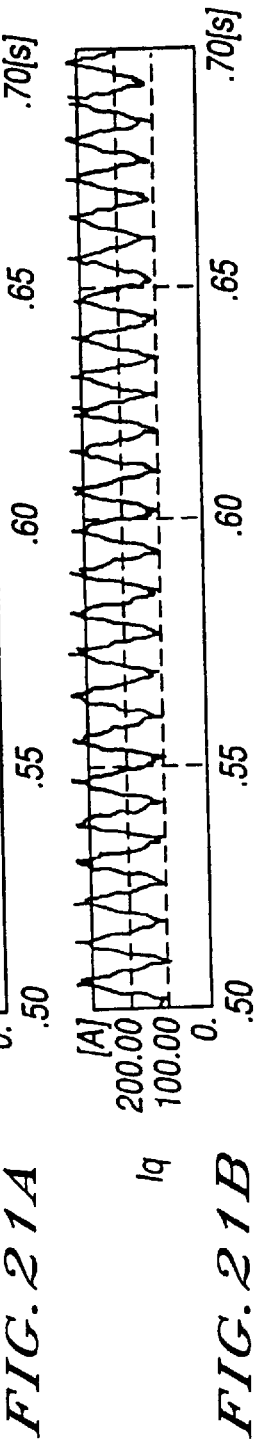
Figure 21C:
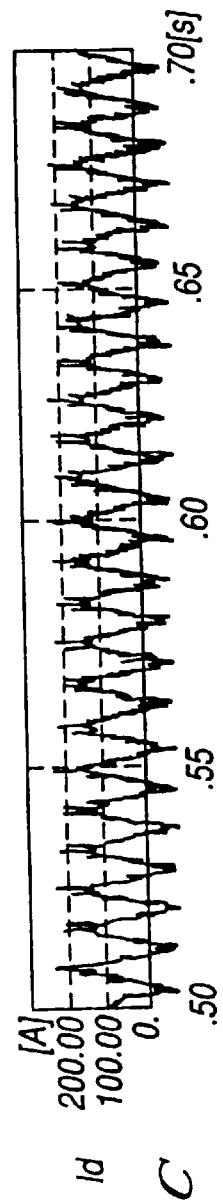
Figure 21D:
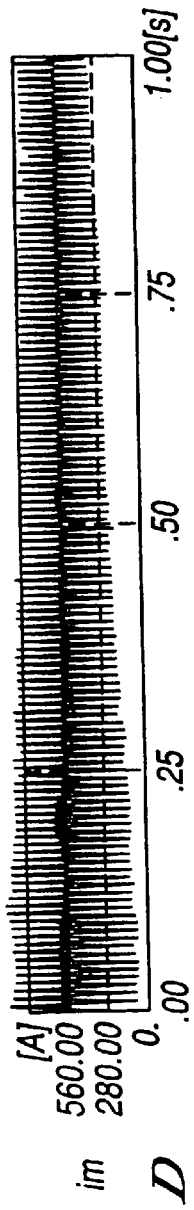
Figure 21E:
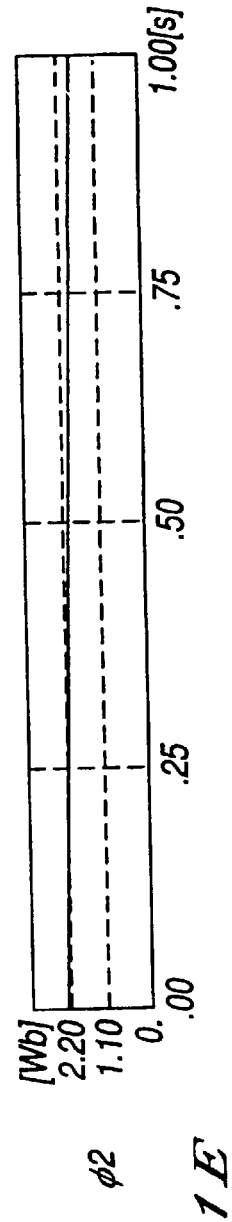
Figure 21F:
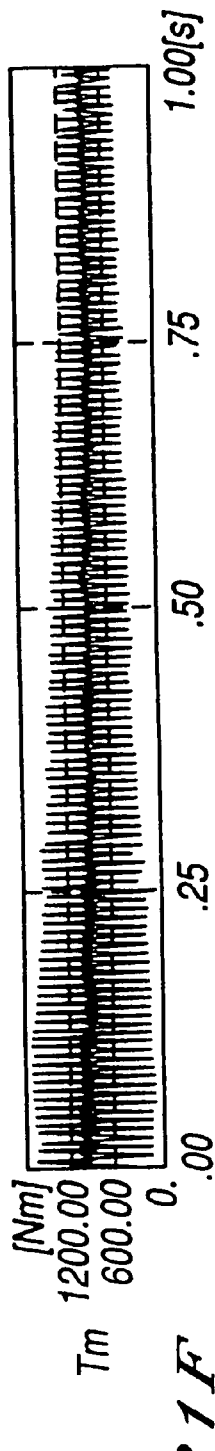
Figure 21G:
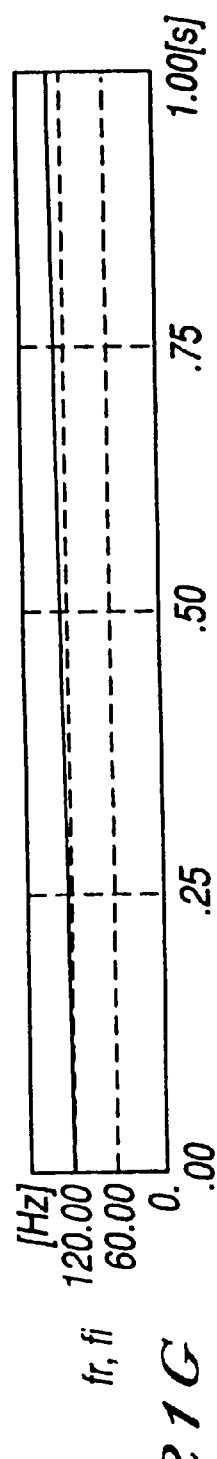
Figure 21H:
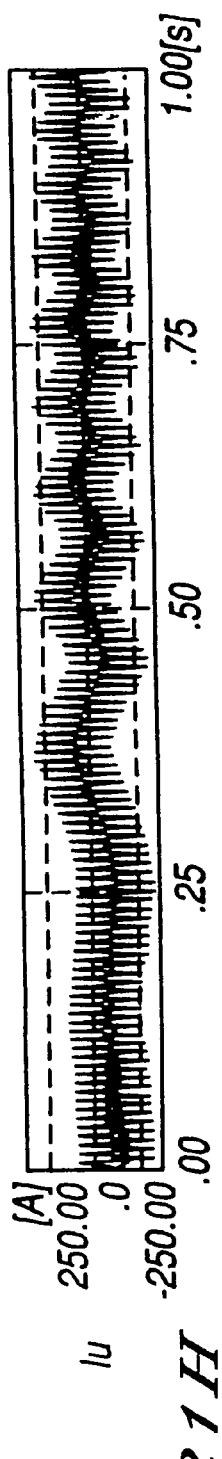
Figure 21I:
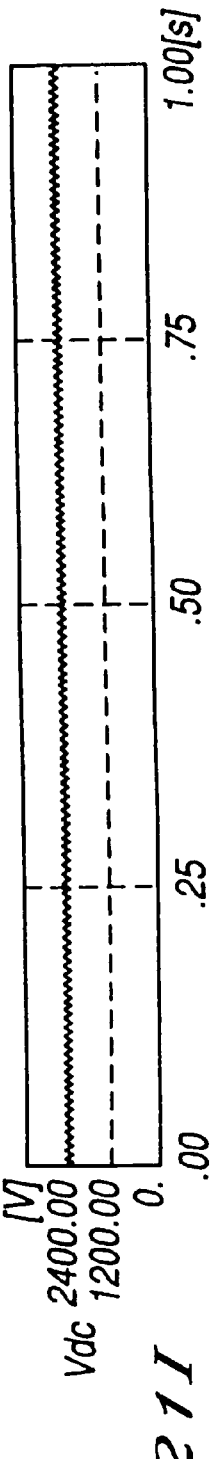
Figure 22A:
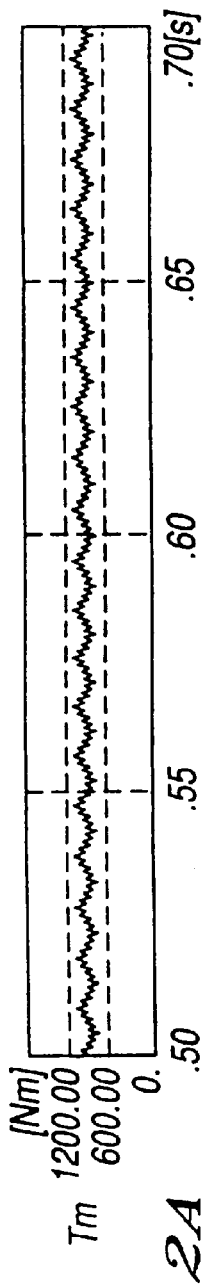
FIG. 22 is a diagram illustrating the results of simulations with a conventional beatless control system applied.
Figure 22B:
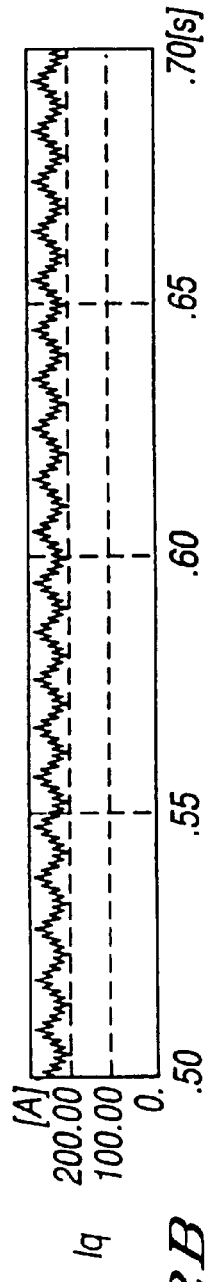
Figure 22C:
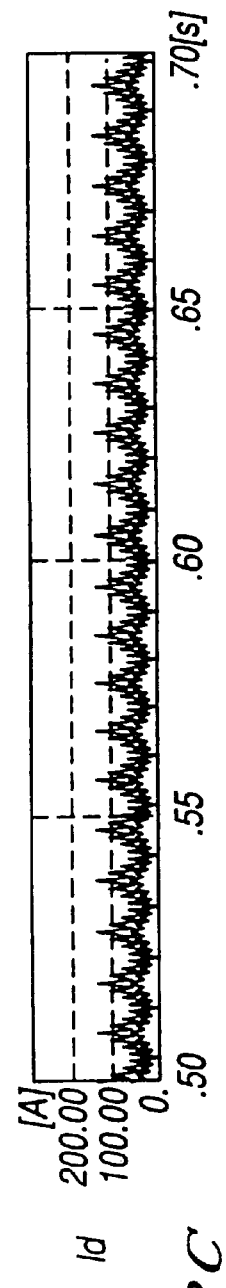
Figure 22D:
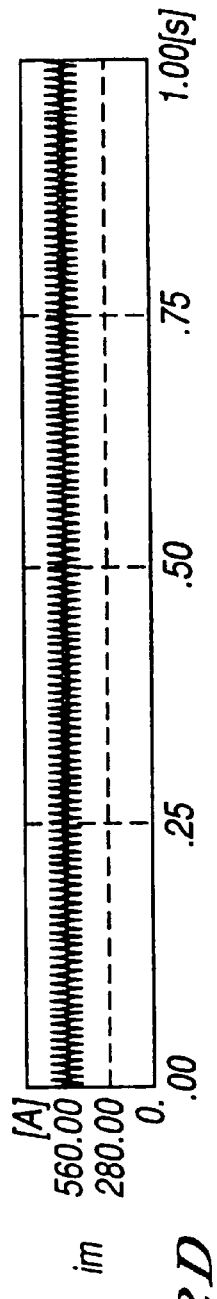
Figure 22E:
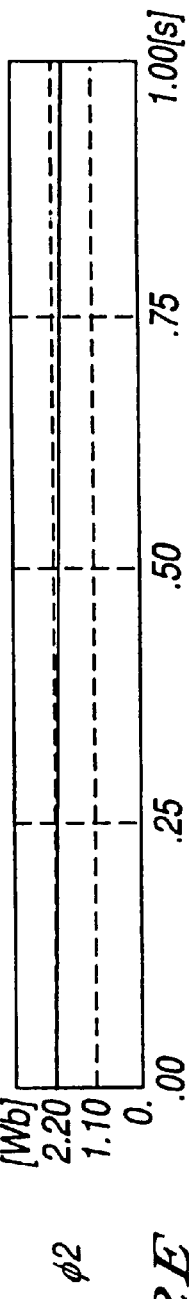
Figure 22F:
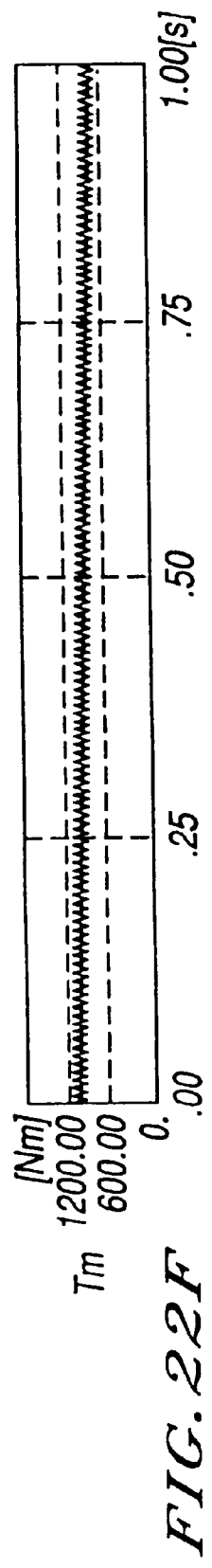
Figure 22G:
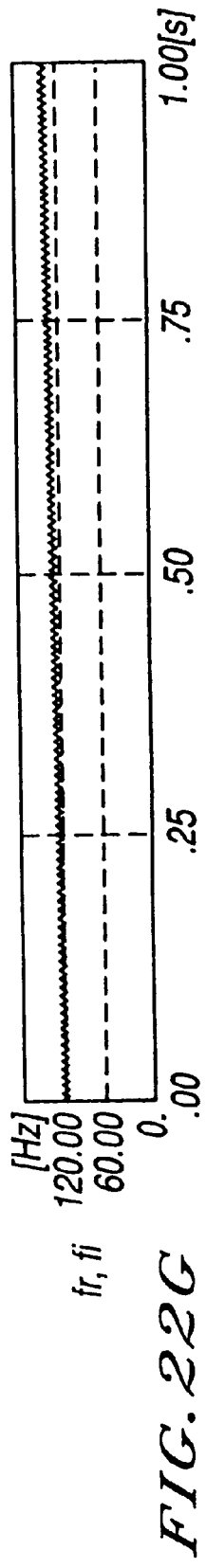
Figure 22H:
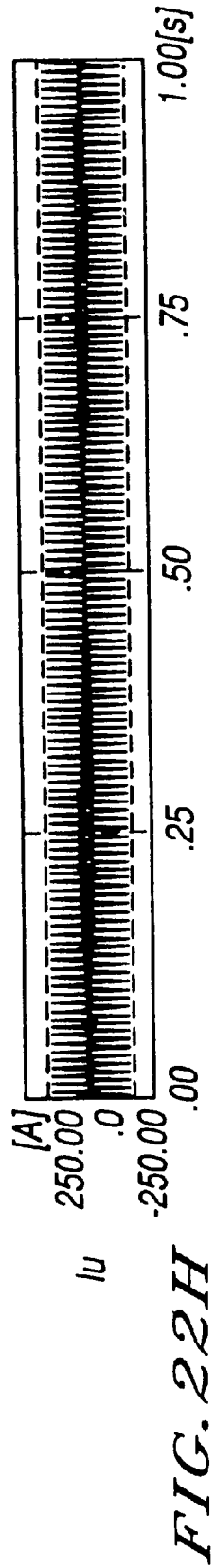
Figure 22I:
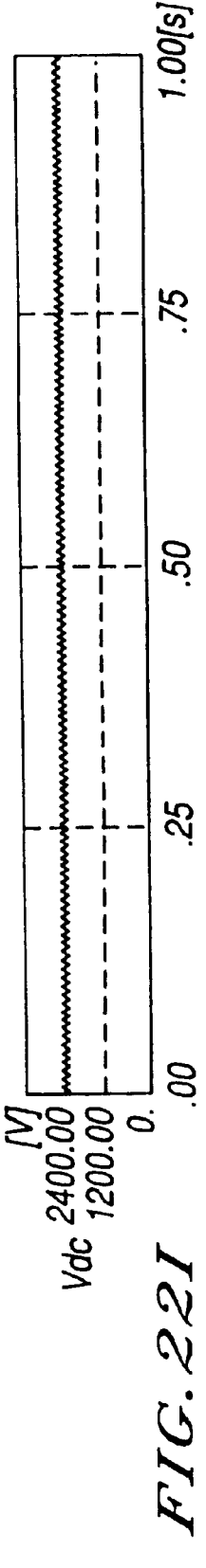
Figure 23A:
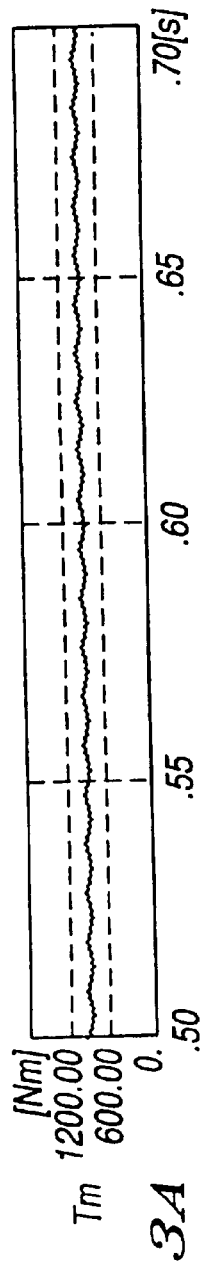
FIG. 23 is a diagram illustrating the results of simulations with a beatless control system of this invention applied.
Figure 23B:
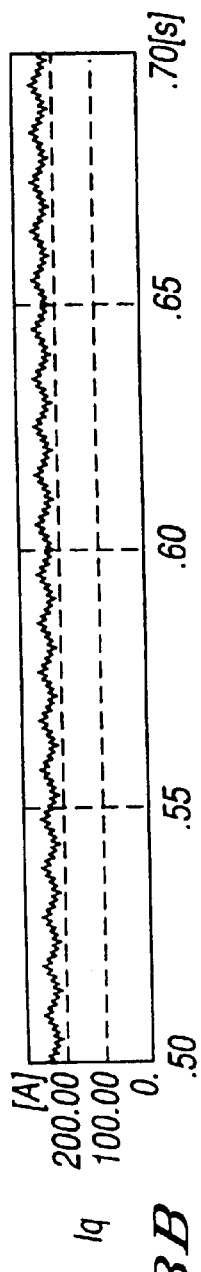
Figure 23C:
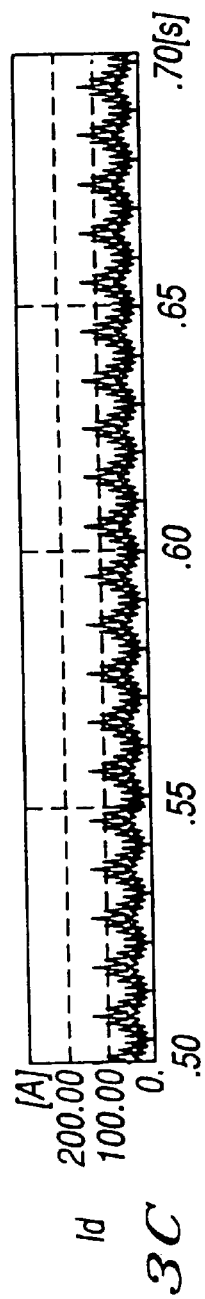
Figure 23D:
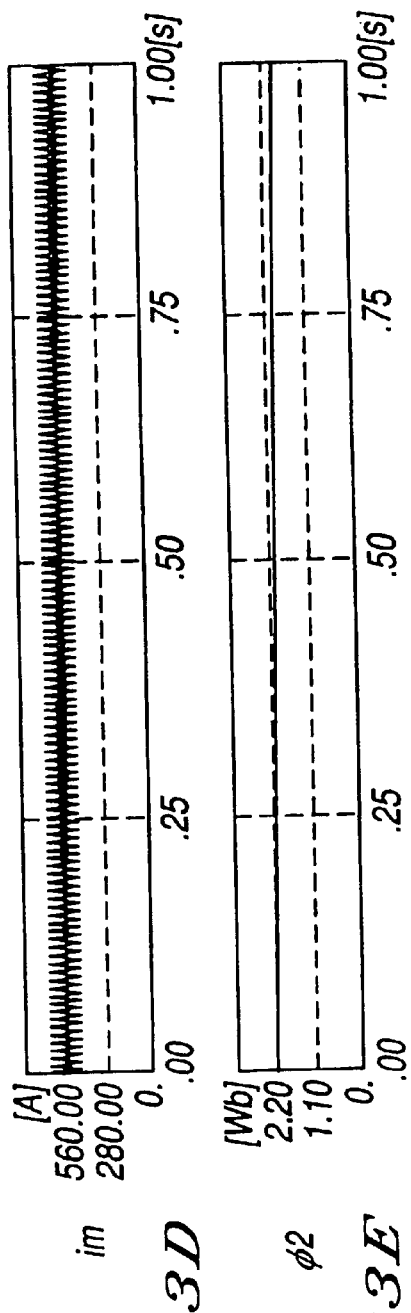
Figure 23E:
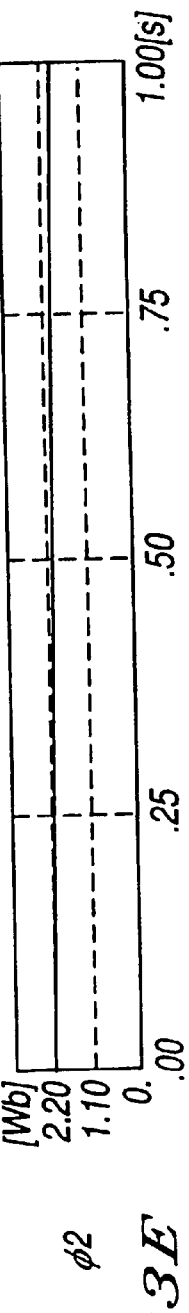

FIG. 19 and FIG. 20 are loci of fluctuation of dq-axis output voltage vectors plotted from results of simulations conducted. Fluctuation quantity ΔVd of d-axis output voltage is plotted on the horizontal axis and fluctuation quantity ΔVq of q-axis output voltage is plotted on the vertical axis. Shown in FIG. 19 are fluctuation loci of dq-axis output voltage when torque ripple is left, and shown in FIG. 20 are fluctuation loci of dq-axis output voltage when torque ripple is suppressed. In both FIG. 19 and FIG. 20, (a) shows fluctuation quantity ΔVq of q-axis output voltage obtained according to equations (58)–(61) against detected fluctuation quantity ΔVd of d-axis output voltage, (b) shows detected fluctuation quantity ΔVq of q-axis output voltage against detected fluctuation quantity ΔVd of d-axis output voltage, and (c) are loci shown in (a) and (b) superposed each other. In FIG. 19 where torque ripple is left, loci shown in (a) and (b) do not agree with each other. This indicates that equation (26) is not satisfied. While in FIG. 20 where torque ripple is suppressed, loci shown in (a) and (b) agree with each other and it can be confirmed that equation (26) is satisfied. This indicates that the results of above-described analysis are proper.

Then, the relationship between fluctuation quantities ΔVq, ΔVp of dq-axis output voltage and dq-axis output voltage vector V will be derived.

FIG. 14 shows inverter output voltage vector V on the dq-axis rotatory coordinate system. When assuming that the d-axis, that is, the secondary magnetic flux axis is to be a real axis and the q-axis is to be an imaginary axis, voltage vector V can be expressed by equation (28) as described above.

Vdc indicates DC link voltage and θv indicates a phase angle from the d-axis, that is, the secondary magnetic flux axis to the output voltage vector axis. DC link voltage Vdc and phase angle θv are separated to a mean value and a fluctuating quantity. Subscripts "¯" and Δ indicate a mean value and a fluctuating quantity, respectively. Then, equation (29) is obtained as described above.

From dq-axis output voltage vector V expressed by equation (28), the equation (30) described above holds good regarding vector fluctuating quantity ΔV.

Then, if fluctuating quantity ΔV of voltage vector expressed by equation (30) is expressed by dq-axis output voltage fluctuation quantities ΔVd, ΔVq by separating it into a real portion and an imaginary portion, expression (32) is derived as described above.

This equation (32) indicates that d-axis voltage and q-axis voltage are affected by fluctuation quantity ΔVdc of DC link voltage Vdc. Also, it is indicated that d-axis voltage and q-axis voltage can be controlled by controlling output voltage phase angle θv.

Accordingly, when dq-axis output voltage fluctuation quantities ΔVd, Δq satisfy a conditional equation shown by equation (26), it is possible to suppress the torque ripple. So, fluctuating quantity Δθv of phase angle θv is solved by substituting equation (32) into equation (26). The results are shown by equations (33), (34), (35) as described above.

Here, when it is assumed that DC link voltage fluctuation ΔVdc is expressed by equation (62), correction quantity Δθv to output voltage vector phase angle on the dq-axis rotatory coordinate system can be expressed by equation (63) based on equations (33)–(35).

$$\Delta V_{dc} = \Delta V \sin(2\omega_{so} t + \psi) \quad (62)$$

$$\Delta \theta_v = \frac{K}{V_{dc}} \cdot \Delta V \sin(2\omega_{so} t + \psi + \gamma) \quad (63)$$

$$K = |H_1(2j\omega_{so})| \quad (64)$$

$$\gamma = arg\{H_1(2j\omega_{so})\} \quad (65)$$

Then, by adding compensation quantity Δθv calculated according to equation (63) to output voltage phase angle reference value θv* of inverter 104, output voltage phase angle θv is obtained as shown by equation (36) as described above.

Now, it can be seen that it is possible to control torque to a constant level by controlling output voltage phase θv in the dq-axis rotatory coordinate system of inverter 104 according to equations (62)–(65).

Further, as can be confirmed by equations (24), (34), (35), (62)–(65), in order to suppress torque ripple under the condition wherein DC link voltage Vdc fluctuates, output angular frequency ωi (secondary magnetic flux angular frequency ωφ) of inverter 104, motor rotating angular frequency ωr, output voltage vector phase angle θv on the dq-axis rotatory coordinate system, torque current iq, secondary magnetic flux φ2d, motor parameters, supply angular frequency ωso or DC link voltage fluctuating frequency become necessary. Accordingly, it is seen that in order to strictly suppress torque ripple, it is necessary to adjust correction quantity Δθv properly according to the change in the above-described state quantities. For instance, in the electric vehicle control, it is required to make proper compensation by grasping not only velocity but also notch command and such state as powering/braking.

The simulation results are shown in FIG. 21 through FIG. 23. In these simulations, supply frequency fso for the system shown in FIG. 13 is 60 Hz. Therefore, DC link voltage Vdc is pulsating at 120 Hz. Shown in FIG. 21 are responses when the beatless control is not applied. Large beat of a U-phase current Iu, which is the output of inverter 104, can be confirmed. Current tends to become overcurrent as much as this beat. Regarding torque Tm, torque ripple of 120 Hz is generated, and vibration and noise resulting from this torque ripple become a problem. Further, both of torque current Iq and an exciting current Id are pulsating at 120 Hz.

FIG. 22 shows results of the simulations conducted according to a conventional beatless control system. As the power conversion system is adjusted so as to suppress the beat phenomenon when inverter frequency fi is 120 Hz, when inverter frequency fi is away from 120 Hz, torque ripple increases. This is because the effect of beatless control deteriorates as the operating state is different from the operating condition at the time of adjustment, and is not restricted to the change in inverter frequency fi. It is therefore necessary to change a compensating method according to the operating state in order to suppress torque ripple in any operating state. Shown in FIG. 23 are results of the simulations when parameters for compensation are changed according to the operating state as shown in equations (62)–(65). It is seen that torque ripple is controlled in all inverter frequency bands. At this time, the beat of U-phase current Iu is also suppressed at the same time. This control system is to control torque current Iq at a constant level, which can also be confirmed from the simulation results. At this time, as exciting current Id is not specifically controlled, pulsation of 120 Hz is generated in exciting current Id. This indicates that the influences of fluctuation of DC link voltage Vdc are all reflected on exciting current Id so that torque current Iq is kept at a constant level. Irrespective of pulsation of exciting current Id, no pulsation is generated on secondary magnetic flux φ2. This indicates that the response of secondary magnetic flux φ2 is slow, which does not able to react to 120 Hz ripple of exciting current Id. Torque Tm is expressed by a product of secondary magnetic flux φ2 and q-axis current, that is, torque current Iq. As no ripple is present in any of secondary magnetic flux φ2 and torque current Iq, the result indicates that torque ripple is suppressed.

Accordingly, the torque fluctuation resulting from the pulsation of DC link voltage Vdc can be suppressed by the power conversion system when constructed as described above. Further, because compensation value Δθv is adjusted in consideration of the operating state, according to inverter output angular frequency ωi, motor rotating angular frequency ωr, output voltage vector phase angle θv on the dq-axis coordinate system, torque current iq, secondary magnetic flux φ2d, motor parameters and supply angular frequency ωso or DC link voltage fluctuating frequency, its effect can be expected in any operating state. The method of compensation is analytically obtained and it is possible to facilitate the adjustment on an actual machine.

Figure 24:
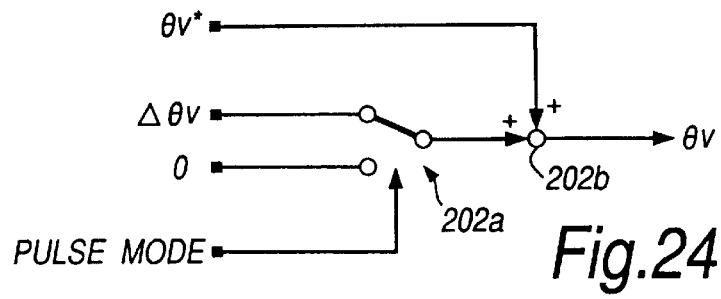
FIG. 24 is a block diagram illustrating a schematic construction of a part of a power conversion system according to a thirteenth embodiment of this invention.

FIG. 24 is a block diagram illustrating a part of a power conversion system according to a thirteenth embodiment of the present invention. As this embodiment differs from the twelfth embodiment in only the computing portion of output voltage phase angle θv on the dq-axis rotatory coordinate system (that is, adder 102 in FIG. 13), only this portion will be explained.

For instance, when considering an electric vehicle driving system, there are various pulse modes as PWM systems, for instance, asynchronous, synchronous 9 pulses, synchronous 5 pulses, synchronous 3 pulses, synchronous single pulse which are decided by the number of pulses contained in a half cycle of output voltage. Which pulse mode in what speed range is to be adopted is determined according to an object to be controlled and switching devices. In FIG. 24, it is indicated that the phase angle correction to output voltage on the dq-axis coordinate system is not executed in a certain pulse mode. For instance, in a certain pulse mode, output voltage phase angle θv on the dq-axis coordinate system is obtained by adding zero to output voltage phase angle reference θv* by an adder 202b instead of output voltage phase angle Δθv on the dq-axis coordinate system by a change-over switch 202a.

When constructed as described above, it becomes possible to execute a proper beatless control for each pulse mode. Accordingly, in a low speed range wherein no torque ripple is generated as a beat phenomenon or in a pulse mode wherein the magnitude of the output voltage vector can be controlled at discretion and at a high speed, it is possible to suppress the deterioration of torque characteristic by cutting off beatless control that will become unnecessary so as to suppress unnecessary interference.

Figure 25:
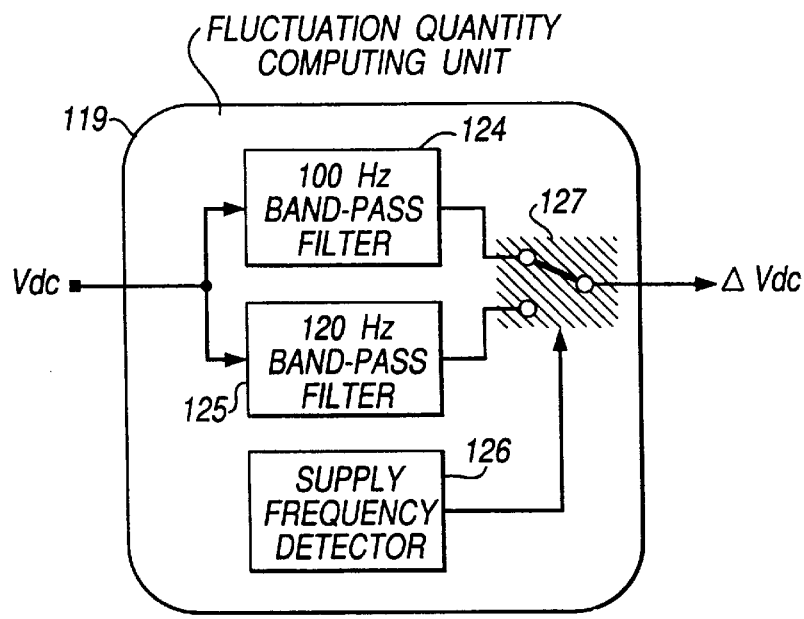
FIG. 25 is a block diagram illustrating a schematic construction of a part of a power conversion system according to a fourteenth embodiment of this invention.

FIG. 25 is a block diagram illustrating a part of a power conversion system according to a fourteenth embodiment of the present invention. As this embodiment differs from the twelfth embodiment only in fluctuation quantity computing unit 119 which computes DC link voltage fluctuation quantity ΔVdc, only this portion will be explained.

For instance, in case of an electric vehicle which is operated in both the 50 Hz and 60 Hz power supply areas, the fluctuation frequency of the DC link voltage changes 100/120 Hz depending on the supply power. In this case, as shown in FIG. 25, a 100 Hz band-pass filter 124 and a 120 Hz band-pass filter 125 are provided, and the outputs of band-pass filters 124, 125 are changed over by a change-over switch 127 according to the supply frequency detected by a supply frequency detector 126 in fluctuation quantity computing unit 119. For instance, when it is detected that the supply frequency is 50 Hz, the output of 100 Hz band-pass filter 124 is made as DC link voltage fluctuating quantity ΔVdc.

When constructed as described above, even when supply frequency is changed over to 50 Hz/60 Hz, as the fluctuating frequency component is extracted by changing the band-pass filter characteristic, gain and phase are no longer attached at the stage of detection and it is possible to maintain the beatless control effect. A band-pass filter extracts a certain specific frequency component only. It is assumed that a signal is of 120 Hz, for example. For a band-pass filter for detecting 100 Hz signal, a gain of the 120 Hz signal drops and its phase lags or leads. So, in case of a beat suppression system which is supposed to receive 50 Hz supply frequency, the effect of suppressing the torque ripple is largely deteriorated in the section of 60 Hz supply frequency.

Here, as a signal that is used for changing over the band-pass filter outputs, supply frequency is shown. Similar effect is obtained by detecting the fluctuating frequency of the DC link voltage and using it as a change-over signal.

Figure 26:
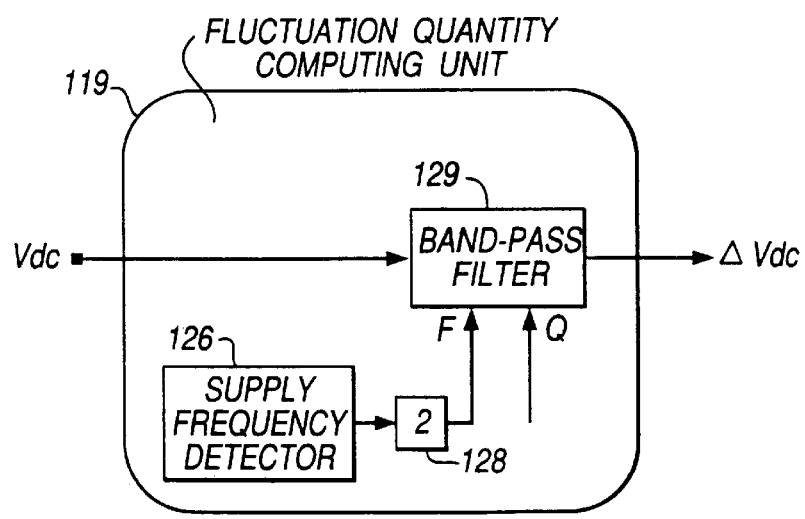
FIG. 26 is a block diagram illustrating a schematic construction of a part of a power conversion system according to a fifteenth embodiment of this invention.

FIG. 26 is a block diagram illustrating a part of a power conversion system according to a fifteenth embodiment of the present invention. As this embodiment differs from the twelfth embodiment only in fluctuation quantity computing unit 119 to compute DC link voltage fluctuating quantity ΔVdc, only this portion will be explained. In FIG. 26, it is shown that even when supply frequency changes subtly including a case where supply frequency is changed over to 50 Hz/60 Hz as shown in FIG. 25, the fluctuating frequency is detected by supply frequency detector 126 and the frequency characteristic of a band-pass filter 129 is controlled accordingly. FIG. 26 shows a construction realized by a software. For instance, a transfer function of band-pass filter 129 is assumed to be expressed by equation (67) and the angular frequency [rad/s] detected by supply frequency detector 126 and doubled by a multiplier 128 is set as a characteristic frequency F [rad/s]. Even when DC link voltage fluctuating frequency is set for characteristic frequency F, a similar function can be obtained.

$$\frac{Fs/Q}{s^2 + Fs/Q + F^2} \quad (67)$$

Where Q is a Q value of band-pass filter 129. Further, a plurality of band-pass filters may be set for a plurality of frequencies and the change-over may be made according to the frequency likewise FIG. 25.

When constructed as described above, even when supply frequency is changed subtly including a case where supply frequency is changed over to 50 Hz/60 Hz, the band-pass filter characteristic does not change against fluctuating frequency and therefore, it is possible to maintain the beatless control effect. When a Q value of a band-pass filter is high without changing the band-pass filter characteristic against the fluctuation of supply frequency, signal gain decreases and the lag or lead of the phase is large, and as a result, a high precision torque fluctuation suppression characteristic is not obtained. By having the characteristic frequency of a band-pass filter cope with instantaneous supply frequency, its effect can be always obtained.

Although supply frequency is shown here as a signal that is used for changing over, a similar action is obtained even when DC link voltage fluctuating frequency is detected and is used as a change-over signal.

Figure 27:
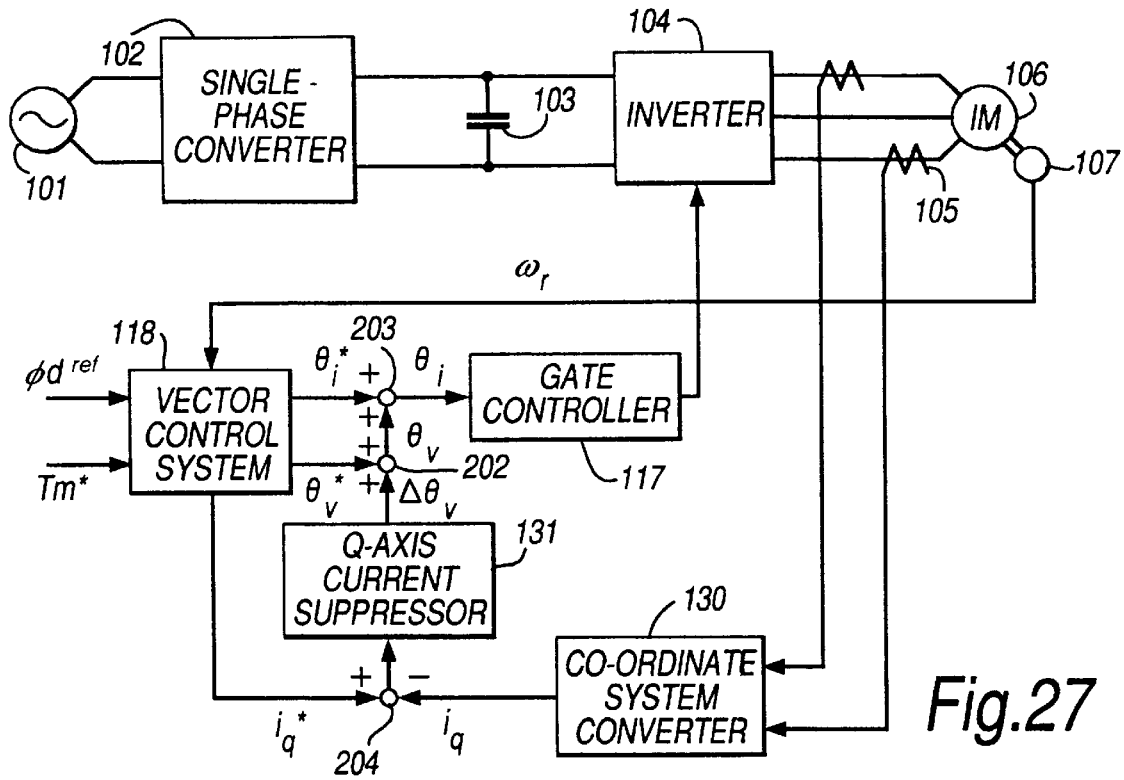
FIG. 27 is a block diagram illustrating a schematic construction of a power conversion system according to a sixteenth embodiment of this invention.

FIG. 27 is a block diagram illustrating a power conversion system according to a sixteenth embodiment of the present invention. As this embodiment differs from the twelfth embodiment only in the computing portion of correction quantity Δθv to output voltage phase angle on the dq-axis rotatory coordinate system, this portion only will be explained.

Phase currents of induction motor 106 detected by current detector 105 are converted to current quantities on the dq-axis coordinate system by a coordinate system converter 130. Out of these current quantities, q-axis current iq is subtracted from q-axis current command value iq* that is used in vector control system 118 by a subtractor 204 to obtain a q-axis current deviation, which is input to a q-axis current suppressor 131. In this q-axis current suppressor 131, for instance PI control is executed by inputting this q-axis current deviation. This control system in q-axis current suppressor 131 is not restricted to PI control only. The output of q-axis current suppressor 131 becomes correction quantity Δθv to output voltage phase angle on the dq-axis coordinate system.

When constructed as described above, it becomes possible to control the q-axis current, that is the torque current, to a constant level as the output voltage phase angle is controlled according to the q-axis current deviation. As the secondary magnetic flux is maintained nearly at a constant level as described above, it becomes possible to suppress the torque ripple. Further, as it is a feedback control, its effect can be expected even when there are disturbance and/or modeling error.

Figure 28:
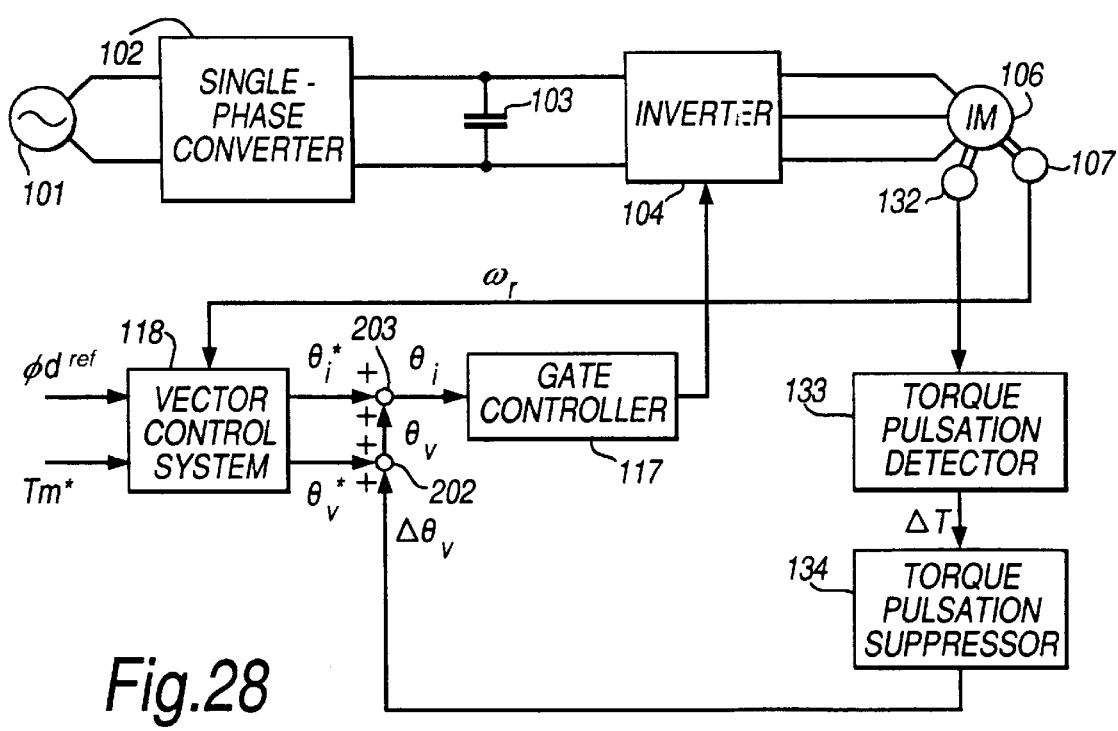
FIG. 28 is a block diagram illustrating a schematic construction of a power conversion system according to a seventeenth embodiment of this invention.

FIG. 28 is a block diagram illustrating a power conversion system according to a seventeenth embodiment of the present invention. As this embodiment differs from the twelfth embodiment only in the computing portion of correction quantity Δθv to output voltage phase angle on the dq-axis rotatory coordinate system, this portion only will be explained.

A torque detector 132 is provided to induction motor 106 and a generated torque detected by torque detector 132 is input to a torque pulsation detector 133. When a torque estimator which estimates and computes a generating torque is used instead of torque detector 132, a similar action is obtained. Torque pulsation detector 133 computes and detects a torque pulsation quantity ΔT and inputs it to a torque pulsation suppressor 134. Torque pulsation suppressor 134 executes, for instance, PI control by inputting torque pulsation quantity ΔT. This control system in torque pulsation suppressor 134 is not restricted to the PI control only. The output of torque pulsation suppressor 134 becomes correction quantity Δθv to output voltage phase angle on the dq-axis coordinate system.

When constructed as described above, as output voltage phase angle is controlled according to torque pulsation, it becomes possible to suppress torque pulsation. Because this is the feedback control, its effect can be expected even when there are disturbance and/or modeling error.

Figure 29:
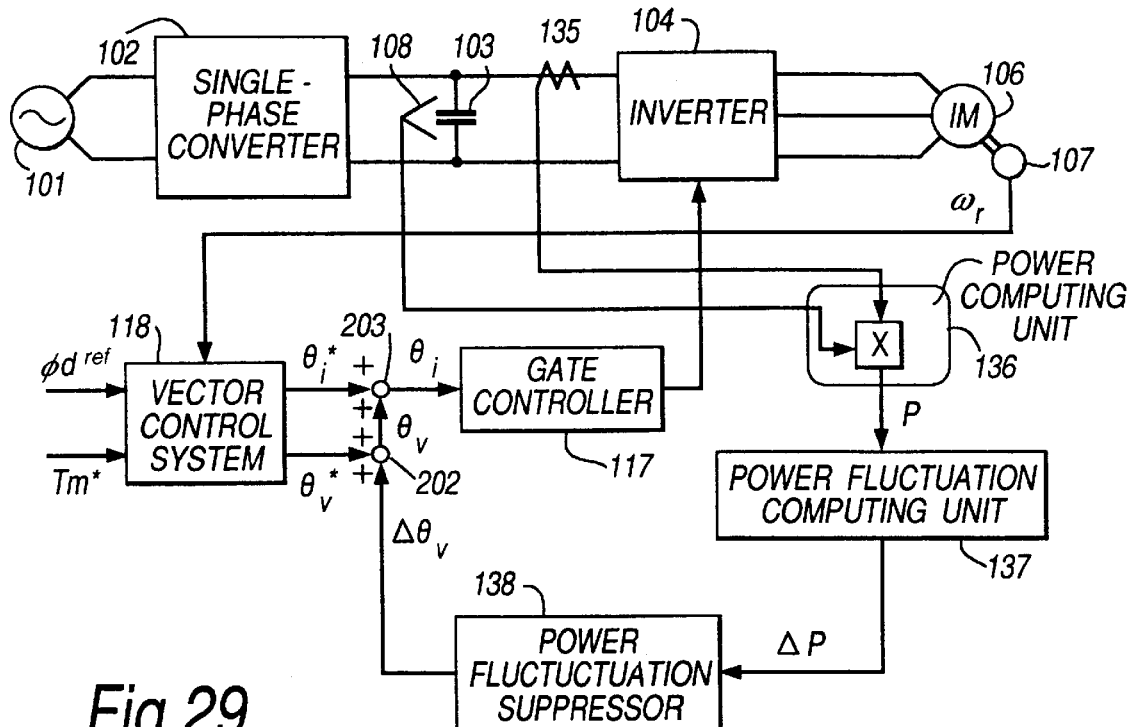
FIG. 29 is a block diagram illustrating a schematic construction of a power conversion system according to an eighteenth embodiment of this invention.

FIG. 29 is a block diagram illustrating a power conversion system according to an eighteenth embodiment of the present invention. As this embodiment differs from the twelfth embodiment only in the computing portion of correction quantity Δθv to output voltage phase angle on the dq-axis rotatory coordinate system, this portion only will be explained.

Voltage detector 108 detects DC link voltage Vdc and a current detector 135 detects a current flowing to inverter 104 from DC capacitor 103. A power computing unit 136 computes a power that is consumed in inverter 104. For instance, by multiplying DC link voltage with current flowing to inverter 104 from DC capacitor 103, a power P of inverter 104 is obtained. Power P calculated by power computing unit 136 is input to a power fluctuation computing unit 137 and a power fluctuation AP is calculated.

Calculated power fluctuation quantity AP is input to a power fluctuation suppressor 138. In power fluctuation suppressor 138, for instance, PI control is executed by inputting power fluctuation quantity ΔP. This control system in power fluctuation suppressor 138 is not restricted to PI control only. The output of power fluctuation suppressor 138 becomes correction quantity Δθv to output voltage phase angle on the dq-axis coordinate system.

When constructed as described above, it becomes possible by controlling the output voltage phase angle according to power fluctuation ΔP of inverter 104 to suppress fluctuation ΔP of power P that is consumed in inverter 104. The most part of power consumed in inverter 104 is the motor output. Therefore, by controlling power consumed in inverter 104 to a constant level, it is possible to suppress fluctuation of the motor output. As torque ripple affects the motor output, by suppressing fluctuation of the motor output, it becomes possible to suppress torque ripple.

Figure 30:
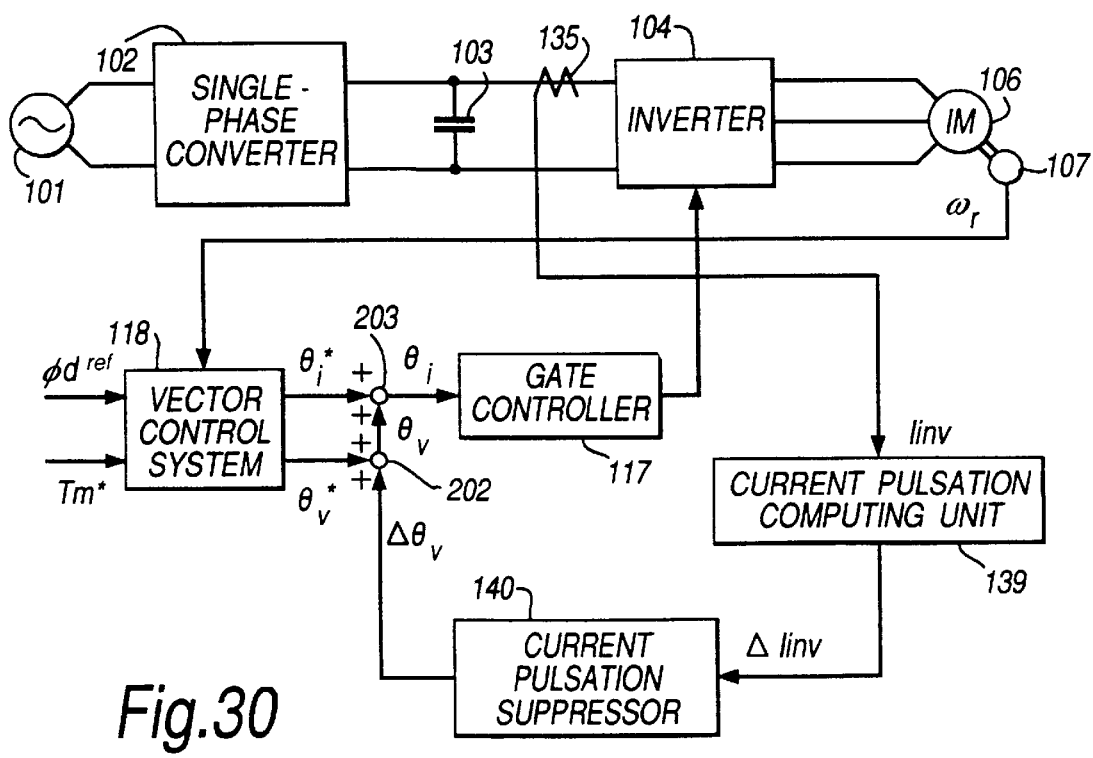
FIG. 30 is a block diagram illustrating a schematic construction of a power conversion system according to a nineteenth embodiment of this invention.

FIG. 30 is a block diagram illustrating a power conversion system according to a nineteenth embodiment of the present invention. As this embodiment differs from the twelfth embodiment only in the computing portion of correction quantity Δθv to output voltage phase angle on the dq-axis rotatory coordinate system, only this portion will be explained.

A current Iinv detected by current detector 135 and flowing to inverter 104 from DC capacitor 103 is input to a current pulsation computing unit 139. In current pulsation computing unit 139, a pulsation quantity ΔIinv of input quantity Iinv is computed. Computed inverter current fluctuation quantity ΔIinv is input to a current pulsation suppressor 140. In current pulsation suppressor 140, for instance, PI control is executed by inputting inverter current fluctuating quantity ΔIinv. This control system in current pulsation suppressor 140 is not restricted to the PI control only. The output of current pulsation suppressor 140 becomes correction quantity Δθv to output voltage phase angle on the dq-axis rotatory coordinate system.

When constructed as described above, by controlling output voltage phase angle on the dq-axis according to the ripple of the current flowing to inverter 104 from DC capacitor 103, it becomes possible to suppress the ripple of the current flowing to inverter 104 from DC capacitor 103. As power consumed by inverter 104 fluctuates simultaneously with generation of the torque ripple, the pulsation of current flowing to inverter 104 is generated similarly. By suppressing this inverter current pulsation, the motor power pulsation is suppressed, and the torque ripple can be suppressed accordingly.

Figure 31:
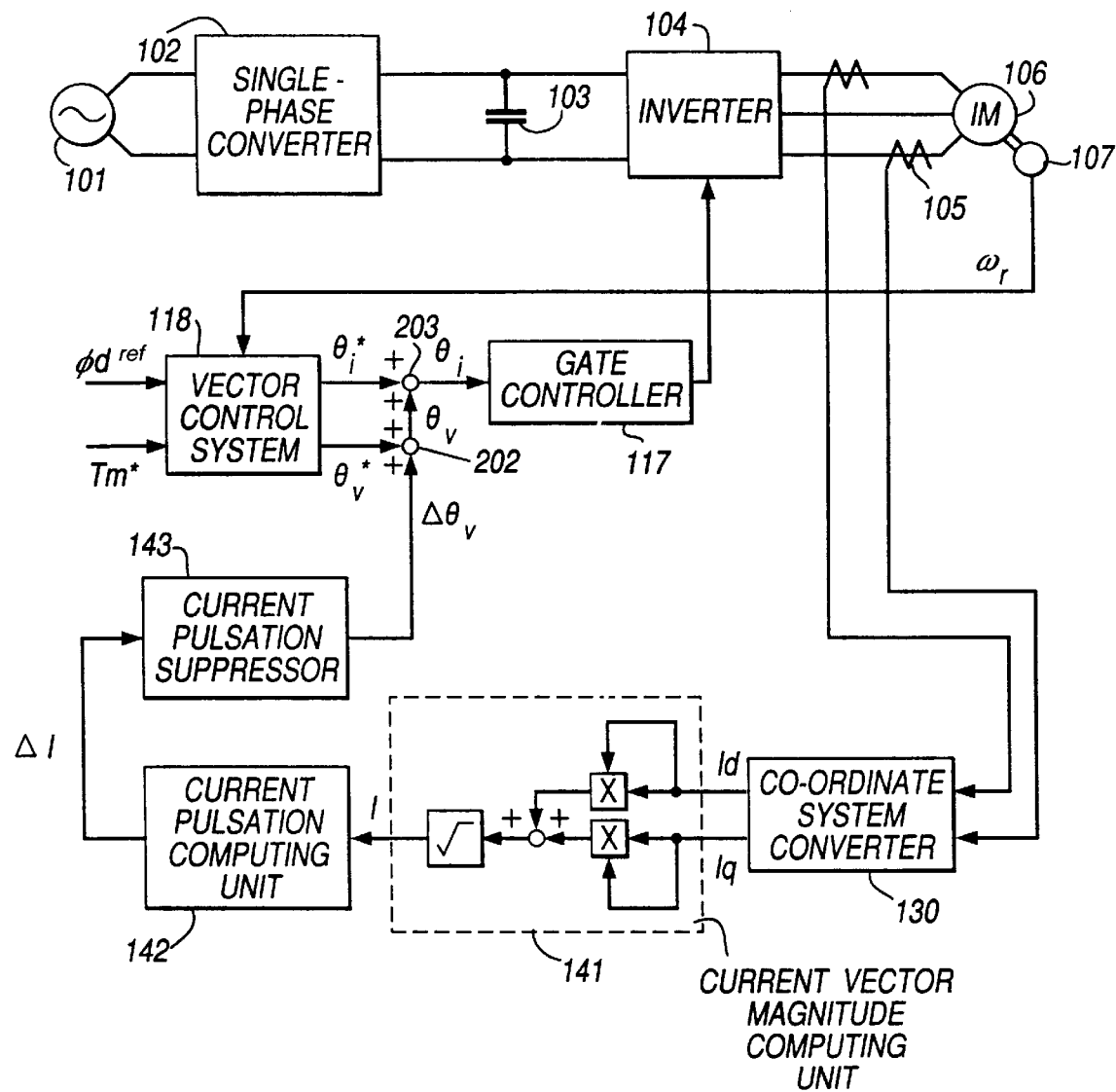
FIG. 31 is a block diagram illustrating a schematic construction of a power conversion system according to a twentieth embodiment of this invention.

FIG. 31 is a block diagram illustrating a power conversion system according to a twentieth embodiment of this invention. As this embodiment differs from the twelfth embodiment only in a computing portion of correction quantity Δθv to output voltage phase angle on the dq-axis rotatory coordinate system, only this portion will be explained.

Motor phase currents detected by current detector 105 are converted to currents Id, Iq on the dq-axis rotatory coordinate system by coordinate converter 130. In a current vector magnitude computing unit 141, a magnitude I of a current vector on the dq-axis rotatory coordinate system is calculated from a square root of the sum of squares of currents Id, Iq. Calculated current vector magnitude I is input to a current pulsation computing unit 142 and its pulsation quantity ΔI is calculated. This current pulsation quantity ΔI is input to a current pulsation suppressor 143. In current pulsation suppressor 43, for instance, PI control is executed. This control system is not, however, restricted to the PI control only. The output of current pulsation suppressor 143 becomes correction quantity Δθv to output voltage phase angle on the dq-axis rotatory coordinate system.

When constructed as described above, it becomes possible to suppress the fluctuation of the magnitude of current vector on the dq-axis rotatory coordinate system. As previously stated, by suppressing torque current ripple, torque ripple can be suppressed. At this time, even when torque current is constant, the exciting current, that is the d-axis current does not become constant. However, the exciting current ripple when the torque current becomes constant is small, and also, the fluctuation quantity of the magnitude of the current vector becomes relatively small. Accordingly, it is possible to suppress torque current, that is, torque pulsation by controlling so as to make the magnitude of current vector constant on the dq-axis rotatory coordinate system.

Figure 32:
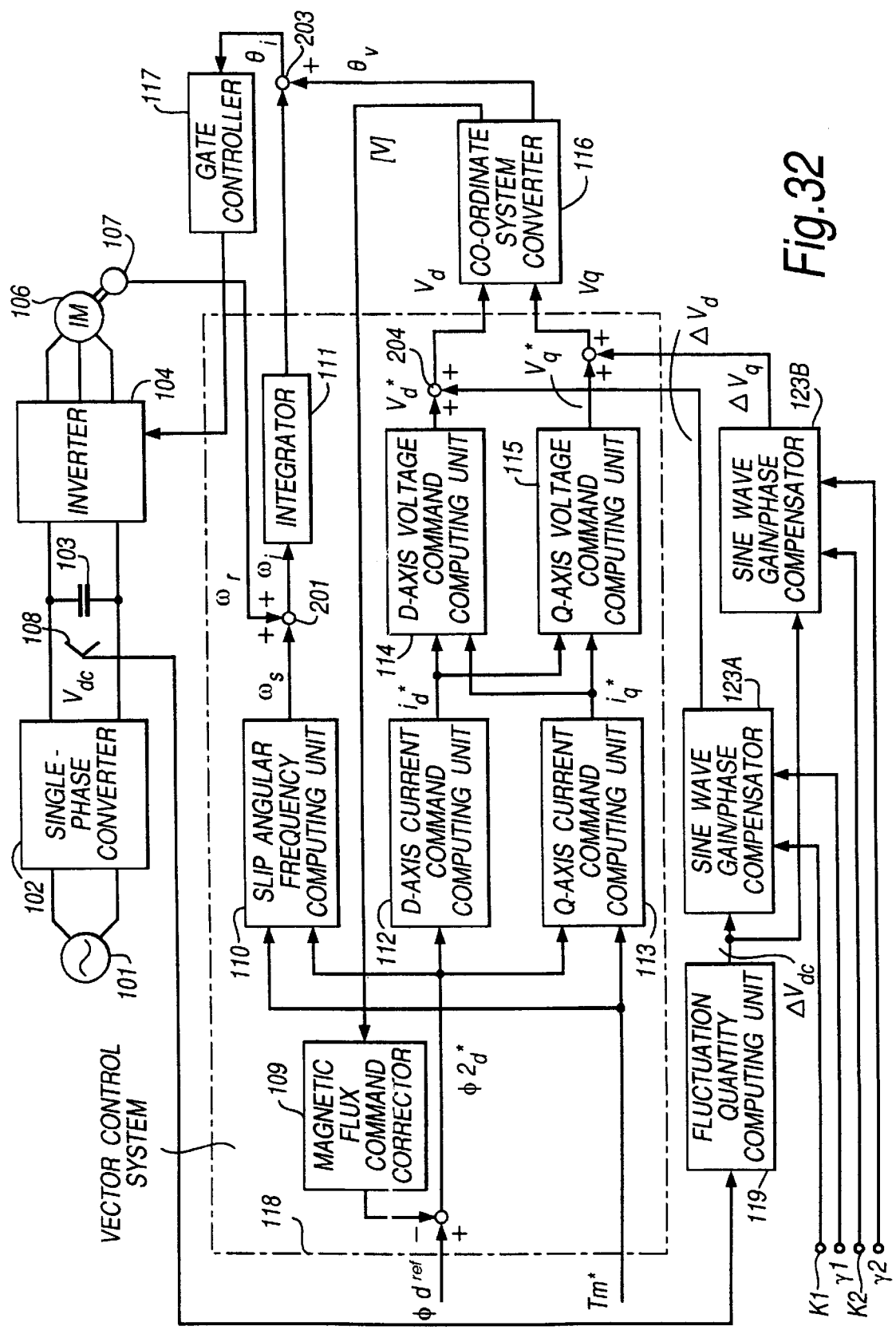
FIG. 32 is a block diagram illustrating a schematic construction of a power conversion system according to a twenty-first embodiment of this invention.

FIG. 32 is a block diagram illustrating a power conversion system according to a twenty-first embodiment of the present invention. As this embodiment differs from the twelfth embodiment only in a computing portion of correction quantity Δθv to output voltage phase angle on the dq-axis. rotatory coordinate system, only this portion will be explained.

DC link voltage Vdc detected by voltage detector 108 is input to fluctuation quantity computing unit 119 and sine wave ΔVdc that is its fluctuating quantity is calculated. This fluctuating sine wave ΔVdc is input to a sine wave gain/ phase compensator 123A and a sine wave gain/phase compensator 123B. In each of gain/phase compensators 123A, 123B, gain and phase are compensated for input sine wave as shown in FIG. 16. In this embodiment, K1 and γ1 are compensated as gain and phase, respectively. The output of sine wave gain/phase compensator 123A becomes a compensation quantity ΔVd to d-axis output voltage. Similarly, in sine wave gain/phase compensator 123B, a compensation quantity ΔVq to q-axis output voltage is calculated by inputting fluctuating sine wave ΔVdc of DC link voltage Vdc, and by compensating for input sine wave ΔVdc with a gain K2 and a phase γ2. Compensation quantity ΔVd to d-axis output voltage is added to d-axis voltage reference Vd* in an adder 204 to obtain d-axis output voltage Vd. Compensation quantity ΔVq to q-axis output voltage is added to q-axis voltage reference Vq* in an adder 205 to obtain q-axis output voltage Vq.

When constructed as described above, it is possible to have d-axis output voltage Vd and q-axis output voltage Vq pulsate independently by superposing respective correction quantities to them according to the fluctuation of DC link voltage Vdc. In this case, correction quantity ΔVd to d-axis output voltage Vd and correction quantity ΔVq to q-axis output voltage Vq are sine waves having amplitude and phase which are independent each other. According to equations (58)–(61), it is indicated that when dq-axis voltages are fluctuated properly against the fluctuation of DC link voltage, torque ripple can be suppressed. Accordingly, when independent compensating signals ΔVd, ΔVq are superposed on d-axis output voltage Vd and q-axis output voltage Vq, it is possible to suppress torque ripple.

Figure 33:
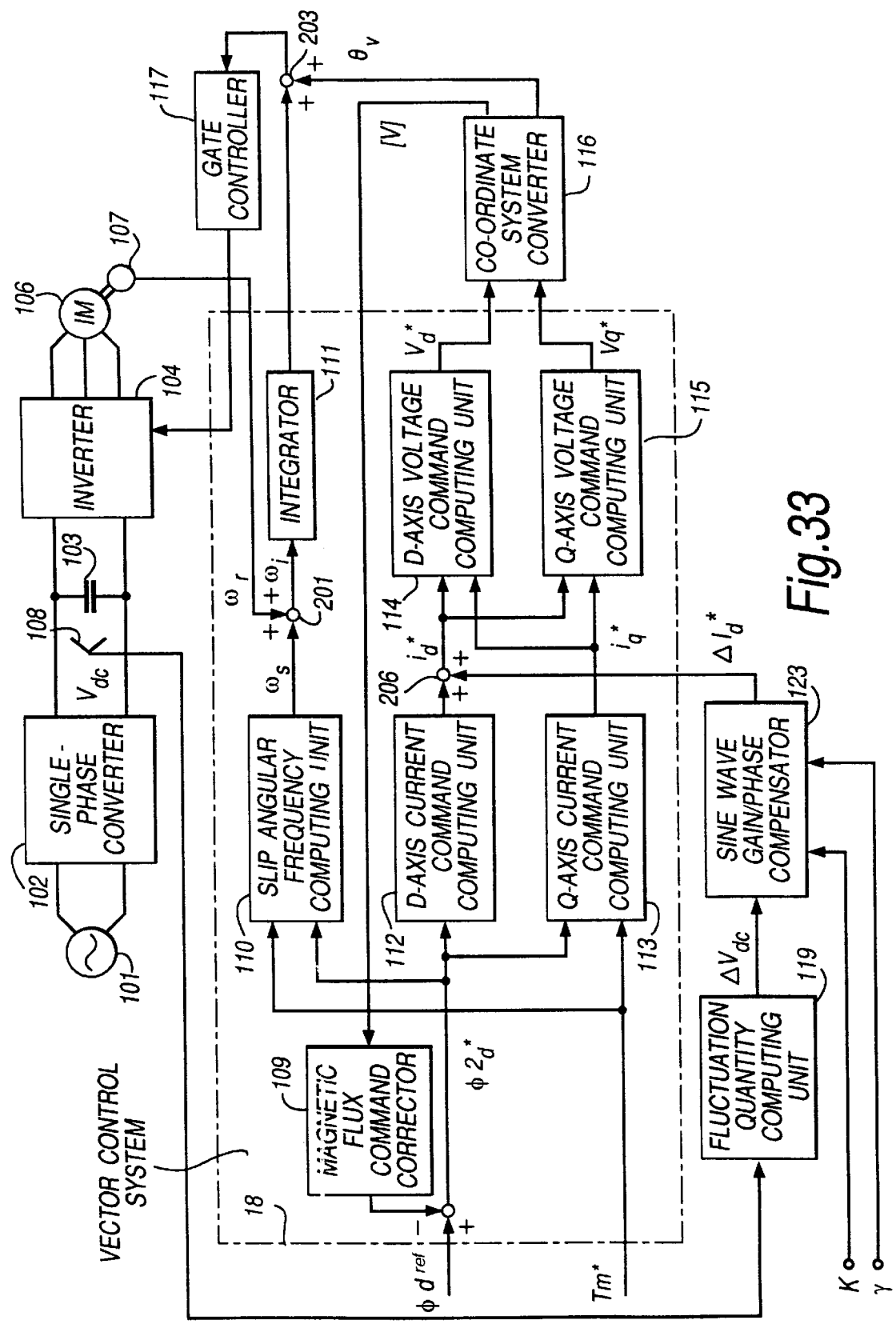
FIG. 33 is a block diagram illustrating a schematic construction of a power conversion system according to a twenty-second embodiment of this invention.

FIG. 33 is a block diagram illustrating a power conversion system according to a twenty-second embodiment of the present invention. As this embodiment differs from the twelfth embodiment only in the calculation of d-axis current command value, only this portion will be explained.

In vector control system 118, by inputting secondary magnetic flux command value φ2d*, d-axis current command value id* is generated by d-axis current command computing unit 112. DC link voltage Vdc is detected by voltage detector 108 and is input to fluctuating quantity computing unit 119. In fluctuating quantity computing unit 119, sine wave ΔVdc that is its fluctuating quantity is calculated. This fluctuating sine wave ΔVdc is input to sine wave gain/phase compensator 123. In sine wave gain/phase compensator 123, input sine wave ΔVdc is compensated with gain and phase as shown in FIG. 16. In this embodiment, K and γ are compensated as gain and phase, respectively. The output of sine wave gain/phase compensator 123 is a correction quantity ΔId* to d-axis current command id*. Correction quantity LId* is added to d-axis current command Id* by an adder 206 and becomes an input to d-axis voltage command computing unit 114 and q-axis voltage command computing unit 115.

When constructed as described above, it is possible to have d-axis current pulsate by superposing correction quantity on d-axis current command. As described above, when DC link voltage fluctuates and torque current ripple is suppressed, the exciting current does not become constant and pulsates at the same frequency as that of the DC link voltage. Therefore, when superposing sine wave ΔId*, that is obtained by compensating fluctuating sine wave ΔVdc of DC link voltage with gain and phase, on d-axis current command and intentionally having d-axis current pulsate, it becomes possible to suppress torque current ripple. As secondary magnetic flux is slow to follow d-axis current and is maintained nearly at a constant level, the torque ripple suppression can be expected.

Figure 34:
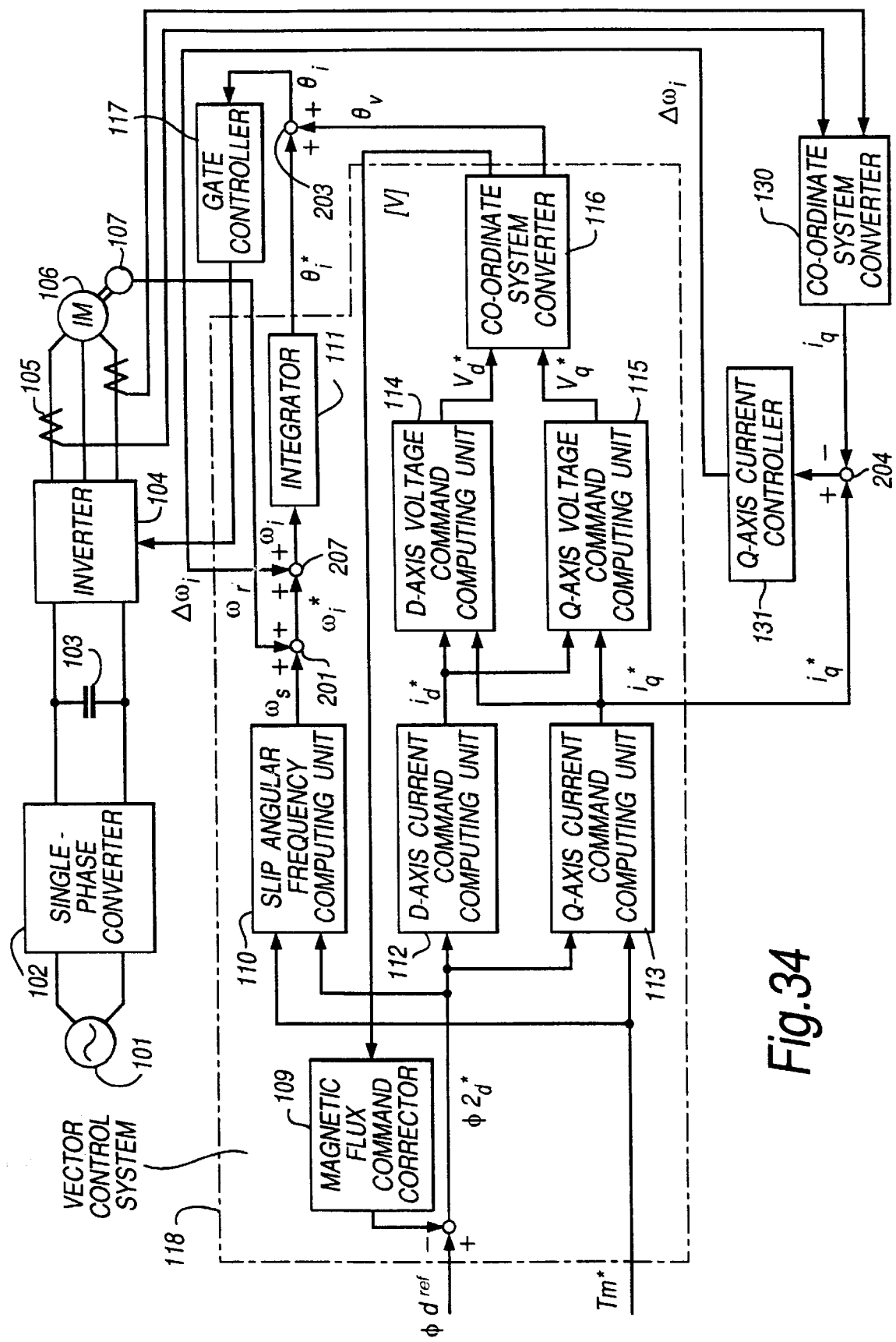
FIG. 34 is a block diagram illustrating a schematic construction of a power conversion system according to a twenty-third embodiment of this invention.

FIG. 34 is a block diagram illustrating a power conversion system according to a twenty-third embodiment of the present invention. As this embodiment differs from the twelfth embodiment only in the dimension of correction quantity, only this portion will be explained.

While in the sixteenth embodiment shown in FIG. 27, q-axis current controller 131 generates correction quantity Δθv for output voltage phase angle on the dq-axis rotatory coordinate system, in this embodiment shown in FIG. 34, correction quantity Δωi for inverter output angular frequency is generated from q-axis current controller 131. Then, inverter angular frequency ωi is generated by adding in an adder 207 this correction quantity Δωi to output ωi* of adder 201.

When constructed as described above, the inverter frequency is adjusted according to the DC link voltage. This is equivalent to having the rotating frequency of the dq-axis rotatory coordinate system pulsate when considered in the vector control. From the theoretical analysis mentioned above, the control of the output voltage phase on the dq-axis rotatory coordinate system is indispensable for the torque ripple suppression. Here, the d-axis does mean the secondary magnetic flux. In other words, in order to suppress the torque ripple it is indispensable to adjust a phase angle from the secondary magnetic flux to the output voltage axis. If the rotating frequency of the dq-axis rotatory coordinate system is forced to pulsate as in this embodiment, the d-axis and the secondary magnetic flux axis do not agree with each other. Therefore, characteristics may possibly be deteriorated by unnecessary interference, as this is not in the ideal state for the vector control. However, if the control speed in the vector control is slow and the control does not interfere the pulsation of rotating frequency of the dq-axis rotatory coordinate system, the output voltage phase angle on the dq-axis rotatory coordinate system becomes constant. In this case, as the rotating frequency of the dq-axis rotatory coordinate system pulsates, the output voltage phase angle on the dq-axis rotatory coordinate system is constant and the rotating frequency of the secondary magnetic flux is constant as described above, the phase angle of the output voltage axis against the secondary magnetic flux pulsates. Thus, it is possible to suppress torque ripple.

Further, this embodiment is based on the sixteenth embodiment but even when it is based on the seventeenth through the twenty-second embodiments, similar action and effect are obtained when adjusting the inverter frequency instead of adjusting the output voltage phase angle on the dq-axis rotatory coordinate system.

As described above, when q-axis current is controlled to a constant level by controlling the output voltage on the dq-axis rotatory coordinate system in the state wherein the DC link voltage fluctuates, the d-axis current pulsates, but as the secondary magnetic flux does not follow the pulsation of the d-axis current, the secondary magnetic flux does not pulsate. Accordingly, as both the secondary magnetic flux and the q-axis current are constant, the torque ripple can be suppressed.

Furthermore, other effects shown below can be obtained.

(1) When q-axis current is controlled to a constant level by controlling output voltage phase angle on the dq-axis rotatory coordinate system under the state wherein the DC link voltage fluctuates, the d-axis current pulsates, but as the secondary magnetic flux does not follow the pulsation of the d-axis current, the secondary magnetic flux does not pulsate. Accordingly, as both the secondary magnetic flux and the q-axis current are constant, the torque ripple can be suppressed.

(2) Under the state wherein the DC link voltage fluctuates, the torque fluctuation is reflected on the dq-axis output voltage, the torque is directly detected and the output voltage or the output voltage phase angle is adjusted so as to suppress the torque fluctuation, and therefore, it becomes possible to suppress the torque fluctuation more effectively.

(3) The pulsation of the power consumed by the inverter is suppressed by reflecting the fluctuation of the power on dq-axis output voltage under the state wherein the DC link voltage fluctuates, the power consumed by the inverter is various losses plus mechanical output, and mechanical output is sufficiently larger than various losses. Mechanical output is a product of velocity and torque and velocity does not change at a high speed. Therefore, it becomes possible to suppress the torque fluctuation.

(4) Pulsation of the current flowing to the inverter from the DC capacitor is strongly affected by the fluctuation of the power that is consumed by the inverter. Therefore, it is possible to suppress the pulsation of the power consumed by the inverter by suppressing the pulsation of the current flowing to the inverter from the DC capacitor. As previously stated, the pulsation of the power consumed by the inverter largely affects the torque ripple, it is possible to suppress the torque ripple by suppressing the pulsation of the current flowing to the inverter from the DC capacitor.

(5) When suppressing the torque ripple under the state wherein the DC link voltage is fluctuating, it is indispensable to make the torque current ripple small. Under the state wherein this torque current ripple is suppressed, even when the inverter operating mode is the one pulse mode and the magnitude of the output voltage cannot be suppressed at discretion, the exciting current somewhat pulsates but the pulsating quantity becomes small. Therefore, it is possible to suppress both d-axis and q-axis current ripples by suppressing the fluctuation of the current values on the dq-axis, and thus, the torque ripple can be suppressed.

(6) When the fluctuations of d-axis voltage and q-axis voltage are controlled independently according to the DC link voltage under the state wherein the DC link voltage fluctuates, the q-axis current ripple can be suppressed. As the secondary magnetic flux becomes constant as previously stated, the torque ripple can be suppressed.

(7) Under the condition wherein the DC link voltage fluctuates and the inverter output voltage cannot be controlled at discretion and at a high speed, it is not possible to control the dq-axis current to a constant level. Therefore, when the d-axis current is forced to pulsate intentionally and the q-axis current is controlled to a constant level, the secondary magnetic flux becomes constant as previously stated, the torque ripple can be suppressed accordingly.

(8) If a torque ripple compensating method or compensating gains, etc. are changed when operating conditions are changed under the state wherein the DC link voltage fluctuates, it is possible to suppress the torque ripple effectively regardless of the operating state.

(9) When the torque command is changed under the state wherein the DC link voltage fluctuates, a torque ripple compensating method or compensating gains, etc. are changed, it becomes possible to suppress the torque ripple effectively regardless of the torque command.

(10) If a torque ripple compensating method or compensating gains, etc. are changed when parameters of the induction motor, which is a load, changes under the state wherein the DC link voltage fluctuates, it is possible to suppress the torque ripple effectively regardless of the fluctuation of parameters of the induction motor.

(11) When a torque ripple compensating method or compensating gains, etc. are changed in the powering and braking operations under the state wherein the DC link voltage fluctuates, it is possible to suppress the torque ripple effectively regardless of the powering and braking operations.

(12) If a torque ripple compensating method or compensating gains, etc. are changed when the output voltage vector phase angle on the dq-axis coordinate system changes under the state wherein the DC link voltage fluctuates, it is possible to suppress the torque ripple effectively regardless of the phase angle of the output voltage vector on the dq-axis coordinate system.

(13) If a torque ripple compensating method or compensating gains, etc are changed when the inverter output frequency changes under the state wherein the DC link voltage fluctuates, it is possible to suppress the torque ripple effectively regardless of the inverter output frequency.

(14) If a torque ripple compensating method or compensating gains, etc. are changed when the motor rotating frequency changes under the state wherein the DC link voltage fluctuates, it is possible to suppress the torque ripple effectively regardless of the motor rotating frequency.

(15) If a torque ripple compensating method or compensating gains, etc. are changed when the supply frequency or the DC link voltage fluctuating frequency changes under the state wherein the DC link voltage fluctuates, it is possible to suppress the torque ripple effectively regardless of the supply frequency or the DC link voltage fluctuating frequency.

(16) When the supply frequency changes to 50 Hz/60 Hz under the state wherein the DC link voltage fluctuates, if the detected pulsation frequency component is changed by judging whether the supply frequency is 50 Hz or 60 Hz, it is possible to suppress the torque ripple effectively regardless of the supply frequency which is either 50 Hz or 60 Hz.

(17) If the detected pulsating frequency component is changed according to the supply frequency when the supply frequency fluctuates under the state wherein the DC link voltage fluctuates, it is possible to suppress the torque ripple effectively even when the supply frequency fluctuates.

(18) Under the state wherein the DC link voltage fluctuates, even when the PWM operating mode is one pulse mode, the torque ripple can be suppressed by changing the dq-axis voltage by adjusting the dq-axis output voltage phase angle so as to control the q-axis current to a constant level.

(19) When suppressing the torque ripple by the vector control under the state wherein the DC link voltage fluctuates, the torque ripple can be suppressed by adjusting the inverter output frequency.

(20) Torque ripple is generated if the magnitude of the inverter output voltage cannot be controlled at discretion and at a high speed. But it may be possible to control the magnitude of the inverter output voltage at discretion and at a high speed depending on a PWM operating mode. So, it is possible to prevent the deterioration of torque fluctuation suppression characteristics by suppressing unnecessary interference if the torque ripple is not suppressed in this region.

As described above, according to the present invention, when the power supply is, for instance, of a single-phase, the torque ripple can be suppressed if the inverter output frequency is around two times of the supply frequency. And, it becomes possible to achieve the reduction of noise and the drop of failure rates of mechanical system as well as electrical system. Further, when applied to an electric vehicle, this invention has an effect to improve the riding comfort.

Further, as this invention executes the compensations in order by theoretically obtained compensating quantities, it is possible to suppress the torque ripple for any operating state or any control objects having difference parameter values, and therefore, time and labor required for adjustment can be reduced sharply.

Hereinafter, another embodiment of the present invention will be described with reference to the attached drawings.

Figure 35:
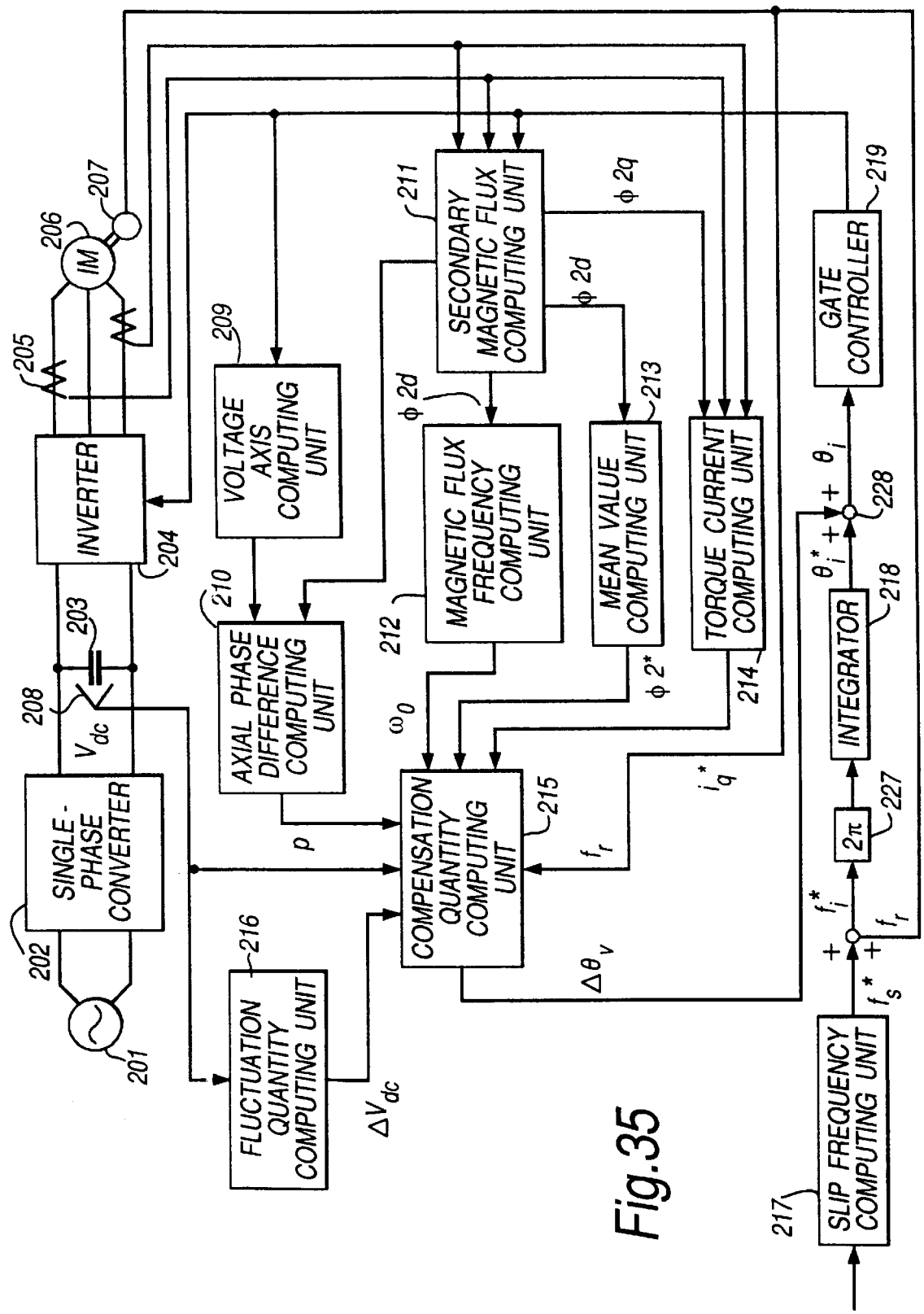
FIG. 35 is a block diagram illustrating a schematic construction of a power conversion system according to a twenty-fourth embodiment of this invention.

FIG. 35 is a block diagram illustrating a schematic construction of a power conversion system according to a twenty-fourth embodiment of this invention.

In FIG. 35, a single-phase AC power of a single-phase power supply 201, for instance, a single-phase voltage is converted to a DC power, for instance, a DC voltage by a single-phase converter 202. This DC voltage is further converted to a three-phase AC voltage by an inverter 204 and drives a three-phase induction motor 206.

A DC link voltage Vdc detected by a voltage detector 208 is input to a fluctuation quantity computing unit 216, and a DC link voltage fluctuation quantity $\Delta$Vdc is computed from a mean value of DC link voltage Vdc.

A voltage axis computing unit 209 computes an output voltage axis according to a switching command that is output from a gate controller 219. An axial phase difference computing unit 210 computes a phase difference $\rho$ from a secondary magnetic flux axis to the output voltage axis (a phase angle from a secondary magnetic flux vector to an inverter output voltage vector) by subtracting a secondary magnetic axis phase that is computed by a secondary magnetic flux computing unit 211, which will be described later, from the phase of the output voltage axis that is computed by voltage axis computing unit 209.

Secondary magnetic flux computing unit 211 computes secondary magnetic fluxes $\phi$2d, $\phi$2q of induction motor 206 by inputting phase currents of induction motor 206 detected by a current detector 205 and a switching command output from gate controller 219.

A magnetic flux frequency computing unit 212 computes a magnetic flux frequency (a secondary magnetic flux angular frequency) $\omega$o, that is a rotating frequency, by inputting secondary magnetic flux $\phi$2d computed by secondary magnetic flux computing unit 211.

A mean value computing unit 213 computes a mean value $\phi$2d* of secondary magnetic flux $\phi$2d that is computed by secondary magnetic flux computing unit 211. A torque current computing unit 214 computes a primary current component that is orthogonal to the secondary magnetic flux axis; a so-called torque current mean value iq* by inputting secondary magnetic flux $\phi$2q computed by secondary magnetic flux computing unit 211 and the phase currents detected by current detector 205.

Fluctuation quantity computing unit 216 computes DC link voltage fluctuation quantity $\Delta$Vdc from a mean value of DC link voltage Vdc by inputting DC link voltage Vdc detected by voltage detector 208.

A slip frequency computing unit 217 computes a slip frequency reference (a slip angular frequency reference) fs* by inputting a difference between a current command value and an actual current value. Slip frequency reference fs* is added to a motor rotating frequency fr that is detected by a speed detector 207 by an adder 226 to obtain an inverter frequency reference fi*.

A multiplier 227 multiplies inverter frequency reference fi* with $2\pi$ and an inverter angular frequency reference is produced. This inverter angular frequency reference is integrated to an inverter phase angle reference value $\theta$i* by an integrator 218.

A compensation quantity computing unit 215 calculates a compensation quantity $\Delta\theta$i as shown in equations (33A)–(36A), which are described later, by inputting DC link voltage Vdc, DC link voltage fluctuation quantity $\Delta$Vdc, phase difference $\rho$, secondary magnetic flux frequency $\omega$o, motor rotating frequency fr, secondary magnetic flux mean value $\phi$2* and torque current mean value iq*.

An adder 228 outputs an inverter phase angle $\theta$i by adding compensation quantity $\Delta\theta$i with inverter phase angle reference value $\theta$i* from integrator 218. Gate controller 219 inputs inverter phase angle $\theta$i and outputs the switching command for inverter 204.

Hereinafter, it will be described that the torque ripple can be suppressed by the system configured as described above, but first, definitions of symbols that are used here will be described. fr is motor rotating frequency, $\omega$r is motor angular frequency, $\omega$s is slip angular frequency, $\Delta$Vdc is DC link voltage fluctuation quantity, $\rho$ is phase angle, Vdc is DC link voltage, $\omega$o is secondary magnetic flux angular frequency, $\omega$i is inverter angular frequency, H1(s), H4(s) are transfer functions, R1 is a motor primary resistance, R2 is a motor secondary resistance, L1 is a motor primary self-inductance, L2 is a motor secondary self-inductance, M is a mutual inductance, and $\phi$2* represents secondary magnetic flux mean value.

In general, characteristics of induction motor 206 on the dq-axis rotatory coordinate system are described by equations (13), (14) as described above. Further, generated torque Tm is expressed by equation (15) as described above. Then, equations (16)–(24) are obtained as described above.

Assuming that torque fluctuation $\Delta$Tm is zero, the relation between fluctuation quantities $\Delta$Vq and $\Delta$Vd of the dq-axis outputs voltages is calculated as equations (25)–(27) as described above.

When fluctuation quantity $\Delta$Vd of the d-axis output voltage and fluctuation quantity $\Delta$Vq of the q-axis output voltage take the relation as shown by equations (25)–(27), it becomes possible to suppress the torque ripple.

Next, the relation between the dq-axis output voltage fluctuation quantities $\Delta$Vd and $\Delta$Vq, fluctuation quantity $\Delta$Vdc of DC link voltage Vdc and compensation quantity $\Delta\theta$i is derived.

Figure 36:
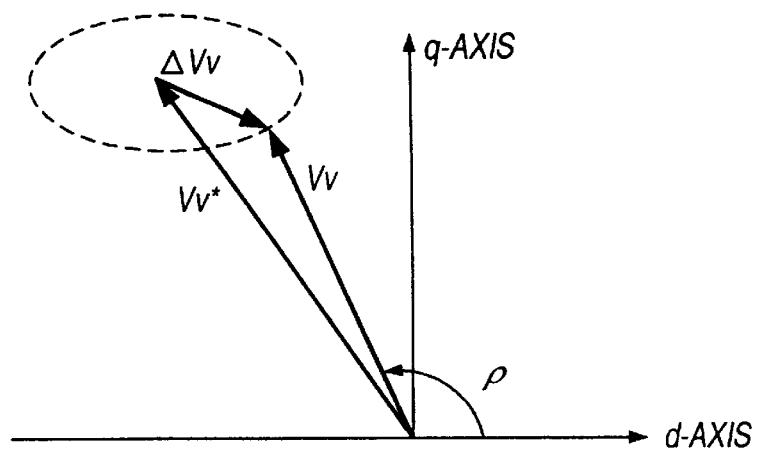
FIG. 36 is a diagram illustrating a vector of an output voltage of the inverter in dq-axis rotatory coordinate system.
Figure 37:
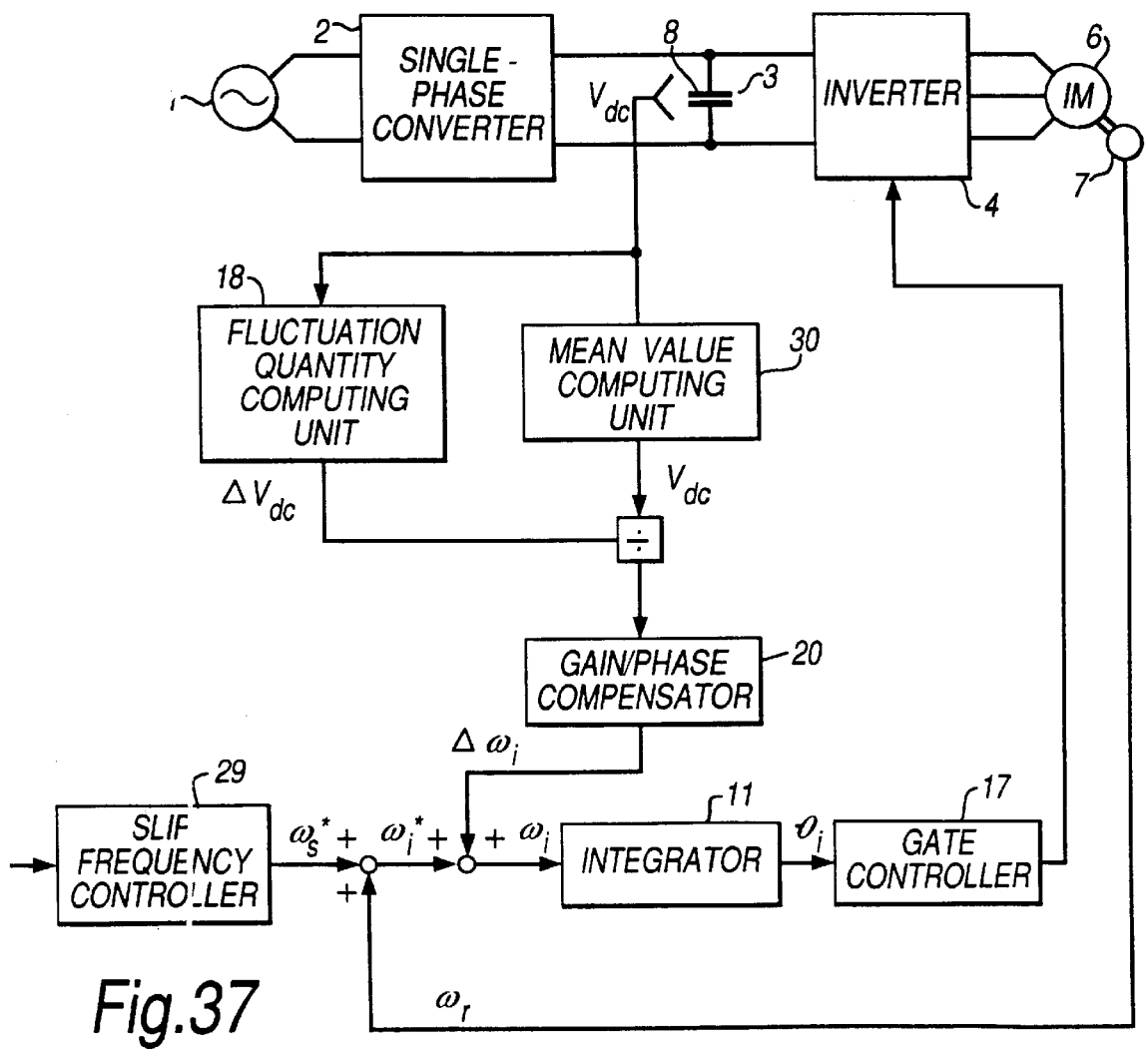
FIG. 37 is a block diagram illustrating an example of a schematic construction of a conventional power conversion system.

FIG. 36 illustrates an output voltage vector Vv of inverter 204 on the dq-axis rotatory coordinate system. Assuming that the d-axis, that is the secondary magnetic axis, is a real axis and the q-axis is an imaginary axis, voltage vector Vv can be expressed by following equation (28A).

$$Vv = (2/3)^{1/2} Vdc \, e^{j\rho} \qquad (28A)$$

where, $(2/3)^{1/2}$ is a coefficient of conversion to the dq-axis.

Here, Vdc is DC link voltage, $\rho$ is phase angle from the secondary magnetic flux axis to the voltage vector axis. And, Vdc and $\rho$ are separated to mean value and fluctuation quantity, respectively. Subscripts * and $\Delta$ indicate mean value and fluctuation quantity, respectively.

$$Vdc = Vdc^* + \Delta Vdc$$

$$\rho = \rho^* + \Delta\rho \qquad (29A)$$

Regarding fluctuation quantity $\Delta$Vv, the following equation (30A) holds good from dq-axis output voltage vector Vv expressed by equation (28A).

$$\Delta Vv = (2/3)^{1/2}(\Delta Vdc \, e^{j\rho} + j Vdc \, e^{j\rho} \Delta\rho) \qquad (30A)$$

Here, fluctuation quantity $\Delta\rho$ can be considered to be compensation quantity $\Delta\theta$i which is superimposed on the inverter phase angle.

$$\Delta\theta i = \Delta\rho \tag{31A}$$

Fluctuation quantity $\Delta Vv$ of voltage vector expressed by equation (30A) is indicated by fluctuation quantities $\Delta Vd$, $\Delta Vq$ of dq-axis output voltages by equation (32A).

$$\begin{bmatrix} \Delta Vd \\ \Delta Vq \end{bmatrix} = \begin{bmatrix} REAL(\Delta Vv) \\ IMAG(\Delta Vv) \end{bmatrix} = \sqrt{\frac{2}{3}} \begin{bmatrix} \cos\rho & -\sin\rho \\ \sin\rho & \cos\rho \end{bmatrix} \begin{bmatrix} \Delta Vdc \\ Vdc\Delta\theta i \end{bmatrix} \tag{32A}$$

Equation (32A) indicates that dq-axis voltages are affected by fluctuation quantity $\Delta Vdc$ of the DC link voltage.

When the fluctuation quantities of dq-axis output voltages expressed by equation (32A) satisfy the conditional equation shown by equation (26), it is possible to suppress the torque ripple. Then, by substituting equation (32A) into equation (26), compensation quantity $\Delta\theta i$ is derived.

$$\Delta\theta i = H1(s)\frac{\Delta Vdc}{Vdc} \tag{33A}$$

$$H1(s) = \frac{d2s^2 + d1s + d0}{c2s^2 + c1s + c0} \tag{34A}$$

$$\begin{aligned} c2 &= \cos\rho & d2 &= -\sin\rho \\ c1 &= a1\cos\rho + b1\sin\rho & d1 &= b1\cos\rho - a1\sin\rho \\ c0 &= a0\cos\rho + b0\sin\rho & d0 &= b0\cos\rho - a0\sin\rho \end{aligned} \tag{35A}$$

Then, by adding compensation quantity $\Delta\theta i$ computed by equation (33A) to inverter phase angle reference value $\theta i^*$, inverter phase angle $\theta i$ is computed.

$$\theta i = \theta i^* + \Delta\theta i \tag{36A}$$

The power conversion system of this embodiment is constructed as described above, it is possible to suppress the torque ripple. As the compensation values are computed instantaneously according to the operating state, its effect can be expected under any operating state. Furthermore, the compensation is obtained analytically, it becomes possible to make the adjustment easy on an actual machine.

As described above, according to a power conversion system of this invention, as the compensations are executed in order according to the compensation quantity which is theoretically obtained, it becomes possible to suppress the torque ripple extremely effectively without requiring adjustment under any operating state or any control objects having different parameters.

Thus, it becomes possible to sharply reduce time and labor required for adjustment.

Further, for instance, when a power source is of single phase type, it becomes possible to suppress the torque ripple in case that the inverter output frequency is about two times of the frequency of the power source. Thus, the reduction of noise and the drop of failure rates of mechanical and electrical systems can be expected.

When this invention is applied to induction motors which are used for driving electric vehicles, it becomes possible to obtain an effect to improve the riding comfort.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion system, comprising:
   a converter for converting an AC power from a power source to a DC power;
   a DC capacitor for smoothing said DC power output from said converter;
   a voltage inverter for converting said DC power smoothed by said DC capacitor to an AC power of an arbitrary frequency to drive and control an induction motor;
   means for obtaining a magnetic flux axis of said induction motor;
   means for computing a current orthogonal to said obtained magnetic flux axis; and
   phase control means for controlling a phase angle of an output voltage of said inverter so that a value of said current orthogonal to said obtained magnetic flux axis is maintained at a constant level.

2. A power conversion system, comprising:
   a converter for converting an AC power from a power source to a DC power;
   a DC capacitor for smoothing said DC power output from said converter;
   a voltage inverter for converting said DC power smoothed by said DC capacitor to an AC power of an arbitrary frequency to drive and control an induction motor;
   vector control means for controlling a vector on a dq-axis rotatory coordinate system where an axis agreed with a magnetic flux axis of said induction motor is assumed to be a d-axis and an axis orthogonal to said d-axis is assumed to be a q-axis;
   means for obtaining a q-axis component current; and
   phase control means for controlling a phase angle of an output voltage of said inverter so that a value of said obtained q-axis component current is maintained at a constant level.

3. The power conversion system according to claim 2, wherein said phase control means includes:
   means for obtaining a DC link voltage that is a terminal voltage of said DC capacitor;
   means for obtaining a fluctuation quantity of said obtained DC link voltage;
   means for obtaining an angular frequency of said induction motor;
   means for computing a d-axis secondary magnetic flux command value;
   means for computing a q-axis primary current command value;
   means for computing a phase angle from said d-axis to an output voltage axis on said dq-axis rotatory coordinate system;
   means for computing a compensation quantity $\Delta\theta_v$ to said phase angle of said inverter output voltage according to transfer functions of the following equations (1)–(4):

$$\Delta\theta_v \simeq H_1(s)\frac{\Delta V_{dc}}{V_{dc}} \tag{1}$$

$$H_1(s) = \frac{d_2 s^2 + d_1 s + d_0}{c_2 s^2 + c_1 s + c_0} \tag{2}$$

$$c_2 = \cos\theta_v$$

$$c_1 = a_1\cos\theta_v + b_1\sin\theta_v$$

$$c_0 a_0\cos\theta_v + b_0\sin\theta_v$$

$$d_2 = -\sin\theta_v$$

$$d_1 = b_1\cos\theta_v - a_1\sin\theta_v$$

$$d_0 = b_0\cos\theta_v - a_0\sin\theta_v \quad (3)$$

$$a_1 = \frac{R_2}{L_2} + \frac{R_{12}}{\sigma L_1} \quad (4)$$

$$a_0 = \frac{R_1 R_2}{\sigma L_1 L_2} + \frac{R_2 M}{L_2} \cdot \frac{\omega_i i_q^*}{\phi_{2d}^*}$$

$$b_1 = \omega_i - \frac{R_2 M}{L_2} \cdot \frac{i_q^*}{\phi_{2d}^*}$$

$$b_0 = \frac{R_2}{L_2}\omega_i + \frac{R_2 M^2}{\sigma L_1 L_2}\omega_r - \frac{R_{12} R_2 M}{\sigma L_1 L_2} \cdot \frac{i_q^*}{\phi_{2d}^*}$$

where, $\Delta\theta_v$: Compensating quantity to inverter output voltage phase angle $V_{dc}$: DC link voltage $\Delta V_{dc}$: Fluctuating quantity of DC link voltage s: Laplace operator $\theta_v$: Phase angle of inverter output voltage $R_1$: Primary resistance of induction motor $R_2$: Secondary resistance of inductor motor $L_1$: Primary self-inductance of induction motor $L_2$: Secondary self-inductance of induction motor M: Mutual inductance of induction motor $R_{12}$: $R_{12} = R_1 + (R_2 \cdot M^2/L_2^2)$ $\sigma$: $\sigma = 1 - M^2/(L_1 \cdot L_2)$ $\omega_i$: Output angular frequency of inverter $\omega_r$: Angular frequency of induction motor $i_q^*$: q-axis primary current command value $\phi_{2d}^*$: d-axis secondary magnetic flux command value;

means for computing said phase angle of said inverter output voltage by adding said computed compensation quantity to said phase angle of said inverter output voltage with a phase angle reference of said inverter output voltage; and means for controlling said inverter output voltage based on said computed phase angle of said inverter output voltage.

4. The power conversion system according to claim 2, wherein said phase control means includes:

means for obtaining a DC link voltage that is a terminal voltage of said DC capacitor;

means for obtaining a fluctuation quantity of said obtained DC link voltage;

means for obtaining an angular frequency of said induction motor;

means for computing a phase angle from said d-axis to an output voltage axis on said dq-axis rotatory coordinate system;

means for computing a compensation quantity $\Delta\theta_v$ to said phase angle of said inverter output voltage according to transfer functions of the following equations (5)–(8):

$$\Delta\theta_v = H_2(s)\Delta\frac{V_{dc}}{V_{dc}} \quad (5)$$

$$H_2(s) = \frac{d_2 s^2 + d_1 s + d_0}{c_2 s^2 + c_1 s + c_0} \quad (6)$$

$$c_2 = \cos\theta_v$$

$$c_1 = a_1\cos\theta_v + b_1\sin\theta_v$$

$$c_0 a_0\cos\theta_v + b_0\sin\theta_v$$

$$d_2 = -\sin\theta_v$$

$$d_1 = b_1\cos\theta_v - a_1\sin\theta_v$$

$$d_0 = b_0\cos\theta_v - a_0\sin\theta_v \quad (7)$$

$$a_1 = \frac{R_2}{L_2} + \frac{R_{12}}{\sigma L_1} \quad (8)$$

$$a_0 = \frac{R_1 R_2}{\sigma L_1 L_2}$$

$$b_1 = \omega_i$$

$$b_0 = \frac{R_2}{L_2}\omega_i + \frac{R_2 M^2}{\sigma L_1 L_2^2}\omega_r$$

where, $\Delta\theta_v$: Compensating quantity to inverter output voltage phase angle $V_{dc}$: DC link voltage $\Delta V_{dc}$: Fluctuating quantity of DC link voltage s: Laplace operator $\theta_v$: Phase angle of inverter output voltage $R_1$: Primary resistance of induction motor $R_2$: Secondary resistance of inductor motor $L_1$: Primary self-inductance of induction motor $L_2$: Secondary self-inductance of induction motor M: Mutual inductance of induction motor $R_{12}$: $R_{12} = R_1 + (R_2 \cdot M^2/L_2^2)$ $\sigma$: $\sigma = 1 - M^2/(L_1 \cdot L_2)$ $\omega_i$: Inverter output angular frequency $\omega_r$: Angular frequency of induction motor;

means for computing said phase angle of said inverter output voltage by adding said computed compensation quantity to said phase angle of said inverter output voltage with a phase angle reference of said inverter output voltage; and means for controlling said inverter output voltage based on said computed phase angle of said inverter output voltage.

5. The power conversion system according to claim 2, wherein said phase control means includes:

means for obtaining a DC link voltage that is a terminal voltage of said DC capacitor;

means for obtaining a fluctuation quantity of said obtained DC link voltage;

means for computing a phase angle from said d-axis to an output voltage axis on said dq-axis rotatory coordinate system;

means for computing a compensation quantity $\Delta\theta_v$ to said phase angle of said inverter output voltage according to transfer functions of the following equations (9)–(12):

$$\Delta\theta_v = H_3(s)\frac{\Delta V_{dc}}{V_{dc}} \quad (9)$$

$$H_3(s) = \frac{d_1 s + d_0}{c_1 s + c_0} \quad (10)$$

$$c_1 = \cos\theta_v$$

$c_0 a_0 \cos\theta_v + b_0 \sin\theta_v$ $d_2 = -\sin\theta_v$ $d_0 = b_0 \cos\theta_v - a_0 \sin\theta_v$ (11)

$a_0 = \dfrac{R_{12}}{\sigma L_1}$ $b_0 = \omega_i$ (12)

where, $\Delta\theta_v$: Compensating quantity to inverter output voltage phase angle $V_{dc}$: DC link voltage $\Delta V_{dc}$: Fluctuating quantity of DC link voltage s: Laplace operator $\theta_v$: Inverter output voltage phase angle $R_1$: Primary resistance of induction motor $R_2$: Secondary resistance of inductor motor $L_1$: Primary self-inductance of induction motor $L_2$: Secondary self-inductance of induction motor M: Mutual inductance of induction motor $R_{12}$: $R_{12} = R_1 + (R_2 \cdot M^2 / L_2^2)$ $\sigma$: $\sigma = 1 - M^2/(L_1 \cdot L_2)$ $\omega_1$: Inverter output angular frequency;

means for computing said phase angle of said inverter output voltage by adding said computed fluctuation quantity to said phase angle of said inverter output voltage with a phase angle reference of said inverter output voltage: and means for controlling said inverter output voltage based on said computed phase angle of said inverter output voltage.

6. The power conversion system according to one of claims 3, 4 and 5:

wherein said means for obtaining said fluctuation quantity of said DC link voltage extracts a sine wave that fluctuates at a frequency that is two times of a supply frequency from said obtained DC link voltage; and wherein said phase control means includes, means for computing a gain and a phase of a frequency component at said frequency which is two times of said supply frequency of said transfer function of one of said equations (2), (6) and (10) as a gain compensating value and a phase compensating value in case of a single phase power source, means for compensating said extracted sine wave by said gain compensating value and said phase compensating value, and means for computing said compensation quantity to said phase angle of said inverter output voltage by dividing said compensated sine wave by said DC link voltage.

7. The power conversion system according to one of claims 3, 4 and 5:

wherein said means for obtaining said fluctuation quantity of said DC link voltage extracts a sine wave that fluctuates at a frequency that is two times of a supply frequency from said obtained DC link voltage; and wherein said phase control means includes, means for storing a gain and a phase of a frequency component at said frequency which is two times of said supply frequency of said transfer function of one of said equations (2), (6) and (10) which are computed in advance using variables used for computing said transfer function as parameters and generating as a gain compensating value and a phase compensating value in case of a single phase power source, means for compensating said extracted sine wave by said gain compensating value and said phase compensating value, and means for computing said compensation quantity to said phase angle of said inverter output voltage by dividing said compensated sine wave by said DC link voltage.

8. A power conversion system, comprising:

a converter for converting an AC power from a power source to a DC power;

a DC capacitor for smoothing said DC power output from said converter;

a voltage inverter for converting said DC power smoothed by said DC capacitor to an AC power of an arbitrary frequency to drive and control an induction motor;

means for obtaining an output torque of said induction motor; and phase control means for controlling a phase angle of an output voltage of said inverter so that a value of said obtained output torque is maintained at a constant level.

9. A power conversion system, comprising:

a converter for converting an AC power from a power source to a DC power;

a DC capacitor for smoothing said DC power output from said converter;

an inverter for converting said DC power smoothed by said DC capacitor to an AC power of an arbitrary frequency to drive and control an induction motor;

vector control means for controlling a vector on a dq-axis rotatory coordinate system where an axis agreed with a magnetic flux axis of said induction motor is assumed to be a d-axis and an axis orthogonal to said d-axis is assumed to be a q-axis;

means for obtaining a q-axis component current;

means for computing a q-axis primary current command value;

means for computing a difference between said obtained q-axis component current value and said computed q-axis primary current command value; and phase control means for controlling a phase angle of an output voltage of said inverter so that said computed difference becomes zero.

10. The power conversion system according to one of claims 1, 2, 8 and 9:

wherein in said phase control means, an output frequency of said inverter is controlled instead of controlling said phase angle of said inverter output voltage.

11. The power conversion system according to one of claims 3, 4 and 5, further comprising:

means for falsely differentiating said compensation quantity to said computed phase angle of said inverter output voltage;

means for computing an inverter output frequency by adding said falsely differentiated compensation quantity to an inverter output frequency reference; and means for controlling an output frequency of said inverter instead of controlling said phase angle of said output voltage of said inverter so that a value of said detected or computed current of q-axis component is maintained at a constant level.

12. The power conversion system according to claim 7, further comprising:

means for advancing said computed phase compensating value by 90 degree to obtain a modified phase compensating value;

means for multiplying said computed gain compensation value with an angular frequency that is two times of a supply angular frequency to obtain a modified gain compensation value;

means for compensating said extracted sine wave by said modified gain and phase compensation values instead of said computed gain and phase compensation values;

means for computing a compensation quantity to said inverter output frequency by dividing said compensated sine wave by said DC link voltage;

means for computing an inverter output frequency by adding said computed compensation quantity to an inverter output frequency reference; and means for controlling an output frequency of said inverter instead of controlling said phase angle of said output voltage of said inverter so that a value of said detected or computed current of q-axis component is maintained at a constant level.

13. The power conversion system according to claim 7, further comprising:

means for modifying said computed phase compensating value by a predetermined degree to obtain a modified phase compensating value;

means for modifying said computed gain compensation value by a predetermined value that is two times of supply angular frequency to obtain a modified gain compensation value means for compensating said extracted sine wave by said modified gain and phase compensation values instead of said computed gain and phase compensation values;

means for computing a compensation quantity to said inverter output frequency by dividing said compensated sine wave by said DC link voltage;

means for computing an inverter output frequency by adding said computed compensation quantity to an inverter output frequency reference; and means for controlling an output frequency of said inverter instead of controlling said phase angle of said output voltage of said inverter so that a value of said detected or computed current of q-axis component is maintained at a constant level.

14. The power conversion system according to one of claims 1, 2, 8 and 9, wherein:

said inverter operates in a constant voltage variable frequency mode.

15. A power conversion system, comprising:

a converter for converting an AC power from a power source to a DC power;

a DC capacitor for smoothing said DC power output from said converter;

an inverter for converting said DC power smoothed by said DC capacitor to an AC power of an arbitrary frequency to drive and control an induction motor;

vector control means for controlling a vector on a dq-axis rotatory coordinate system where an axis agreed with a magnetic flux axis of said induction motor is assumed to be d-axis and an axis orthogonal to said d-axis is assumed to be q-axis;

means for obtaining a q-axis component current; and means for controlling an output frequency of said inverter so that a value of said obtained q-axis component current is maintained at a constant level.

16. A power conversion system, comprising:

a converter for converting an AC power from a power source to a DC power;

an inverter for converting said DC power output by said converter to an AC power of an arbitrary frequency to drive and control an induction motor; and vector control means for adjusting an AC voltage vector output by said inverter so that a state quantity arising from rectification by said converter becomes constant while a magnetic flux component current is pulsating on a rotatory coordinate system composed of a magnetic flux axis and a torque axis orthogonal to said magnetic flux axis according to fluctuation of said DC power output from said converter.

17. A power conversion system, comprising:

a converter for converting an AC power from a power source to a DC power;

an inverter for converting said DC power output by said converter to an AC power of an arbitrary frequency to drive and control an induction motor; and vector control means for adjusting a phase angle from a magnetic flux axis to an AC voltage vector output by said inverter so that a state quantity arising from rectification by said converter becomes constant while a magnetic flux component current is pulsating on a rotatory coordinate system composed of said magnetic flux axis and a torque axis orthogonal to said magnetic flux axis according to fluctuation of said DC power output from said converter.

18. A power conversion system, comprising:

a converter for converting an AC power from a power source to a DC power;

an inverter for converting said DC power output by said converter to an AC power of an arbitrary frequency to drive and control an induction motor; and vector control means for adjusting an output frequency of said inverter so that a state quantity arising from rectification by said converter becomes constant while a magnetic flux component current is pulsating on a rotatory coordinate system composed of a magnetic flux axis and a torque axis orthogonal to said magnetic flux axis according to fluctuation of said DC power output from said converter.

19. The power conversion system according to one of claims 16, 17 and 18, wherein:

in said vector control means, said state quantity arising from rectification by said converter is a torque component current.

20. The power conversion system according to one of claims 16, 17 and 18, wherein:

in said vector control means, said state quantity arising from rectification by said converter is a torque of said induction motor.

21. The power conversion system according to one of claims 16, 17 and 18, wherein:

in said vector control means, said state quantity arising from rectification by said converter is a power consumed in said inverter.

22. The power conversion system according to one of claims 16, 17 and 18, wherein:

in said vector control means, said state quantity arising from rectification by said converter is a current flowing to said inverter.

23. The power conversion system according to one of claims 16, 17 and 18, wherein:
in said vector control means, said state quantity arising from rectification by said converter is an output current of said inverter.

24. A power conversion system, comprising:
a converter for converting an AC power from a power source to a DC power;
an inverter for converting said DC power output by said converter to an AC power of an arbitrary frequency to drive and control an induction motor; and
vector control means for adjusting a magnetic flux component voltage and a torque component voltage so that a torque component current becomes constant while a magnetic flux component current is pulsating on a rotatory coordinate system composed of a magnetic flux axis and a torque axis orthogonal to said magnetic flux axis according to fluctuation of said DC power output from said converter.

25. A power conversion system, comprising:
a converter for converting an AC power from a power source to a DC power;
an inverter for converting said DC power output by said converter to an AC power of an arbitrary frequency to drive and control an induction motor; and
vector control means for adjusting a magnetic flux component current so that said magnetic flux component current pulsates on a rotatory coordinate system composed of a magnetic flux axis and a torque axis orthogonal to said magnetic flux axis according to fluctuation of said DC power output from said converter.

26. The power conversion system according to one of claims 16, 17, 18, 24 and 25, wherein:
in said vector control means, said adjustment is carried out in a control mode where the number of pulses involved in a half cycle of said output voltage of said inverter is one.

27. The power conversion system according to one of claims 16, 17, 18, 24 and 25, wherein:
in said vector control means, said adjustment is not carried out according to the number of pulses involved in a half cycle of said output voltage of said inverter.

28. A power conversion system, comprising:
a converter for converting a single-phase AC power from a power source to a DC power;
an inverter for converting said DC power output by said converter to an AC power of an arbitrary frequency to drive and control an induction motor;
means for obtaining a secondary magnetic flux mean value ($\phi 2^*$) of said induction motor;
means for obtaining a phase angle ($\rho$) from a secondary magnetic flux axis of said induction motor to an output voltage axis;
torque current computing means for computing a mean value (iq*) of a torque current orthogonal to said secondary magnetic flux axis;
magnetic flux frequency computing means for computing a secondary magnetic flux frequency ($\omega o$) which is given to said induction motor;
means for obtaining a DC link voltage (Vdc) at an output side of said converter and an input side of said inverter;
means for computing a DC link voltage fluctuation quantity ($\Delta$Vdc) from a mean value of said DC link voltage (Vdc);

means for obtaining a rotating frequency (fr) and an angular frequency ($\omega r$) of said induction motor;
means for computing an inverter frequency reference (fi*) based on said rotating frequency (fr) and a slip angular frequency reference (fs*) of said induction motor;
means for obtaining an inverter phase angle reference ($\theta_i^*$) by integrating said inverter frequency reference (fi*);
means for obtaining a compensation value ($\Delta\theta$i) to an inverter phase angle ($\theta$i) based on the following Equations (1A)–(4A) by inputting said motor rotating frequency (fr), said motor angular frequency ($\omega r$), said DC link voltage fluctuation quantity ($\Delta$Vdc), said phase angle ($\rho$), a Laplace operator, said DC link voltage (Vdc), said secondary magnetic flux angular frequency ($\omega o$), a transfer function (H1(s)), a motor primary resistance (R1), a motor secondary resistance (R2), a motor primary self-inductance (L1), a motor secondary self-inductance (L2) and a mutual inductance (M)

$$\Delta \theta i = H1(s) \frac{\Delta Vdc}{Vdc} \tag{1A}$$

$$H1(s) = \frac{d2s^2 + d1s + d0}{c2s^2 + c1s + c0} \tag{2A}$$

$c2 = \cos\rho$ $c1 = a1\cos\rho + b1\sin\rho$ $c0 = a0\cos\rho + b0\sin\rho$ $d2 = -\sin\rho$ $d1 = b1\cos\rho - a1\sin\rho$ $d0 = b0\cos\rho - a0\sin\rho \tag{3A}$ $$a1 = \frac{R2}{L2} + \frac{R12}{\sigma L1} \tag{4A}$$

$$a0 = \frac{R1R2}{\sigma L1L2} + \frac{R2M}{L2} \cdot \frac{\omega 0 iq^*}{\phi 2^*}$$

$$b1 = \omega 0 - \frac{R2M}{L2} \cdot \frac{iq^*}{\phi 2^*}$$

$$b0 = \frac{R2}{L2}\omega 0 + \frac{R1M^2}{\sigma L1L2}\omega 1 - \frac{R12R2M}{\sigma L1L2} \cdot \frac{iq^*}{\phi 2^*}$$

$$R12 = R1 + R2\frac{M^2}{L2^2}$$

$$\sigma = 1 - \frac{M^2}{L1L2};$$

means for obtaining said inverter phase angle ($\theta$i) by adding said compensation value ($\Delta\theta$i) and said inverter phase angle reference ($\theta$i*): and
means for controlling said inverter output voltage based on said inverter phase angle ($\theta$i).

* * * * *